United States Patent
Elazzouni et al.

(10) Patent No.: US 11,792,841 B2
(45) Date of Patent: Oct. 17, 2023

(54) SIDELINK INTRA-UE PRIORITIZATION

(71) Applicant: QUALCOMM Incorporated, San Diego, CA (US)

(72) Inventors: Sherif Elazzouni, San Diego, CA (US); Ozcan Ozturk, San Diego, CA (US); Xiaojie Wang, Hillsborough, NJ (US)

(73) Assignee: QUALCOMM Incorporated, San Diego, CA (US)

(*) Notice: Subject to any disclaimer, the term of this patent is extended or adjusted under 35 U.S.C. 154(b) by 165 days.

(21) Appl. No.: 17/575,319

(22) Filed: Jan. 13, 2022

(65) Prior Publication Data

US 2023/0224948 A1 Jul. 13, 2023

(51) Int. Cl.
*H04W 72/566* (2023.01)
*H04W 72/542* (2023.01)

(52) U.S. Cl.
CPC ....... *H04W 72/569* (2023.01); *H04W 72/542* (2023.01)

(58) Field of Classification Search
CPC .................. H04W 72/1242; H04W 72/1231
See application file for complete search history.

(56) References Cited

U.S. PATENT DOCUMENTS

| | | | | |
|---|---|---|---|---|
| 2020/0245311 A1* | 7/2020 | Uchiyama | ............. | H04W 72/23 |
| 2021/0105126 A1* | 4/2021 | Yi | ............. | H04L 1/1671 |
| 2021/0274452 A1* | 9/2021 | Khoryaev | ............. | H04W 84/047 |
| 2022/0022230 A1* | 1/2022 | Lu | ............. | H04W 72/566 |
| 2022/0150804 A1* | 5/2022 | Liu | ............. | H04W 72/0453 |
| 2022/0232519 A1* | 7/2022 | Nguyen | ............. | H04W 72/20 |
| 2022/0361147 A1* | 11/2022 | Sarkis | ............. | H04W 72/0446 |
| 2022/0394677 A1* | 12/2022 | Wu | ............. | H04W 72/02 |
| 2023/0053192 A1* | 2/2023 | Lee | ............. | H04W 52/0229 |
| 2023/0107863 A1* | 4/2023 | Farag | ............. | H04W 72/40 370/329 |
| 2023/0108372 A1* | 4/2023 | Nguyen | ............. | H04W 72/02 370/329 |
| 2023/0180216 A1* | 6/2023 | Hwang | ............. | H04W 4/40 370/329 |
| 2023/0199804 A1* | 6/2023 | Hwang | ............. | H04W 72/12 370/329 |
| 2023/0209576 A1* | 6/2023 | Hwang | ............. | H04L 1/18 370/329 |
| 2023/0224948 A1* | 7/2023 | Elazzouni | ............. | H04W 72/542 370/329 |

* cited by examiner

*Primary Examiner* — Parth Patel
(74) *Attorney, Agent, or Firm* — Holland & Hart / Qualcomm

(57) ABSTRACT

Methods, systems, and devices for wireless communications are described. In some examples, a user equipment (UE) may receive control signaling indicating a semi-persistent scheduling configuration that identifies a plurality of resource occasions each comprising a plurality of resources of a sidelink channel allocated to the first UE for sidelink communication. The UE may identify a rescheduling configuration for scheduling transmission of a first message that has a possible conflict with transmission of a second message during a first resource of the plurality of resources of a first resource occasion of the plurality of resource occasions, the first message having a different priority than the second message. The UE may transmit the second message during the first resource occasion and may transmit the first message via the sidelink channel in accordance with the rescheduling configuration.

30 Claims, 28 Drawing Sheets

SIDELINK INTRA-UE PRIORITIZATION

FIELD OF TECHNOLOGY

The following relates to wireless communications, including sidelink intra-user equipment (UE) prioritization.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication systems, a UE may be configured to communicate with one or more other UE using sidelink communications. For example, a base station may schedule one or more resources for sidelink communications at the UE via a scheduling configuration (e.g., configured grant, dynamic grant, semi-persistent scheduling configuration). Each scheduling configuration may allocate a number of resources (e.g., three) for transmission of a data message (e.g., data packet, medium access control (MAC) physical data unit (PDU), transport block (TB)). In some examples, there may be a possible conflict (e.g., a scheduled conflict) between two or more scheduling configurations. For example, one or more resources of a first scheduling configuration for transmitting a first sidelink data message may possibly conflict with one or more resources of a second scheduling configuration for transmitting a second sidelink data message.

SUMMARY

The described techniques relate to improved methods, systems, devices, and apparatuses that support sidelink intra-user equipment (UE) prioritization. Generally, the described techniques provide for autonomous rescheduling of conflicting traffic. In some examples, two data messages (e.g., data packets, transport blocks (TBs), medium access control (MAC) physical data units (PDUs)) each having a different priority may be available (e.g., buffered) for transmission over a single available sidelink scheduling configuration (e.g., configured grant (CG), dynamic grant (DG)) or over two overlapping sidelink scheduling configurations. A single scheduling configuration may include a number of resource occasions each including three resources, where each occasion is dedicated to transmitting a same data message. In case of possible conflict (e.g., a scheduled overlap or partial overlap of resources, resources with less than a threshold time gap therebetween, resources with less than a threshold frequency gap therebetween, etc.) between the available data messages, a transmitting UE may prioritize one data message (e.g., having a higher priority) over the other data message.

In such examples, instead of requesting a new scheduling configuration from the base station for transmitting the deprioritized lower priority data packet, the transmitting UE may autonomously transmit a deprioritized data message based on a rescheduling configuration. In such a manner, the transmitting UE may reduce the amount of signaling between the transmitting UE and the base station for retransmission of the deprioritized data message (e.g., by bypassing a request for a dynamic grant for retransmission). Thus, autonomous transmission may allow for low-latency recovery from deprioritization with reduced signaling overhead between the transmitting UE and the base station.

A method for wireless communication at a first user equipment (UE) is described. The method may include receiving control signaling indicating a semi-persistent scheduling configuration that identifies a set of multiple resource occasions each including a set of multiple resources of a sidelink channel allocated to the first UE for sidelink communication, identifying a rescheduling configuration for scheduling transmission of a first message that has a possible conflict with transmission of a second message during a first resource of the set of multiple resources of a first resource occasion of the set of multiple resource occasions, the first message having a different priority than the second message, transmitting the second message during the first resource occasion, and transmitting the first message via the sidelink channel in accordance with the rescheduling configuration.

An apparatus for wireless communication at a first UE is described. The apparatus may include a processor, memory coupled with the processor, and instructions stored in the memory. The instructions may be executable by the processor to cause the apparatus to receive control signaling indicating a semi-persistent scheduling configuration that identifies a set of multiple resource occasions each including a set of multiple resources of a sidelink channel allocated to the first UE for sidelink communication, identify a rescheduling configuration for scheduling transmission of a first message that has a possible conflict with transmission of a second message during a first resource of the set of multiple resources of a first resource occasion of the set of multiple resource occasions, the first message having a different priority than the second message, transmit the second message during the first resource occasion, and transmit the first message via the sidelink channel in accordance with the rescheduling configuration.

Another apparatus for wireless communication at a first UE is described. The apparatus may include means for receiving control signaling indicating a semi-persistent scheduling configuration that identifies a set of multiple resource occasions each including a set of multiple resources of a sidelink channel allocated to the first UE for sidelink communication, means for identifying a rescheduling configuration for scheduling transmission of a first message that has a possible conflict with transmission of a second message during a first resource of the set of multiple resources of a first resource occasion of the set of multiple resource occasions, the first message having a different priority than the second message, means for transmitting the second message during the first resource occasion, and means for transmitting the first message via the sidelink channel in accordance with the rescheduling configuration.

A non-transitory computer-readable medium storing code for wireless communication at a first UE is described. The code may include instructions executable by a processor to receive control signaling indicating a semi-persistent scheduling configuration that identifies a set of multiple resource occasions each including a set of multiple resources of a sidelink channel allocated to the first UE for sidelink communication, identify a rescheduling configuration for scheduling transmission of a first message that has a possible conflict with transmission of a second message during a first resource of the set of multiple resources of a first resource occasion of the set of multiple resource occasions, the first message having a different priority than the second message, transmit the second message during the first resource occasion, and transmit the first message via the sidelink channel in accordance with the rescheduling configuration.

In some examples of the method, apparatuses, and non-transitory computer-readable medium described herein, the rescheduling configuration indicates to transmit the first message during a subsequent resource of the first resource occasion.

In some examples of the method, apparatuses, and non-transitory computer-readable medium described herein, the rescheduling configuration indicates to transmit the first message during a second resource indicated by a second semi-persistent scheduling configuration that occurs after the first resource.

In some examples of the method, apparatuses, and non-transitory computer-readable medium described herein, the first resource occasion at least partially overlaps in time with a second resource occasion indicated by the second semi-persistent scheduling configuration.

In some examples of the method, apparatuses, and non-transitory computer-readable medium described herein, the rescheduling configuration indicates to transmit the first message during a resource of a second resource occasion of a second semi-persistent scheduling configuration that occurs after the first resource occasion of the semi-persistent scheduling configuration.

In some examples of the method, apparatuses, and non-transitory computer-readable medium described herein, the possible conflict occurs between resources of the semi-persistent scheduling configuration and a second semi-persistent scheduling configuration and the rescheduling configuration indicates to transmit the first message during a resource of a resource occasion indicated by a third semi-persistent configuration.

In some examples of the method, apparatuses, and non-transitory computer-readable medium described herein, the rescheduling configuration indicates to transmit the first message during a subsequent resource of a set of multiple resources of a resource occasion indicated by a second semi-persistent configuration based on the second message being successfully transmitted during the first resource that occurs prior to the subsequent resource.

In some examples of the method, apparatuses, and non-transitory computer-readable medium described herein, the rescheduling configuration indicates to transmit the first message during a second resource of the first resource occasion that occurs after the first resource based on the second message being successfully transmitted during the first resource of the first resource occasion.

In some examples of the method, apparatuses, and non-transitory computer-readable medium described herein, the rescheduling configuration indicates to transmit the first message during a subsequent resource of a second resource occasion that occurs after a prior resource of the second resource occasion based on the possible conflict occurring between the prior resource and the first resource.

In some examples of the method, apparatuses, and non-transitory computer-readable medium described herein, the rescheduling configuration indicates to transmit the first message during the first resource and the method, apparatuses, and non-transitory computer-readable medium may include further operations, features, means, or instructions for transmitting the second message during a prior resource of the first resource occasion that occurs prior to the first resource based on a priority of the second message being higher than a priority of the first message.

In some examples of the method, apparatuses, and non-transitory computer-readable medium described herein may include further operations, features, means, or instructions for retransmitting the second message during a subsequent resource of the first resource occasion that occurs after the first resource based on unsuccessful transmission of the second message during the prior resource.

In some examples of the method, apparatuses, and non-transitory computer-readable medium described herein, the first resource indicated by the semi-persistent scheduling configuration at least partially overlaps with a second resource of a second resource occasion indicated by a dynamic scheduling configuration.

Some examples of the method, apparatuses, and non-transitory computer-readable medium described herein may further include operations, features, means, or instructions for receiving a control message that schedules transmission of the second message during the first resource, where the second message may be transmitted during the first resource and the rescheduling configuration indicates to transmit the first message during a subsequent resource or a subsequent resource occasion.

Some examples of the method, apparatuses, and non-transitory computer-readable medium described herein may further include operations, features, means, or instructions for transmitting, to a base station, a first control channel including feedback associated with the first message and transmitting, to the base station, a second control channel including feedback associated with the second message.

Some examples of the method, apparatuses, and non-transitory computer-readable medium described herein may further include operations, features, means, or instructions for transmitting, to a base station, a first control channel including feedback associated with the second message, where the rescheduling configuration indicates to refrain from transmitting the first message during the first resource occasion and refraining from transmitting feedback associated with the first message during a control channel associated with the first resource occasion.

In some examples of the method, apparatuses, and non-transitory computer-readable medium described herein, the first message may be a sidelink message and the second message may be a sidelink message, an uplink message, or an access link message.

Some examples of the method, apparatuses, and non-transitory computer-readable medium described herein may further include operations, features, means, or instructions for receiving, from a base station, a first control message that schedules transmission of the first message during the first resource, transmitting negative feedback to the base station indicating that the first message was not transmitted during the first resource based on the rescheduling configuration indicating to transmit the negative feedback due to the possible conflict, and receiving a second control message scheduling transmission of the first message during a subsequent resource based on the negative feedback.

In some examples of the method, apparatuses, and non-transitory computer-readable medium described herein, the second message may be transmitted to a second UE during the first resource using a first transmission beam and the first message may be transmitted to at least one additional UE during the first resource using a second transmission based on a location of the second UE relative to the at least one additional UE, a priority associated with the at least one additional UE, or both.

In some examples of the method, apparatuses, and non-transitory computer-readable medium described herein, the second message may be transmitted to a second UE during the first resource using a first transmission beam and the first message may be transmitted to at least one additional UE during a second resource using the first transmission beam or a second transmission based on a location of the second UE relative to the at least one additional UE.

In some examples of the method, apparatuses, and non-transitory computer-readable medium described herein, scheduling transmission of the first message and the second message based on one or more parameters, a reported channel metric, or both.

Some examples of the method, apparatuses, and non-transitory computer-readable medium described herein may further include operations, features, means, or instructions for transmitting a third message during a subsequent resource of a second resource occasion based on transmission being skipped on an earlier resource of the second resource occasion.

Some examples of the method, apparatuses, and non-transitory computer-readable medium described herein may further include operations, features, means, or instructions for transmitting a third message during a subsequent resource of a second resource occasion based on a dummy transmission occurring on an earlier resource of the second resource occasion.

In some examples of the method, apparatuses, and non-transitory computer-readable medium described herein, identifying the rescheduling configuration may include operations, features, means, or instructions for receiving a control message indicating the rescheduling configuration.

Some examples of the method, apparatuses, and non-transitory computer-readable medium described herein may further include operations, features, means, or instructions for receiving the rescheduling configuration via radio resource control signaling.

In some examples of the method, apparatuses, and non-transitory computer-readable medium described herein, transmitting the first message may include operations, features, means, or instructions for autonomously transmitting the first message via the sidelink channel in accordance with the rescheduling configuration received via the radio resource control signaling.

In some examples of the method, apparatuses, and non-transitory computer-readable medium described herein, a priority of the second message may be higher than a priority of the first message.

A method for wireless communication at a base station is described. The method may include transmitting a first control signaling indicating a semi-persistent scheduling configuration that identifies a set of multiple resource occasions each including a set of multiple resources of a sidelink channel allocated to a first UE for sidelink communication, identifying rescheduling configuration for scheduling transmission of a first message by the first UE that has a possible conflict with transmission of a second message during a first resource of the set of multiple resources of a first resource occasion of the set of multiple resource occasions, the first message having a different priority than the second message, receiving the second message during the first resource occasion, and receiving the first message in accordance with the rescheduling configuration.

An apparatus for wireless communication at a base station is described. The apparatus may include a processor, memory coupled with the processor, and instructions stored in the memory. The instructions may be executable by the processor to cause the apparatus to transmit a first control signaling indicating a semi-persistent scheduling configuration that identifies a set of multiple resource occasions each including a set of multiple resources of a sidelink channel allocated to a first UE for sidelink communication, identify rescheduling configuration for scheduling transmission of a first message by the first UE that has a possible conflict with transmission of a second message during a first resource of the set of multiple resources of a first resource occasion of the set of multiple resource occasions, the first message having a different priority than the second message, receive the second message during the first resource occasion, and receive the first message in accordance with the rescheduling configuration.

Another apparatus for wireless communication at a base station is described. The apparatus may include means for transmitting a first control signaling indicating a semi-persistent scheduling configuration that identifies a set of multiple resource occasions each including a set of multiple resources of a sidelink channel allocated to a first UE for sidelink communication, means for identifying rescheduling configuration for scheduling transmission of a first message by the first UE that has a possible conflict with transmission of a second message during a first resource of the set of multiple resources of a first resource occasion of the set of multiple resource occasions, the first message having a different priority than the second message, means for receiving the second message during the first resource occasion, and means for receiving the first message in accordance with the rescheduling configuration.

A non-transitory computer-readable medium storing code for wireless communication at a base station is described. The code may include instructions executable by a processor to transmit a first control signaling indicating a semi-persistent scheduling configuration that identifies a set of multiple resource occasions each including a set of multiple resources of a sidelink channel allocated to a first UE for sidelink communication, identify rescheduling configuration for scheduling transmission of a first message by the first UE that has a possible conflict with transmission of a second message during a first resource of the set of multiple resources of a first resource occasion of the set of multiple resource occasions, the first message having a different priority than the second message, receive the second message during the first resource occasion, and receive the first message in accordance with the rescheduling configuration.

Some examples of the method, apparatuses, and non-transitory computer-readable medium described herein may further include operations, features, means, or instructions for transmitting, to the first UE, second control signaling indicating the rescheduling configuration.

In some examples of the method, apparatuses, and non-transitory computer-readable medium described herein, the rescheduling configuration indicates that the first message may be to be communicated during a subsequent resource of the first resource occasion.

In some examples of the method, apparatuses, and non-transitory computer-readable medium described herein, the rescheduling configuration indicates that the first message may be to be communicated during a second resource indicated by a second semi-persistent configuration that occurs after the first resource.

BRIEF DESCRIPTION OF THE DRAWINGS

FIGS. 3A through 12B each illustrate an example of a rescheduling configuration that supports sidelink intra-UE prioritization in accordance with aspects of the present disclosure.

DETAILED DESCRIPTION

Figure 1:
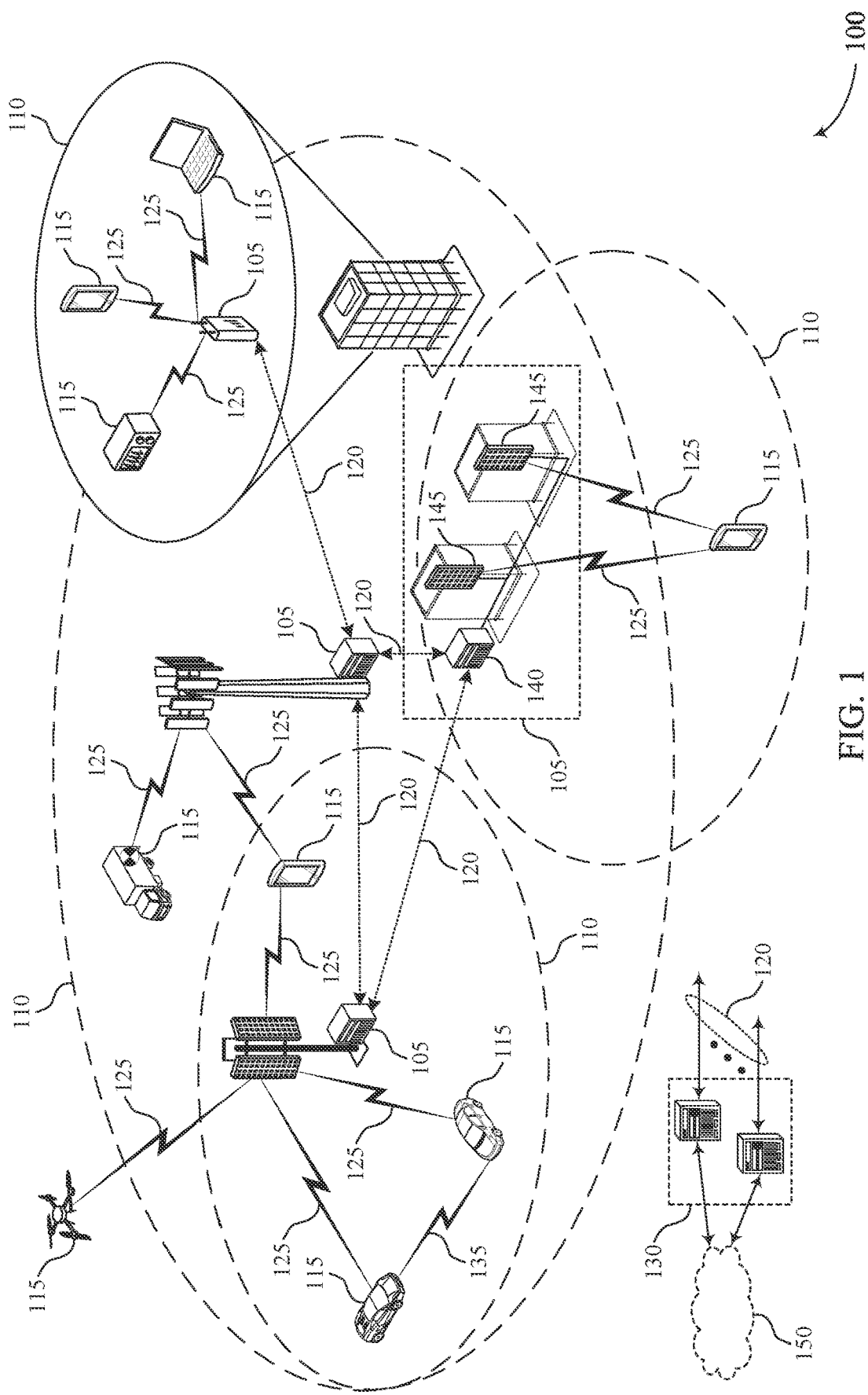
FIG. 1 illustrates an example of a wireless communications system that supports sidelink intra-user equipment (UE) prioritization in accordance with aspects of the present disclosure.

In some wireless communications systems, a user equipment (UE) may be configured to communicate with one or more other UE using sidelink communications. For example, a base station may schedule a set of resources on a physical sidelink shared channel (PSSCH) to be used in sidelink communication between a first UE and a second UE. The base station may assign a set of resources using a scheduling configuration (e.g., configured grant (CG) configuration, dynamic grant (DG), semi-persistent scheduling (SPS)) that UEs may use for sidelink communication. The scheduling configuration may include one or more sets of allocated resources (e.g., one or more resource occasions each including a set of three resources) for transmission of a data packet (e.g., a single transport block (TB) including a medium access control (MAC) physical data unit (PDU)) via a sidelink channel. The one or more set of allocated resources may occur for an indefinite amount of time, that is, until the base station signals a cancellation message (e.g., ends the scheduling configuration). If a receiving sidelink does not receive the data packet transmitted in a first resource of a resource occasion, a transmitting UE may retransmit the data packet on the second or additionally third resource of the resource occasion.

In some examples, the transmitting UE may have two different priority data packets scheduled for transmission during a same resource, but may be capable of transmitting up to one of the two data packets during that resource. In some wireless communications systems, the data packet having the higher priority may take precedent over the lower priority data packet. For example, a possible conflict (e.g., a scheduled conflict) may be resolved by transmitting the higher priority data packet using the overlapping resources and may deprioritize the lower priority data packet. In some examples, deprioritizing may include flushing the lower data packet from a buffer of the transmitting UE or delaying transmission of the lower data packet until a later time. However, flushing or delaying transmission may result in latency, a degraded user experience, or both.

Particular aspects of the subject matter described in this disclosure may be implemented to realize one or more of the following potential advantages. As described herein, a UE may perform autonomous transmission or retransmission of a lower priority message whose transmission was skipped due to transmission of a higher priority message. For example, a UE may receive control signaling indicating a rescheduling configuration for autonomous transmission of a deprioritized message which may decrease a latency associated with transmission of the deprioritized message. In some examples, the rescheduling configuration may indicate unused resources for transmitting the deprioritized message, increasing spectral efficiency of sidelink communications at the UE.

Aspects of the disclosure are initially described in the context of wireless communications systems. Aspects of the disclosure are then described in the context of various scheduling configurations that support autonomous rescheduling and are further described in the context of a process flow. Aspects of the disclosure are further illustrated by and described with reference to apparatus diagrams, system diagrams, and flowcharts that relate to sidelink intra-UE prioritization.

FIG. 1 illustrates an example of a wireless communications system 100 that supports sidelink intra-UE prioritization in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Described herein are techniques to enable UE 115 to autonomously transmit a lower priority packet when transmission of the lower priority packet was skipped or delayed due to transmission of a higher priority packet. In some examples, base station 105 may transmit, to a first UE 115, a control message indicating one or more configured grant (CG) configurations for the first UE 115. A CG configuration may indicate a repeating set of CG occasions, with each CG occasion including multiple resources. The first UE 115 may transmit, to a second UE 115, a same message (e.g., data packet) on each resource of the multiple resources within a particular CG occasion. The CG configuration may also indicate a HARQ ID that the first UE 115 is to include in the message for each transmission of the message in a CG occasion. The second UE 115 may transmit feedback including the HARQ ID to the first UE 115 indicating whether a transmission in one or more resources in a particular CG occasion was successfully received by the second UE 115. If the HARQ feedback includes a NACK (e.g., indicating that the message failed during at least one resource of a CG occasion), the first UE 115 may repeat transmission of the same message in a subsequent resource of the CG occasion. If the HARQ feedback includes a NACK for a last resource of the CG occasion, the first UE 115 may transmit the message in a next CG occasion.

In some examples of the wireless communications system 100, UEs 115 may communicate with each other via sidelink channels 135. For example, in a sidelink communication mode 1, a base station 105 may configure the first UE 115 with repeating sets of sidelink resources for sidelink communications (e.g., physical sidelink shared channel (PSSCH) communication) via a scheduling configuration, for example, such as a configured grant or a dynamic grant. The scheduling configuration may include sets of transmission occasions, where each transmission occasion may include a number of resources (e.g., three channel resources) for transmitting a single data packet such as a TB. If transmission of a TB by the first UE 115 to the second UE 115 is unsuccessful during a first resource of the grant, the first UE 115 may transmit the TB on a second or third resource of the grant. Additionally, the second UE 115 may provide feedback (e.g., hybrid automatic repeat request (HARQ)) for the TB to the first UE 115 (e.g., via physical feedback sidelink channel (PSFCH)).

The UE 115 may be configured with more than one scheduling configuration for sidelink communications and in some cases, a possible conflict between two different priority data packets may occur. For example, the UE 115 may be configured with a first grant for transmitting a first data packet having a first priority may at least partially overlap with a second grant for transmitting a second data packet having a second priority, and a possible conflict (e.g., a scheduled conflict) may occur between the two data packets. In such examples, the UE 115 may use the resources for transmitting the data packet associated with the higher priority while the lower priority data packet may be dropped. The UE 115 may transmit feedback to the base station 105 indicating that the lower priority data packet was dropped and may request resources for transmitting the lower priority data packet. The base station 105 may schedule resources for transmitting the lower priority data packet (e.g., via DG). This may lead to increased latency in the low priority transmission.

However, in some wireless communications systems, the UE, instead of relying on a negative acknowledgment feedback to alert a base station to the untransmitted lower priority data packet, may autonomously transmit a deprioritized data packet based on a rescheduling configuration. The UE may, thus, reduce the amount of signaling between the UE and the base station for retransmission of the deprioritized sidelink data packet (e.g., by bypassing a request for a DG for retransmission). Thus, autonomous transmission may allow for low-latency recovery from deprioritization with reduced signaling overhead between the transmitting UE and the base station.

For example, the UE 115 may receive control signaling from the base station 105 that indicates an CG configuration that identifies a grant including a plurality of resource occasions, each resource occasion including a plurality of (e.g., three) sidelink resources allocated to the UE 115 for sidelink communication. The UE 115 may identify a rescheduling configuration for scheduling transmission of a first message that has a possible conflict (e.g., a scheduled conflict) with transmission of a second message during a first resource of the plurality of resources of a first resource occasion of the grant. In some examples, the first message may have a different priority than the second message. (e.g., one priority may be higher or lower than the other). Based on identifying the rescheduling configuration, the UE 115 may transmit the second message to a receiving wireless device (e.g., a UE 115, the base station 105) during the first resource occasion and may transmit (e.g., autonomously) the first message via the sidelink channel to a receiving UE 115 in accordance with the rescheduling configuration.

Figure 2:
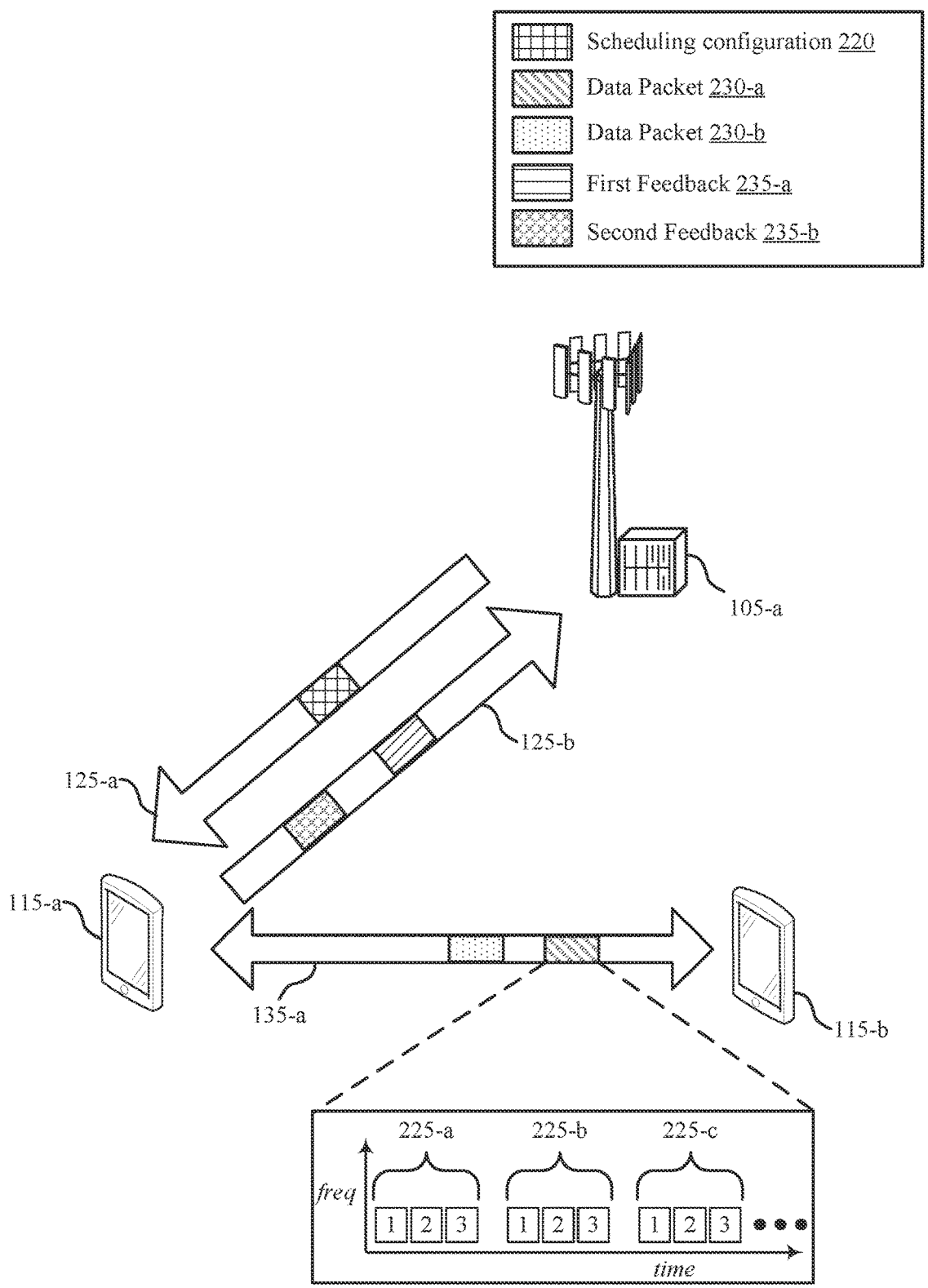
FIG. 2 illustrates an example of a wireless communications system that supports sidelink intra-UE prioritization in accordance with aspects of the present disclosure.

FIG. 2 illustrates an example of a wireless communications system 200 that supports sidelink intra-UE prioritization in accordance with aspects of the present disclosure. The wireless communications system 200 may implement aspects of the wireless communications system 100. For example, the wireless communications system 200 may include a base station 105-*a*, a transmitting UE 115-*a*, and a receiving UE 115-*b*, which may be examples of a base station 105 and UEs 115 as described with reference to FIG. 1, respectively. In some examples, the base station 105-*a* and UE 115-*a* may communicate over communication links 125-*a* and 125-*b*, which may be examples of a communication link 125 as described with reference to FIG. 1. Similarly, the UEs 115 may communicate over sidelink communication link 135-*a*, which may be an example of a communication link 135, as described with reference to FIG. 1.

In some examples, (e.g., Mode 1 communications) the transmitting UE 115-*a* and the receiving UE 115-*b* may be configured to communicate with each other or one or more other UE using sidelink 135-*a* via, e.g., sidelink control information, physical sidelink shared channel (PSSCH) communications. The base station 105-*a* may schedule a set of resources to be used for communications between the UE 115-*a* and the receiving UE 115-*b*. For example, the base station 105-*a* may transmit a control message indicating a scheduling configuration 220 to assign a set of resources to the UE 115-*a* (e.g., resource grant, configured grant (CG), DG, semi-persistent scheduling (SPS) grant). The scheduling configuration 220 may indicate one or more sets of intermittently (e.g., semi-periodically, periodically, sporadic) allocated resources (e.g., sets of one or more resource occasions each including a set of three resources), for example, resource occasions 225-*a*, 225-*b*, 225-*c*, and so on, where each resource occasion is allocated for transmission of a data packet (e.g., transport block, MAC PDU) and sidelink control information. That is, each resource may include a control portion for sidelink control information (SCI) and a data portion (e.g., PSSCH portion) for the data packet.

In some examples, the UE 115-*a* may receive from the base station 105-*a* or, for example, be otherwise configured with a semi-persistent scheduling (SPS) configuration (e.g., CG configuration) which may indicate a repeating set of resource occasions (e.g., CG occasions 225), where each CG occasion 225 includes a set of multiple resources of the sidelink channel 135-*a* allocated for communication between the transmitting UE 115-*a* and the receiving UE 115-*b*. It is noted that the following describes the SPS configuration as a CG configuration, and the techniques discussed herein may apply to other SPS configurations. In some examples, the UE 115-*a* may transmit the same data packet (e.g., MAC-PDU in a TB) on each resource of the set of multiple resources for each CG occasion 225, and may transmit a different data packet during a next CG occasion 225.

The resource occasions 225 may occur for an indefinite amount of time, that is, until the base station 105-*a* cancels the scheduling configuration 220 (e.g., withdraws the grant, signals a cancellation message, ends the scheduling configuration via other means). The UE 115-*a* may transmit a first data packet 230-*a* on a first resource (e.g. Resource 1 of the sidelink channel 135-*a*) of resource occasion 225-*a*, for example, but if transmission of the first data packet 230-*a* fails on the first resource, the UE 115-*a* may transmit the first data packet 230-*a* on the second or additionally third resource (e.g., on Resource 2 or additionally Resource 3 of the sidelink channel 135-*a*) of the resource occasion 225-*a*.

In some examples, one or more resources or resource occasions of the second scheduling configuration for transmitting a second data packet 230-*b* may at least partially overlap with one or more resources (e.g., Resources 1, 2, or 3) or resource occasions 225 of the scheduling configuration 220 for transmitting the first data packet 230-*a* causing a possible or potential conflict. In such examples, the first data packet 230-*a* having a higher priority may be transmitted and the second data packet 230-*b* having a lower priority may be deferred and the associated resources may go unused. In some examples, deferring may include flushing the data packet from a buffer of the UE 115-*a*, transmitting or forwarding from a receiving UE 115-*b*, negative feedback (e.g., first feedback 235-*a* or second feedback 235-*b*) associated with the lower priority data packet to the base station 105-*a*, requesting a second resource grant for the deprioritized packet, or any combination thereof among other examples. This may lead to an inefficient use of resources by the UE 115-*a* and may lead to increased latency associated with the lower priority data packet.

For example, one or more resources of the resource occasion 225-*a* may overlap with one or more resources of a resource occasion of the second scheduling configuration, but if the first data packet 230-*a* is associated with a higher priority, then the UE 115-*a* may defer transmission of the second data packet 230-*b*.

In some wireless communications systems, instead of flushing the lower priority second data packet 230-*b*, the UE 115-*a* may autonomously transmit or retransmit the deprioritized second data packet 230-*b* based on a rescheduling configuration. For example, the base station may transmit control signaling indicating the scheduling configuration 220 that identifies a plurality of resource occasions 225 each comprising a plurality of resources of a sidelink channel allocated to the UE 115-*a* for sidelink communication. In some examples, the UE 115-*a* may identify a rescheduling configuration for scheduling transmission of the first data packet 230-*a* that has a possible conflict (e.g., a scheduled conflict) with transmission of the second data packet 230-*b*. In some examples, the base station 105-*a* may transmit a control message indicating the rescheduling configuration to the UE 115-*a* via radio resource control (RRC) signaling (e.g., a RRC control message). The UE 115-*a* may, based on the rescheduling configuration, transmit the first higher priority data packet 230-*a* and autonomously transmit the deprioritized second data packet 230-*b* in accordance with the rescheduling configuration thereby reducing the amount of signaling between the UE 115-*a* and the base station 105-*a* for retransmission of the deprioritized second data packet 230-*b* to the receiving UE 115-*b* (e.g., by bypassing a request for a DG for retransmission). The UE 115-*a* may transmit first feedback 235-*a* or additionally second feedback 235-*b* for the first data packet 230-*a* and the second data packet 230-*b*, respectively. Thus, autonomous transmission may allow for low-latency recovery from deprioritization with reduced signaling overhead between the UE 115-*a* and the base station 105-*a*.

As will be described, FIGS. 3-12 described various techniques for enabling a UE to perform autonomous transmission or retransmission of a deprioritized message and which may resolve possible collisions of sidelink data packets having different priorities. That is, the techniques discussed herein may enable a transmitting UE to autonomously transmit or retransmit low priority packets whose transmission was skipped. The various implementations may be applicable to collisions caused by overlapping configured grants and dynamic grants for sidelink communications or access link communications, or both.

Figure 3A:
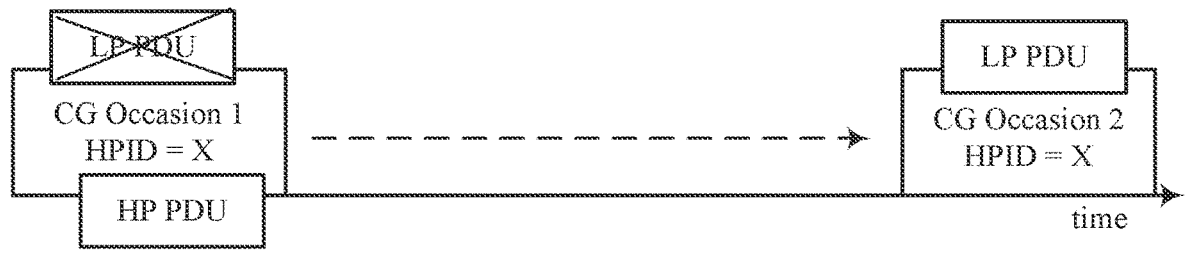
Figure 3B:
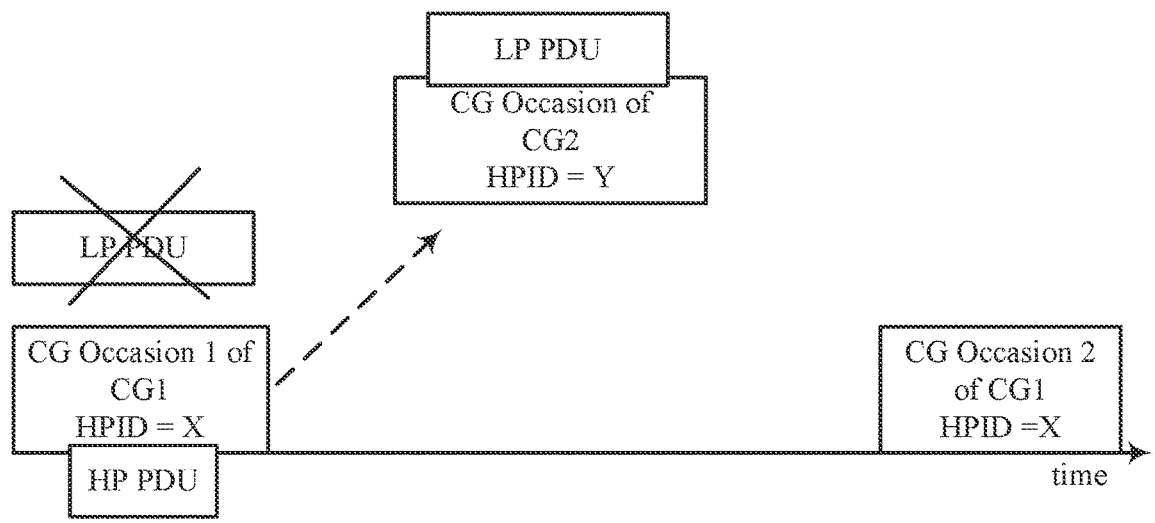

FIGS. 3A & 3B illustrate examples of a rescheduling configuration 301 and 302 that each support sidelink intra-UE prioritization in accordance with aspects of the present disclosure. Rescheduling configurations 301 and 302 may illustrate different implementations for a situation in which a UE (e.g., a UE 115 as described with reference to FIGS. 1 and 2) may have two data packets (e.g., MAC PDUs, TBs) for transmission on a same resource of a CG configuration, where the UE may implement prioritization between the data packets based on a respective priority of the data packets. The rescheduling configurations 301 and 302 may implement aspects of wireless communications system 100 and/or 200.

As discussed herein, a transmitting UE 115-*a* may be configured with a first CG configuration from a base station 105-*a* which may provide the transmitting UE 115-*a* with a repeating set of CG occasions (e.g., CG Occasion 1, and CG Occasion 2), each of which may include a set of resources for transmitting a same data packet. A receiving UE 115-*b* may transmit feedback to the transmitting UE 115-*a* for each resource for each CG occasion, indicating whether the associated packet was successfully received in a respective resource of the set of resources.

As illustrated in FIG. 3A, at a given time, the transmitting UE 115-*a* may have a high priority data packet (e.g., PDU) and a low priority data packet available for transmission to a receiving UE 115-*b*. For example, both the high and low priority data packets may be available for transmission before CG occasion 1 occurs. For example, the transmitting UE 115-*a* may be generally in the midst of transmitting a set of lower priority data packets and may receive a higher priority data packet before transmission of a next lower priority data packet of the set. The transmitting UE 115-*a* may thus have two data packets for transmission during a next resource of a configured grant occasion. However, according to Mode 1 communications, one data packet may be transmitted during a resource of a configured grant occasion and, thus both data packets may contend for the CG occasion 1 resources. Conventionally, high priority traffic is prioritized, and low priority traffic is flushed from a HARQ buffer of the transmitting UE 115-*a*, or the transmitting UE 115-*a* sends PUCCH-NACK to base station 105-*a* for requesting a dynamic grant for scheduling a retransmission of the low priority traffic.

As described herein, the transmitting UE 115-*a* may transmit the higher priority (HP) PDU during the CG Occasion 1, and may deprioritize the lower priority (LP) PDU for transmission during CG Occasion 2 instead of flushing the LP PDU out of the transmission buffer of the transmitting UE 115-*a*.

When a transmission of a lower priority packet is skipped due to conflict with transmission of a higher priority packet, the base station 105-a may configure the transmitting UE 115-a with a rescheduling configuration that configures the transmitting UE 115-a to autonomously transmit the de-prioritized lower priority packet (e.g., PDU) as a new transmission in a CG resource from the same CG configuration using same HARQ process identifier. For example, in FIG. 3A, the transmitting UE 115-a may transmit a first transmission that includes first control information and HP PDU in CG Occasion 1. The first control information (e.g., SCI) may include the HARQ Process Identifier (HPID) associated with CG occasion 1 (e.g., HPID=X) of a particular configured grant configuration. As depicted in FIG. 3A, the transmitting UE 115-a may skip transmission of the LP PDU in CG Occasion 1 due to conflict with the HP PDU. The transmitting UE 115-a may transmit a second transmission that includes second control information and LP PDU in CG Occasion 2 of the same CG configuration. The LP PDU may be transmitted as a new transmission in a CG resource from the same CG configuration using same HARQ process identifier. For example, the transmitting UE 115-a may transmit the LP PDU in CG Occasion 2 using a CG resource from the same CG configuration as the HP PDU transmitted in CG Occasion 1, and the second control information may include the same HARQ process identifier (e.g., HPID=X) for CG Occasion 2 as used for CG Occasion 1. In some examples, if the first available CG resource (e.g., in CG Occasion 2) does not satisfy UE internal timelines, the transmitting UE 115-a may skip to a next or later CG Occasion of the same CG configuration for transmitting the LP PDU that includes the same HARQ process identifier. In some examples, the transmitting UE 115-a may be configured by RRC signaling which may enable or disable this type of autonomous rescheduling (e.g., enable or disable the rescheduling configuration).

In some examples, the transmitting UE 115-a may use a same HARQ process (e.g., a same HARQ ID) for transmitting feedback associated with the deprioritized (e.g., rescheduled) LP PDU as was associated with the LP PDU before deprioritization. For example, a HPID=X may be shared between different CG occasions to facilitate autonomous retransmission and the deprioritized LP PDU may be transmitted on the next available CG occasion.

In the example, of FIG. 3B, the transmitting UE 115-a may autonomously transmit a de-prioritized PDU as a new transmission in a CG resource from any allowed CG configuration using any HARQ process determined by the transmitting UE 115-a. A HARQ ID may be shared between different CG occasions to facilitate re-transmission, and the transmitting UE 115-a may transmit an LP PDU on a next configured grant occasion (CGO) from any allowed configuration. For example, as illustrated in FIG. 3B, a transmitting UE 115-a may be configured with multiple configured grant configurations. For instance, UE 115-a may be configured with a first CG configuration (CG1) including a first CG occasion associated with a HARQ process ID (e.g., HPID=X) and a second CG configuration (CG2) including a first CG occasion associated with a HARQ process ID (e.g., HPID=Y). That is, the transmitting UE 115-a may receive, from the base station 105-a, CG configurations for CG1 and CG2 and may be configured to transmit during CG1 occasion 1 using HPID=X.

Similarly to FIG. 3A, the transmitting UE 115-a may have a high priority data packet (e.g., HP PDU) and a low priority data packet (e.g., LP PDU) available for transmission to a receiving UE 115-b that are scheduled for transmission in a same resource of a CG occasion of CG1. In such examples, the UE 115-a may transmit the HP PDU during the CG Occasion 1 of CG1 using HPID=X (e.g., SCI transmitted with the HP PDU includes HPID=X) and may deprioritize transmission of the LP PDU as shown by the dotted arrow of FIG. 3B. The UE 115-a may transmit the LP PDU according to the rescheduling configuration during a next CG occasion of the second CG configuration, CG2, using the HPID=Y (e.g., SCI transmitted with the LP PDU includes HPID=Y) associated with the next CG occasion of the second CG configuration. In some examples, the transmitting UE 115-a may use any available HARQ process (e.g., HPID=Y) as determined by the UE 115-a for communicating feedback associated with the LP PDU. For example, the deprioritized LP PDU may be transmitted on the next CG occasion from any allowed configuration.

In some examples, the transmission of HP PDU may be successful during CG Occasion 1 of CG1 and CG Occasion 2 may remain unused. In some other examples, the transmission of HP PDU may be unsuccessful during CG Occasion 1 of CG1 and CG Occasion 2 of CG2 may be used for the retransmission of the HP PDU using the same HARQ process ID (e.g., HPID=X) as the transmission in CG Occasion 1 of CG1.

Figure 4:
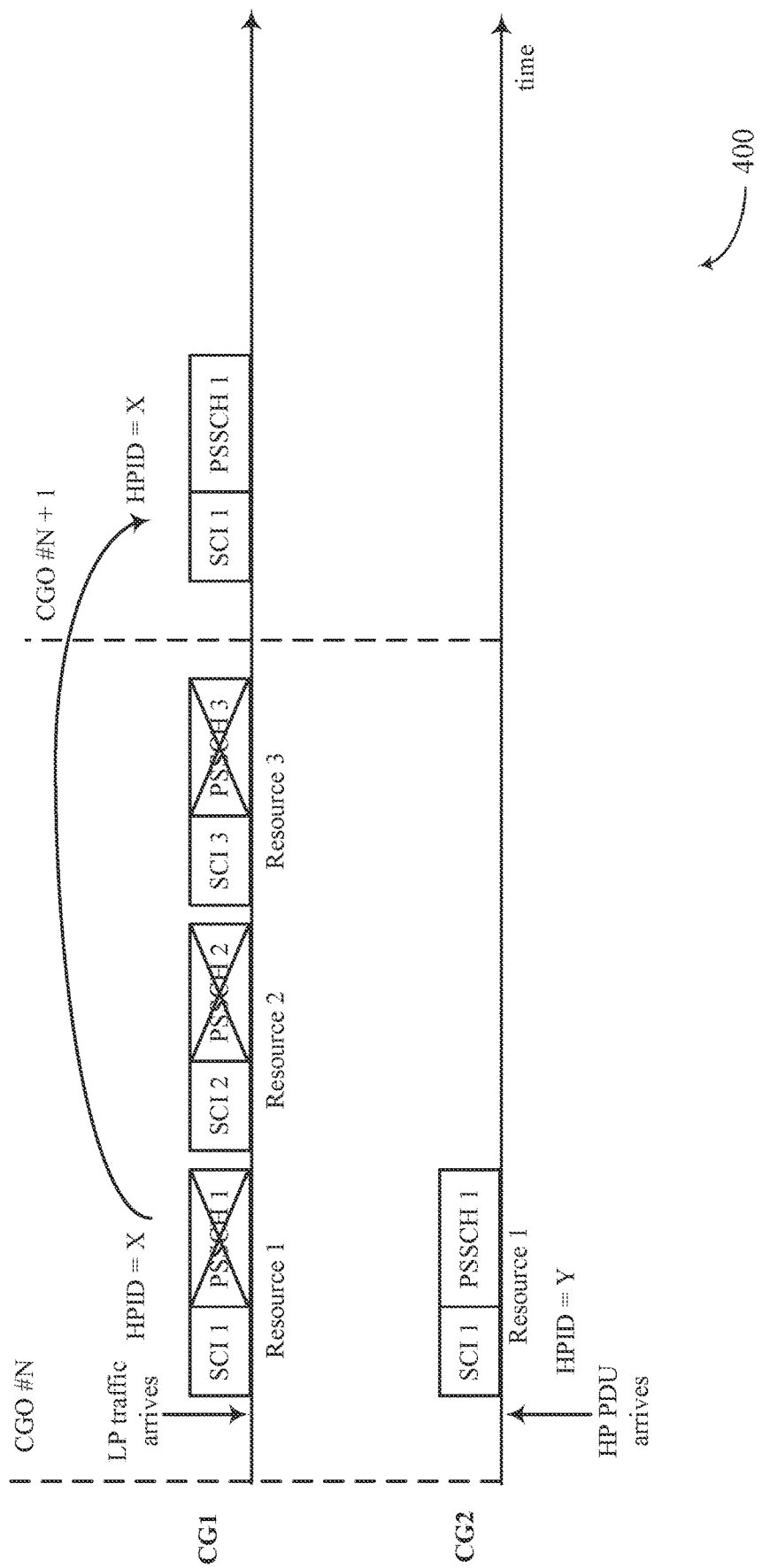

FIG. 4 illustrates an example of a rescheduling configuration 400 that supports sidelink intra-UE prioritization in accordance with aspects of the present disclosure. Rescheduling configuration 400 may demonstrate a situation in which a first resource of a first CG configuration for transmitting a lower priority PDU overlaps with a first resource of a second CG configuration for transmitting a higher priority PDU, where a UE (e.g., a UE 115 as described with reference to FIGS. 1 and 2) may implement prioritization between the data packets based on a respective priority of the data packets. That is, the second configured grant configuration may have a higher priority than another configured grant configuration, a first transmission in the second configured grant over a first resource may be successful, and a second or additionally a third resource of the second may not be overlapping with other CG resources. The rescheduling configuration 400 may implement aspects of wireless communications system 100 and/or 200.

As depicted in FIG. 4, a transmitting UE 115-a may be configured with a rescheduling configuration 400 to autonomously transmit a de-prioritized PDU as a new transmission in a CG resource from the same CG configuration using same HARQ process as the deprioritized CG configuration.

In an example, a transmitting UE 115-a may be configured with a first CG configuration (e.g., CG1) and with a second CG configuration (e.g., CG2). In some cases, a resource from the CG1 configuration may overlap or partially overlap with a resource from the CG2 configuration. For example, Resource 1 of the CG1 configuration may overlap with Resource 1 of the CG2 configuration. In some instances, the arrival of higher priority traffic associated with HPID=Y and scheduled for transmission using resources (e.g., Resource 1) of CG2 may conflict with lower priority traffic associated with HPID=X and scheduled for transmission using resources (e.g., Resource 1) of CG1. That is, the LP PDU and the HP PDU may arrive or be received by the transmitting UE 115-a at a same or similar time such that transmission of the HP PDU and the LP PDU may be scheduled during overlapping resources associated with different CG configurations.

The transmission of the HP PDU using HPID=Y in the SCI in Resource 1 of CG2 may be successful, and as shown, Resource 2 or Resource 3 of CG1 may not be overlapping with other CG resources. Due to the conflict in Resource 1, the rescheduling configuration 400 may indicate that the UE 115-a may autonomously transmit the de-prioritized LP PDU as a new transmission in a next available CG occasion resource from the same CG configuration, as depicted by the arrow of FIG. 4, using the same HARQ process identifier. For example, the transmitting UE 115-a may have been scheduled to transmit LP PDU in PSSCH 1 of Resource 1 of CG1 with HPID=X in control information (e.g., SCI 1) during CGO #N.

Because the LP PDU is deprioritized, the rescheduling configuration 400 may indicate that the UE 115-a may transmit the de-prioritized LP PDU as a new transmission in a subsequent CG occasion of CG1 (e.g., in CG occasion (CGO) N+1 of the same CG configuration, CG1) using the same HARQ process identifier (e.g., HPID=X). That is, the UE 115-a may transmit the new transmission including control information (e.g., SCI 1 of CGO #N+1) that includes the HARQ process identifier (e.g., HPID=X) initially associated with CGO #N of CG1, even though the new transmission is being sent in one or more resources of CGO #N+1. When, the deprioritized LP PDU is transmitted using autonomous rescheduling using the same CG configuration and using the same HARQ ID, PSSCH payloads of Resources 1, 2, and 3 of CGO #N may remain unused due to the deprioritization of the LP PDU. In some examples, SCI 1, SCI 2, and SCI 3 of CGO #N may or may not include control information despite deprioritization.

In some examples, the first available CG1 occasion (e.g., CGO N+1) may not satisfy one or more internal timelines at the transmitting UE 115-a, and the UE 115-a may delay the new transmission that includes the deprioritized LP PDU until a next or later CG occasion (e.g., CGO N+2) of CG1 (e.g., the same CG configuration) for transmitting the new transmission that includes the deprioritized LP PDU and includes the same HARQ process identifier. In some examples, the transmitting UE 115-a may be configured by RRC signaling which may enable or disable this type of autonomous rescheduling (e.g., enable or disable the rescheduling configuration).

Such implementations may also be applicable to situations in which a possible conflict (e.g., a scheduled conflict) occurs over a same CG, as discussed with reference to FIG. 3. For example, the implementation of FIG. 4 may be applicable to the examples depicted with reference to FIG. 3. In some examples, rescheduling configuration 400 may result in some resources not being used, for example, Resource 2 and/or Resource 3 even if Resource 2 and/or Resource 3 are not overlapping with an active higher priority pending transmission because, in some example, the UE 115-a may have attempted a transmission on Resource 2 and/or Resource 3, but conventionally, transmission on a next CG occasion is prohibited. For example, the deprioritization of a first resource may cause the deprioritization of all resources of the CG occasion. Other options that may reuse later Resources that are not overlapping with an active higher priority pending transmission are discussed below with reference to FIGS. 5-6.

Figure 5:
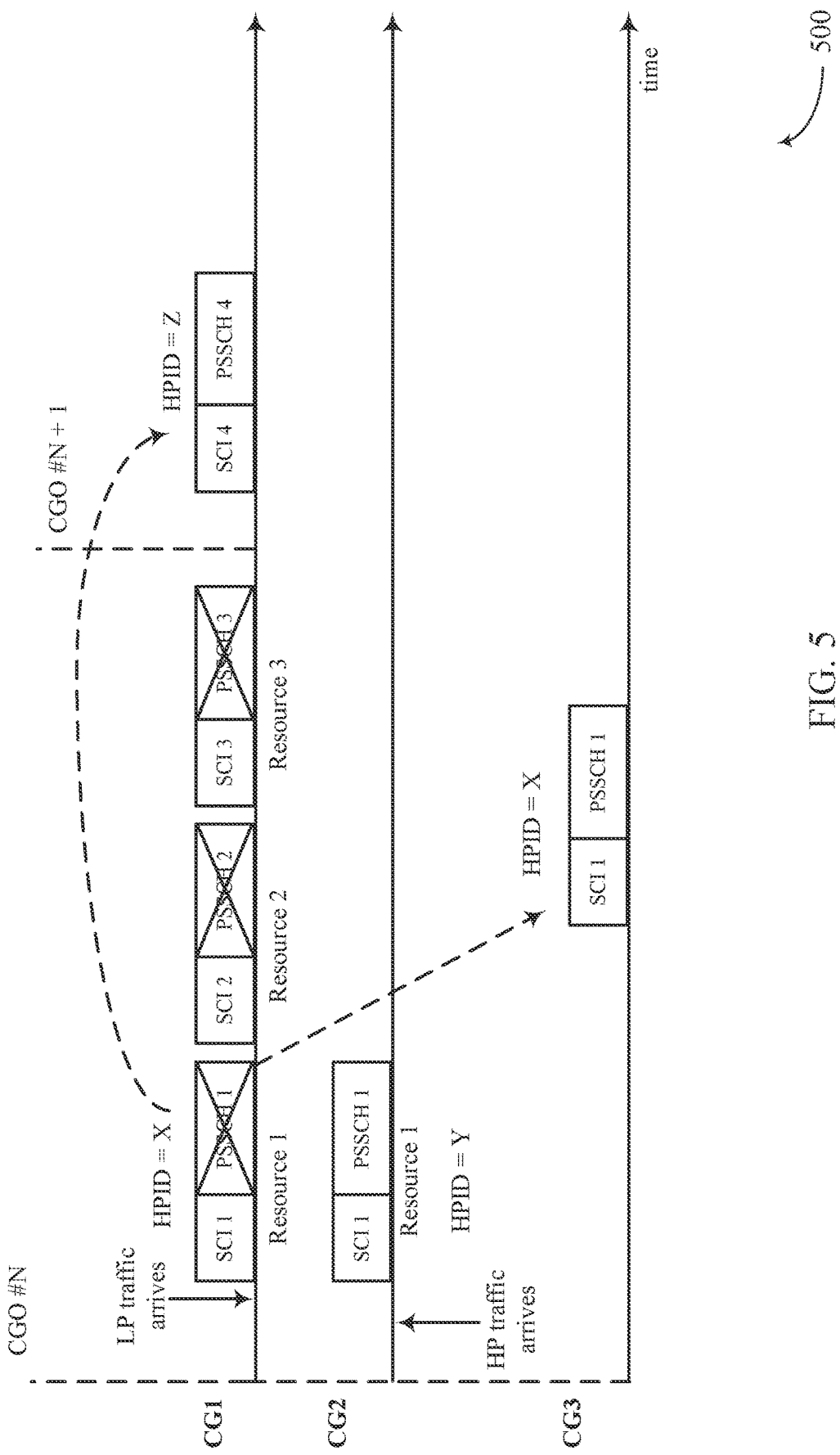

FIG. 5 illustrates an example of a rescheduling configuration 500 that supports sidelink intra-UE prioritization in accordance with aspects of the present disclosure. Rescheduling configuration 500 may demonstrate a situation in which a first resource of a CG for transmitting a lower priority PDU overlaps with a first resource of a second CG for transmitting a higher priority PDU, where a UE (e.g., a UE 115 as described with reference to FIGS. 1 and 2) May Implement Prioritization Between the data packets based on a respective priority of the data packets. The rescheduling configuration 500 may implement aspects of wireless communications system 100 and/or 200.

A transmitting UE 115-a may be configured with a first CG configuration (e.g., CG1), a second CG configuration (e.g., CG2), and a third CG configuration (e.g., CG3). In the example of FIG. 5, Resource 1 of CG1 may overlap with Resource 1 of CG2. In some instances, higher priority traffic scheduled for transmission using resources of CG2 may conflict with transmission of lower priority traffic scheduled for transmission using resources of CG1. In some cases, the transmission of the HP PDU in Resource 1 of CG2 may be successful.

When transmission of the HP PDU in Resource 1 of CG2 is successful, the rescheduling configuration 500 may indicate that the transmitting UE 115-a may autonomously transmit the de-prioritized LP PDU as a new transmission in any available CG occasion using any available HARQ process. In a first example, the transmitting UE 115-a may autonomously transmit the de-prioritized LP PDU as a new transmission in a different CG occasion of the same CG configuration using a different HARQ process identifier. For example, the transmitting UE 115-a may have been initially scheduled to transmit, in Resource 1 of CGO #N of CG1, a transmission that includes the LP PDU in PSSCH 1 and control information (e.g., SCI 1) that indicates HPID=X. When transmission of the HP PDU is successful, the rescheduling configuration 500 may indicate that the UE 115-a may transmit the de-prioritized LP PDU as a new transmission in a different CG occasion (e.g., in CG occasion (CGO) N+1) of the same configured grant configuration (e.g., CG configuration, CG1) using a different HARQ process identifier (e.g., HPID=Z).

In a second example, the transmitting UE 115-a may autonomously transmit the de-prioritized LP PDU as a new transmission in a same CG occasion using a same HARQ process identifier. For instance, when transmission of the higher HP PDU is successful, the rescheduling configuration 500 may indicate that the UE 115-a may transmit the de-prioritized LP PDU as a new transmission in the same CG occasion as Resource 1 of CG1 (e.g., in CG occasion (CGO) N), but using a different configured grant configuration (e.g., CG configuration, CG3) and control information including the same HARQ process identifier (e.g., HPID=X). In this example, the same HARQ process identifier can be shared between different CG configurations to facilitate retransmissions (e.g., CG1 and CG3 share HPID=X).

Such implementations may also be applicable to situations in which a possible conflict (e.g., a scheduled conflict) occurs over a same CG, as demonstrated with reference to FIG. 3.

Figure 6:
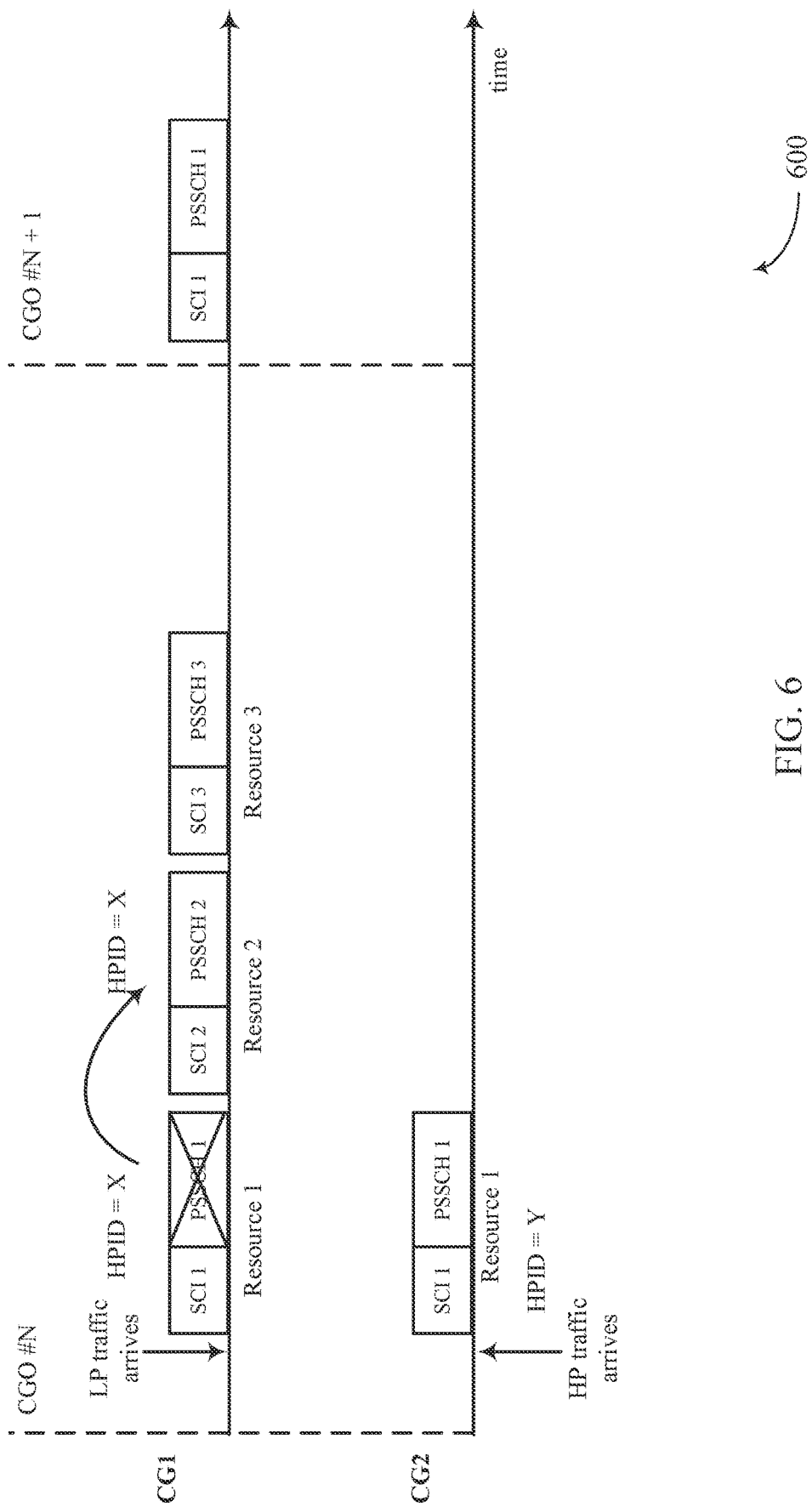

FIG. 6 illustrates an example of a rescheduling configuration 600 that supports sidelink intra-UE prioritization in accordance with aspects of the present disclosure. Rescheduling configuration 600 may demonstrate a situation in which at least a first resource of a CG for transmitting a lower priority PDU overlaps with a first resource of a second CG for transmitting a higher priority PDU, where a UE (e.g., a UE 115 as described with reference to FIGS. 1 and 2) may implement prioritization between the data packets based on a respective priority of the data packets. The rescheduling configuration 600 may implement aspects of wireless communications system 100 and/or 200.

A transmitting UE 115-a may be configured with a first CG configuration (e.g., CG1) and with a second CG configuration (e.g., CG2). In the example of FIG. 6, Resource 1 of CG1 may overlap with Resource 1 of CG2. In some instances, higher priority traffic scheduled for transmission using resources of CG2 may conflict with transmission using lower priority traffic scheduled for transmission using resources of CG1. In some cases, the transmission of the HP PDU in Resource 1 of CG2 may be successful and there may be unused, non-conflicting resources available of CG1 that may be used for transmission of the LP PDU that occur sooner than a next CG occasion.

For example, CGO N of CG2 may be allocated for transmission of a relatively higher priority PDU than CGO N of CG1, thus the UE 115-a may transmit the HP PDU during Resource 1 of CG2 using HPID=Y of CGO N. In some cases, the transmission of the HP PDU in Resource 1 of CGO N of CG2 may be successful and as shown, Resource 2 and/or Resource 3 of CGO N of CG1 may not be overlapping with other CG resources and thus may be reused by the UE 115-a for autonomous rescheduling of deprioritized PDUs.

When transmission of the HP PDU is successful, the rescheduling configuration 600 may indicate that the transmitting UE 115-a may autonomously transmit the de-prioritized LP PDU as a new transmission in a later resource of the same CG occasion (e.g., Resource 2 or additionally Resource 3 of CGO N of CG1) that does not overlap with a higher priority PDU transmission of another CG (or, for example, retransmission using another CG). For example, the transmitting UE 115-a may autonomously transmit the deprioritized LP PDU using a same HARQ process identifier (e.g., HPID=X). For example, the transmitting UE 115-a may have been initially scheduled to transmit in Resource 1 of CGO #N of CG1, a transmission that includes the LP PDU in PSSCH 1 and control information (e.g., SCI 1) that indicates HPID=X. When transmission of the HP PDU is successful in Resource 1 of CG2, the rescheduling configuration 600 may indicate that the UE 115-a may transmit the de-prioritized LP PDU as a new transmission over a next available resource of the same CGO N of CG1 (e.g., Resource 2 or Resource 3 of CG1) using the same HARQ process identifier (e.g., HPID=X) rather than waiting for a subsequent CG occasion (e.g., CG occasion #N+1) to transmit the deprioritized LP PDU as discussed with reference to FIG. 4.

That is, the UE 115-a may transmit the new transmission including SCI that includes the HARQ process identifier initially associated with CGO #N Resource 1 of CG1, even though the new transmission may be transmitted in one or more other resources of CGO #N. In some examples, autonomous transmission in a same CG occasion may be enabled or disabled according to a capability of the transmitting UE 115-a.

In some examples, the first available CG1 resource (e.g., Resource 2 or Resource 3 of CG occasion #N) may not satisfy one or more internal timelines at the UE 115-a. For example, the UE 115-a may delay the new transmission that includes the deprioritized LP PDU until a next CG occasion (e.g., CGO N+1) of CG 1 (e.g., the same CG configuration) for transmitting the new transmission. In some examples, the transmitting UE 115-a may be configured by RRC signaling which may enable or disable this type of autonomous rescheduling (e.g., enable or disable the rescheduling configuration).

Such implementations may be generally applicable to situations in which a possible conflict (e.g., a scheduled conflict) occurs over multiple CGs, as demonstrated with reference to FIGS. 4 and 5 and may enable a transmitting UE 115-a to efficiently utilize non-overlapping resources of a deprioritized CG configuration. That is, partial overlap of a CG may not cause all resources of the CG to remain unused.

Figure 7A:
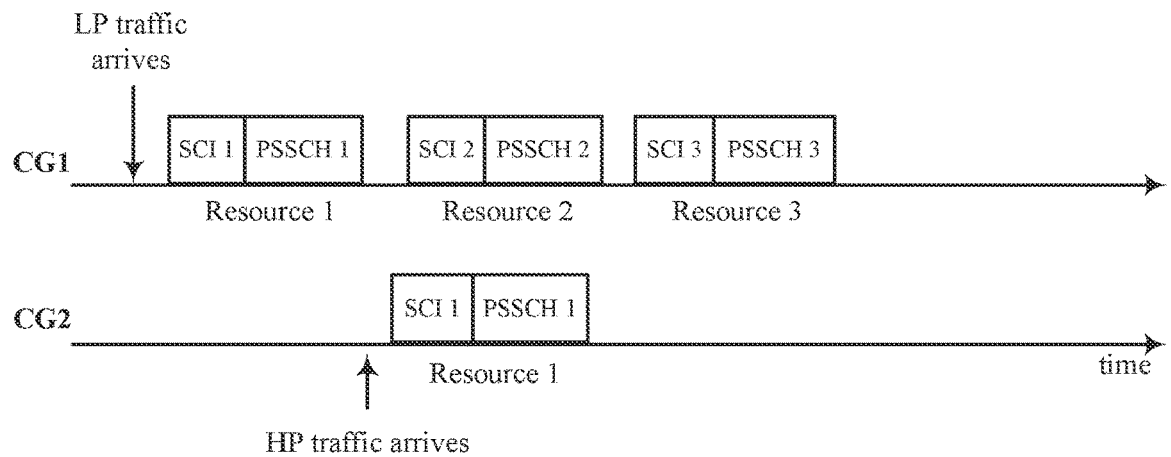
Figure 7B:
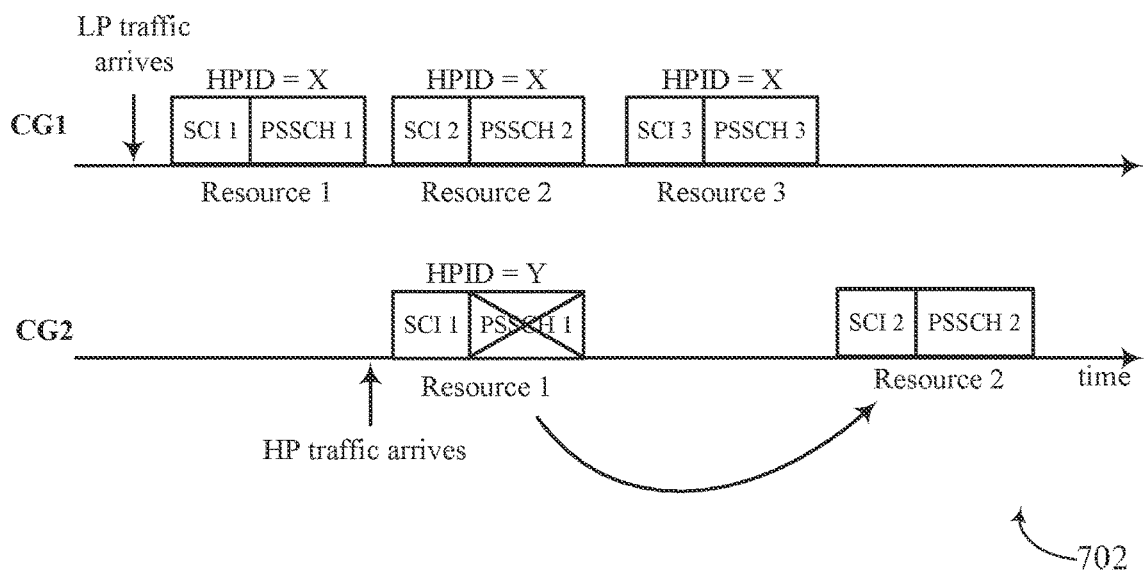

FIGS. 7A & 7B may illustrate examples of a rescheduling configuration 701 and 702 that each support sidelink intra-UE prioritization in accordance with aspects of the present disclosure. Rescheduling configurations 701 and 702 may each demonstrate a situation in which a UE (e.g., a UE 115 as described with reference to FIGS. 1 and 2) may have initiated transmission of a first data packet over a first CG and may receive a second data packet (e.g., MAC PDUs, TBs) for transmission on a second CG that overlaps with the first CG, where the UE may implement prioritization between the data packets based on a respective priority of the data packets. The rescheduling configurations 701 and 702 may implement aspects of wireless communications system 100 and/or 200.

A transmitting UE 115-a may be configured with a first CG configuration (e.g., CG1) and with a second CG configuration (e.g., CG2). The transmitting UE 115-a may be scheduled to transmit in Resource 1 of CGO #N of CG1, a transmission that includes the LP PDU in PSSCH 1 and control information (e.g., SCI 1) and Resource 2 of CG1 may overlap with Resource 1 of CG2. That is, the transmitting UE 115-a may initiate a transmission of a lower priority data packet (e.g., may have transmitted the data packet during a first resource of a CG occasion) and may receive a higher priority data packet (e.g., PDU) for transmitting to a receiving UE 115-b during an overlapping CG occasion.

As shown in FIGS. 7A & 7B, the transmitting UE 115-a may transmit the LP PDU during Resource 1 of CG1 and the UE may receive the HP PDU for transmission during Resource 2 of CG2.

In a first example demonstrated by FIG. 7A, the transmission of LP PDU during Resource 1 of CG1 may be successful. In such examples, the rescheduling configuration 701 may indicate that the transmitting UE 115-a deprioritize the CG occasion of CG2 because Resource 2 of CG1 collides with Resource 1 of CG2 and may prioritize CG1. In such examples, the transmitting UE 115-a may wait for another CG occasion of CG2 to transmit the HP PDU, which may result in an unnecessary delay of the HP PDU (e.g., causing increased latency). That is, if a resource of an active CG occasion (e.g., a CG occasion in which a transmission has occurred) for transmitting a first PDU collides with the first CG resource of another CG occasion for transmitting a second PDU, then the active CG resource is prioritized regardless of a respective priority of the PDUs.

For example, CG2 may be activated (e.g., used for transmission) if the CG1 occasion is skipped altogether (e.g., the transmitting UE 115-a refrains from transmitting on each of Resources 1, 2, and 3 of the CG occasion of CG1, but if the UE 115-a transmits the LP PDU using Resource 1 then the HP PDU may not be transmitted on the occasion of CG2 due to the conflict even if the occasion of CG2 has one or more non-overlapping resources, causing a delay for HP traffic.

In a second example demonstrated by FIG. 7A, to mitigate the delay of the HP PDU transmission, the UE may instead be configured by the rescheduling configuration to transmit on the overlapping Resource 1 of CG2 if the transmission of the LP PDU is successful in Resource 1 of CG1. That is, if an active CG configuration resource (e.g., Resource 2 of CG1) is skipped due to a physical sidelink feedback channel (PSFCH) acknowledgment (ACK) (e.g., a successful transmission of the LP PDU in Resource 1 of CG1) or due to having no MAC PDU for transmission, the UE may autonomously transmit the HP PDU during an overlapping CG configuration (e.g., CG2).

For example, if resources of an active CG configuration remain unused due to a successful first transmission (e.g., Resources 2 and 3 of CG1 are unused since transmission on Resource 1 of CG1 is successful), the transmitting UE 115-a may transmit on a different CG configuration during an overlapping CG resource. That is, the rescheduling configuration 701 may indicate that the transmitting UE 115-a is to deprioritize Resource 2 of CG1 even though CG1 is active and may prioritize CG2. When transmission of the LP PDU during Resource 1 of CG1 is successful, the rescheduling configuration 701 may indicate that the UE 115-a is to transmit the HP PDU during Resource 1 of CG2, even though Resource 1 of CG2 overlaps with resources of an active CG configuration. As such, the transmitting UE 115-a may skip the remaining resources (e.g., Resource 2 and Resource 3) of the CG occasion of CG1 and may autonomously transmit the HP PDU according to the rescheduling configuration 701.

Alternatively or additionally, as shown in FIG. 7B, the transmission of LP PDU during Resource 1 of CG1 may be unsuccessful. In such examples, the rescheduling configuration 702 may indicate that the transmitting UE 115-a deprioritize Resource 1 of the CG occasion of CG2 because Resource 2 of CG1 collides with Resource 1 of CG2 and may prioritize CG1 for retransmission of the LP PDU. That is, retransmission of a failed PDU may be prioritized over a new transmission of a second PDU irrespective of a priority of the PDUs.

The transmitting UE 115-a may transmit the LP PDU during Resource 1 of CG1. For example, the transmitting UE 115-a may transmit the LP PDU over PSSCH 1 and may transmit associated control information including the HPID of the LP PDU (e.g., HPID=X) using SCI1. In such examples, the transmission of the LP PDU may be unsuccessful and the transmitting UE 115-a may transmit the LP PDU using Resource 2 or additionally Resource 3 of CG1 using the same HARQ process ID (e.g., HPID=X). In such examples, the transmission of the deprioritized traffic may be rescheduled according to one or more of the rescheduling configurations as described herein (e.g., with reference to FIGS. 4-6). That is, the transmitting UE 115-a may be initially scheduled to transmit the HP PDU using the PSSCH and the associated HPID (e.g., HPID=Y) using the SCI1 of Resource 1 of CG2. However, according to the rescheduling configuration 702, the UE 115-a may deprioritize Resource 1 of CG2 and may transmit the HP PDU using Resource 2 or 3 of the CG occasions of CG 2, or using a different available CG configuration with a same or different HPID (e.g., HPID=Y or HPID=Z), or using a different CG occasion of CG2 using a same or different HPID (e.g., HPID=Y or HPID=Z).

Figure 7C:
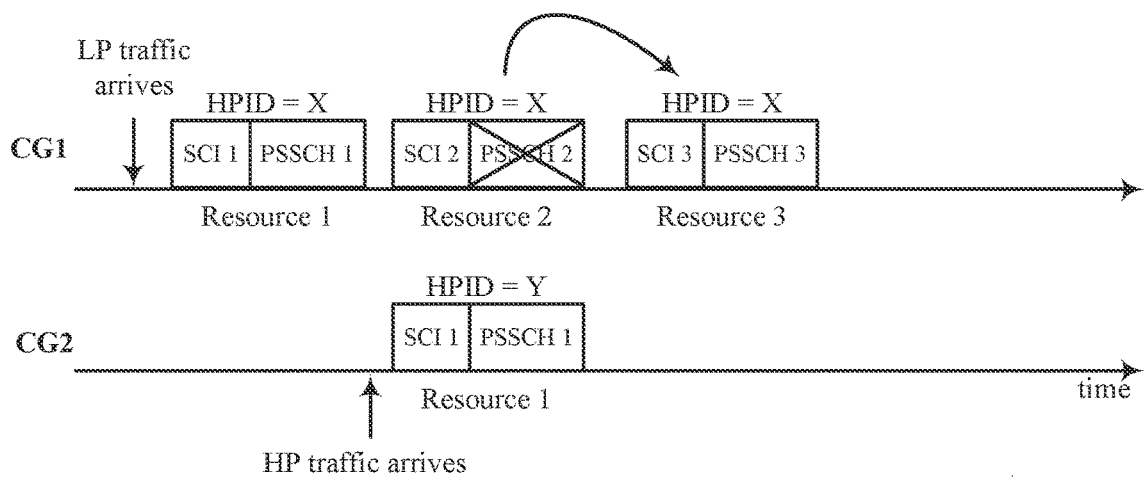

Alternatively or additionally, as shown in FIG. 7C, initial transmission of a second PDU may be prioritized over retransmission of a failed first PDU based on a priority of the PDUs. The transmitting UE 115-a may transmit the LP PDU during Resource 1 of CG1. For example, the transmitting UE 115-a may transmit the LP PDU over PSSCH 1 and may transmit associated control information including the HPID of the LP PDU (e.g., HPID=X) using SCI1. In such examples, the transmission of the LP PDU may be unsuccessful and the transmitting UE may reschedule transmission of the LP PDU according to one or more of the rescheduling configurations as described herein (e.g., with reference to FIGS. 4-6). That is, the transmitting UE 115-a may prioritize transmission of the HP PDU using PSSCH1 and the HPID of the HP PDU using the SCI1 of Resource 1 of CG2 even though Resource 1 of CG2 overlaps with a resource initially intended for retransmission of the LP PDU. According to the rescheduling configuration 703, the UE 115-a may deprioritize Resource 2 of CG1 and may transmit the HP PDU using Resource 1 of CG 2 and may transmit the LP PDU using Resource 3 of CG1 along with a same or different HPID (e.g., HPID=X or HPID=Z), or using a different available CG configuration along with a same or different HPID (e.g., HPID=X or HPID=Z), or using a different CG occasion of CG2 along with a same or different HPID (e.g., HPID=X or HPID=Z).

Figure 8:
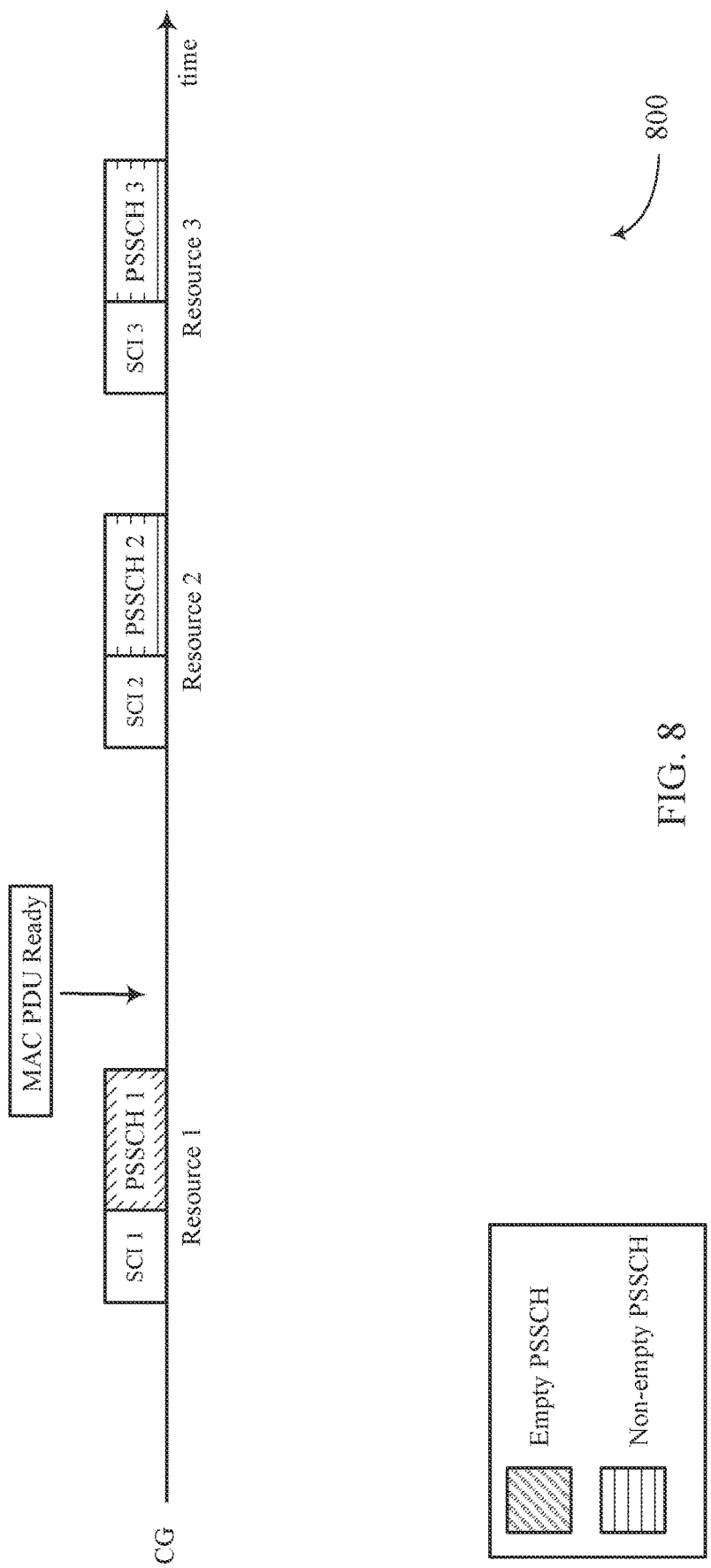

FIG. 8 illustrates an example of a rescheduling configuration 800 that supports sidelink intra-UE prioritization in accordance with aspects of the present disclosure. Rescheduling configuration 800 may demonstrate a situation in which no PDU is ready for transmission in a first resource of a CG occasion, where the TB carries some control information and includes padding bits to fill the TB, where a UE (e.g., a UE 115 as described with reference to FIGS. 1 and 2) may transmit a different PDU over later resources of the same CG occasion. The rescheduling configuration 800 may implement aspects of wireless communications system 100 and/or 200.

A transmitting UE 115-a may be configured with a CG configuration but may not have any data for sidelink transmission in a first resource of the CG occasion (e.g., Resource 1). In such examples, when no MAC PDU is ready for transmission, the transmitting UE 115-a may transmit the SCI1 including control information and may fill the PSSCH with padding bits (e.g., null bits, non-data bits) for transmission during Resource 1 of the CG. According to Mode 1 operations, the transmitting UE 115-a may transmit a single TB (e.g., including a PDU) during a CG occasion, however in some examples, the padding bits may not count as a PDU in terms of transmitting using other resources of the CG occasion. For example, the transmitting UE 115-a may transmit SCI1 including control information and PSSCH1 including padding bits and may receive a PDU after transmission of the effectively empty PSSCH of Resource 1 (or, for example, a skipped Resource 1), which may also be referred to as a dummy transmission and before the scheduled occurrence of Resource 2. In such examples, the transmitting UE 115-a may transmit the PDU during Resource 2 of the CG occasion. That is, the rescheduling configuration 800 may indicate that the transmitting UE 115-a may transmit a new PDU on later resources of a grant occasion if earlier resources have been skipped or carry an empty MAC PDU. For example, the transmitting UE 115-a may transmit a transmission in a PSSCH of Resource 2, PSSCH of Resource 3, or both, that includes a new message (e.g., a new MAC PDU) after sending a dummy transmission (e.g., empty MAC PDU with padding bits) PSSCH of Resource 1.

In such examples, the transmitting UE 115-a may selectively break the Mode 1 rule that the UE 115-a may transmit up to one TB (e.g., carrying a MAC PDU) at most per CG configuration occasion. A MAC layer of the transmitting UE 115-a may track the payload of each transmitted TB to determine whether previous resources are padded or contain data (e.g., a PDU) to implement the rescheduling configuration 800.

Figure 9:
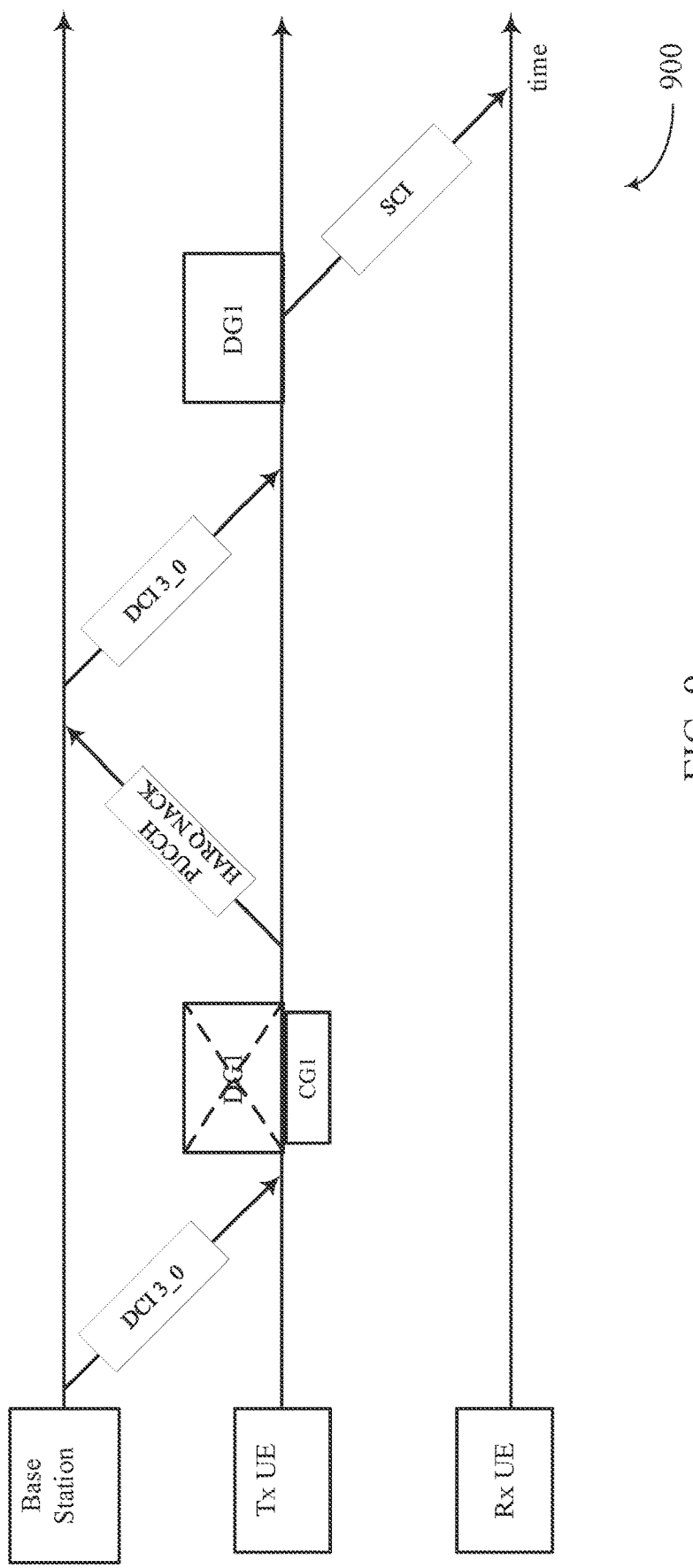

FIG. 9 illustrates an example of a rescheduling configuration 900 that supports sidelink intra-UE prioritization in accordance with aspects of the present disclosure. Rescheduling configuration 900 may demonstrate a situation in which a sidelink CG for transmitting a first data packet at least partially overlaps with a sidelink DG for transmitting a second data, where a UE (e.g., a UE 115 as described with reference to FIGS. 1 and 2) may implement prioritization between the data packets based on a respective priority of the data packets or based on the type of grant. The rescheduling configuration 900 may implement aspects of wireless communications system 100 and/or 200.

A transmitting UE 115-*a* may be configured (e.g., by a base station 105 as described with reference to FIGS. 1 and 2) with a sidelink DG and a sidelink CG. In some examples, the sidelink DG is associated with a relatively lower priority than the sidelink CG and the lower priority DG has a conflict with the higher priority CG. In some examples, the DG is always prioritized and the CG may be rescheduled on a next CG occasion according to one or more implementations as described herein (e.g., with reference to FIGS. 3-6). In some other examples, the CG or the DG is prioritized according to logical channel priorities. For example, if the DG is deprioritized, the UE 115-*a* may transit a PUCCH carrying a HARQ NACK to the base station 105-*a* and the base station 105-*a* may schedule a retransmission on another DG which may be identified as a retransmission by both the base station 105-*a*, the transmitting UE 115-*a*, and the receiving UE 115-*b*.

In a first example, the transmitting UE 115-*a* may prioritize the DG over the CG regardless of the priorities of the associated PDUs. That is, when a resource allocated by a DG overlaps with a CG occasion, the rescheduling configuration 900 may indicate that the transmitting UE 115-*a* autonomously reschedule the CG data packet (e.g. a CG PDU) associated with the overlapping CG resources, for example, according to any combination of the implementations described herein (e.g., with reference to FIGS. 3-8 and 10-12) and may transmit a message scheduled by the DG during the allocated by the DG. For example, the transmitting UE 115-*a* may receive a DG (e.g., DCI) according to a DCI format (e.g., format 3_0) that schedules transmission of a dynamic message in a resource allocation that overlaps with a resource of CG1. In such examples, the UE 115-*a* may transmit the dynamic message using the resources of the DG1 and may reschedule transmission of a CG PDU associated with the overlapping CG1.

In some other examples, the transmitting UE 115-*a* may prioritize the DG and the CG based on their associated logical channel priorities. That is, when a DG occasion overlaps with a CG occasion, the rescheduling configuration 900 may indicate that the transmitting UE 115-*a* may autonomously reschedule the CG PDU associated when the grant having the higher priority, according to any combination of the implementations described herein. For example, the transmitting UE 115-*a* may receive DCI according to a DCI format (e.g., format 3_0) that schedules a DG1 having a first priority that overlaps with CG1 having a second priority that is higher than the first priority. In such examples, the UE 115-*a* may transmit the CG PDU using the resources of the CG1 and may transmit feedback (e.g., PUCCH carrying a HARQ NACK) to the base station 105-*a* indicating that the DG message scheduled by the DG was unsuccessfully transmitted. In such examples, the base station 105-*a* may transmit a second DCI (e.g., having the DCI format 3_0) including an untoggled new data indicator that indicates the transmission is not a new transmission and allocation a new resource of the sidelink channel for transmission of the DG message. In response to receiving the second DCI, the transmitting UE 115-*a* may transmit a transmission that includes SCI including the untoggled new data indicator and the deprioritized DG message to a receiving UE 115-*b*.

FIGS. 10A through 10D illustrate examples of a rescheduling configuration 1001, 1002, 1003, and 1004 that each supports sidelink intra-UE prioritization in accordance with aspects of the present disclosure. Rescheduling configurations 1001 and 1002 may each demonstrate a situation in which a UE (e.g., a UE 115 as described with reference to FIGS. 1 and 2) transmits feedback for a sidelink CG that at least partially overlaps with a sidelink CG or a sidelink DG. The rescheduling configurations 1001, 1002, 1003, and 1004 may implement aspects of wireless communications system 100 and/or 200.

Figure 10A:
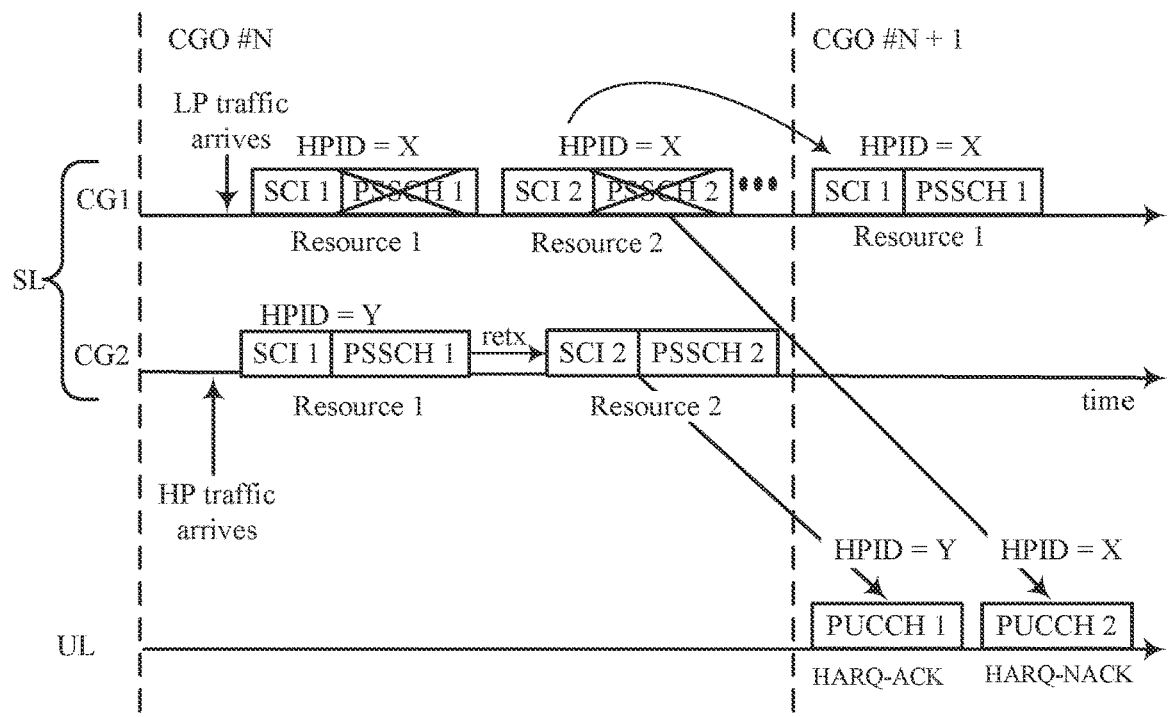

For example, as shown in FIG. 10A, a transmitting UE 115-*a* may receive a first grant (e.g., CG1 or DG1) and a second grant (e.g., CG2) that allocates one or more PUCCH resources (e.g., PUCCH 1 and PUCCH 2) for transmitting a feedback report to a base station 105-*a* indicating a status of PDUs transmitted during one or more previously occurring PSSCH corresponding to the first and second grants. The transmitting UE 115-*a* may transmit a feedback report in a PUCCH configured after the PSFCH associated with the last resource allocated for each CG occasion and may transmit a feedback report in a PUCCH configured after the PSFCH of the last resource scheduled by the DG.

In some examples, Mode 1 communications may implicate that when the UE 115-*a* transmits (e.g., over CG1, CG2, DG), the UE 115-*a* may transmit a feedback report to the base station 105-*a* including an ACK indicating successful reception of the TB at the receiving UE 115-*b* or a NACK indicating unsuccessful reception of the TB at the receiving UE 115-*b* (e.g., caused by a failed transmission/reception or caused by deprioritization). In some examples, the feedback report may include feedback for a number of different grants indicating whether all receiving UEs have received the TBs. For example, feedback for different grants may be multiplexed over a PUCCH occasion (e.g., there may be a number of different transmission and one feedback channel resource).

The feedback report may include a single bit indication to inform the base station 105-*a* of each of the successes or failures of a number of preceding sidelink transmissions for both the DG, and the CG occasion. In some examples, feedback may be configured separately for overlapping resources.

However, in some examples, CG2 may overlap with CG1 or a DG1 and one of the grants may be deprioritized and rescheduled according to any combination of the rescheduling configurations described herein. A rescheduled TB or PDU, however, may be identified by the transmitting UE 115-*a* as a failed TB and thus the transmitting UE 115-*a* may transmit a NACK to the base station even though the TB has been rescheduled instead of unsuccessfully transmitted.

In some examples, as shown with reference to FIG. 10A the transmitting UE 115-*a* may monitor for an LP PDU and an HP PDU for transmission during CGO #N of overlapping grants (e.g., CG1 and CG2). In such examples, the transmitting UE 115-*a* may deprioritize the LP PDU and may reschedule the LP PDU for transmission during CGO #N+1 using the initially assigned HPID=X. The UE 115-*a* may transmit the HP PDU during the PSSCH 1 or additionally PSSCH 2 and the associated HPID=Y during SCI 1 or additionally SCI 2 of CGO #N of CG2 and may transmit feedback associated with HPID=Y during PUCCH 1 indicating successful or unsuccessful transmission of the HP PDU. The transmitting UE 115-*a* may additionally transmit feedback associated with HPID=X during PUCCH 2 including a NACK indicating unsuccessful transmission of the LP PDU even though the LP PDU is rescheduled for transmission.

Figure 10B:
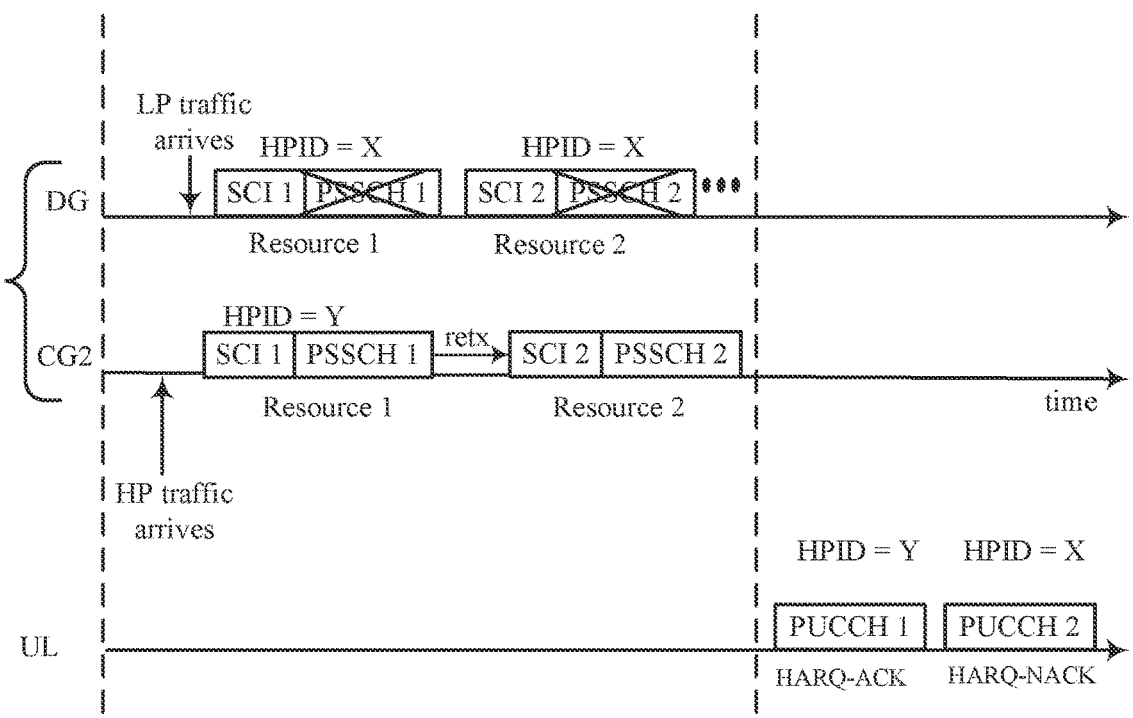

In some other examples, as shown with reference to FIG. 10B the transmitting UE 115-a may monitor for an LP PDU and an HP PDU for transmission during CGO #N of overlapping grants (e.g., DG and CG2). In such examples, the transmitting UE 115-a may deprioritize the LP PDU based on rescheduling configuration 1002. The UE 115-a may transmit the HP PDU during the PSSCH 1 or additionally PSSCH 2 and the associated HPID=Y during SCI 1 or additionally SCI 2 of CGO #N of CG2 and may transmit feedback associated with HPID=Y during PUCCH 1 indicating a successful transmission of the HP PDU. The transmitting UE 115-a may additionally transmit feedback associated with HPID=X during PUCCH 2 including a NACK indicating unsuccessful transmission of the LP PDU due to deprioritization.

Figure 10C:
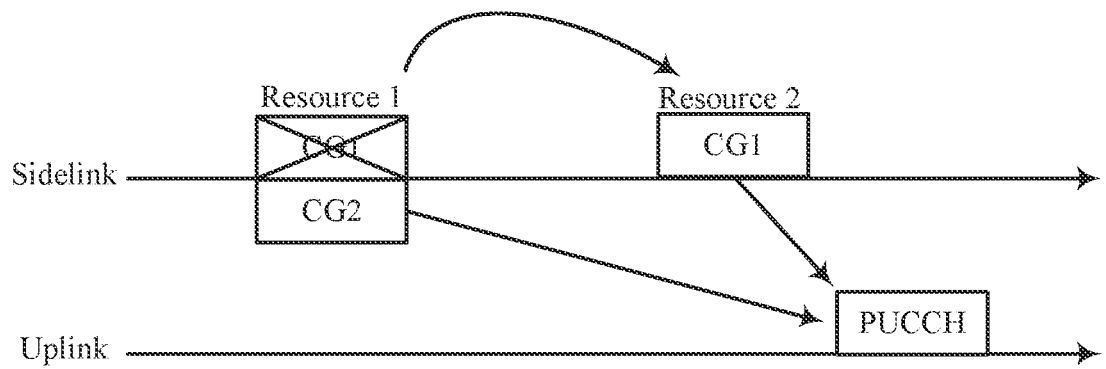

As shown with reference to FIG. 10C, the transmitting UE 115-a may transmit feedback for a rescheduled CG1 and a prioritized CG2 during a same PUCCH and in some examples, the base station 105-a may receive the NACK but may not be aware of whether the NACK is for the CG1 or the CG2 and may not distinguish whether the NACK was caused by deprioritization/rescheduling of the LP PDU or failure of the LP PDU. This may occur in examples where autonomous transmission/rescheduling occurs on Resource 2 of the CG1.

Figure 10D:
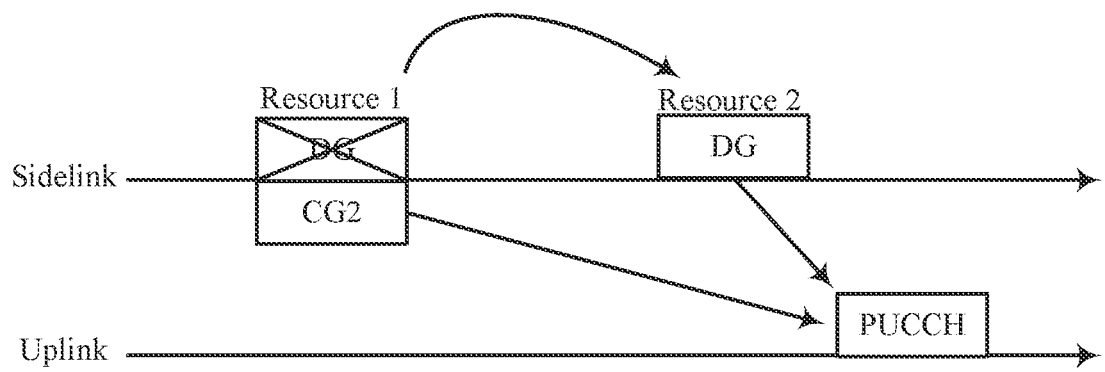

As shown with reference to FIG. 10D, in case of an overlapping DG, the base station 105-a may be unable to distinguish whether PUCCH NACK feedback for the DG means deprioritization or failure and may schedule a retransmission having a same HARQ ID (e.g., HPID=X) via DCI including a new data indicator that may not be toggled (e.g., indicating retransmission). In such examples, the transmitting UE 115-a and the receiving UE 115-b may identify that the transmission is a retransmission even if an initial transmission of the data packet on the DG was rescheduled (e.g., there has not yet been an attempt to decode). Further, if the transmitting UE 115-a transmits a feedback report including feedback for more than one grant (e.g., each scheduled with a PDU), the base station 105-a may be unable to distinguish which PDU failed and which (if any) was deprioritized. That is, the base station may allocate a new DG in either case, even if the transmitting UE 115-a is configured to autonomously reschedule the failed or deprioritized DG.

To increase efficiency in the situations described by FIGS. 10A through 10B, the transmitting UE 115-a may transmit feedback for PDUs associated with overlapping CGs during separate PUCCH occasions. That is, the transmitting UE 115-a may refrain from transmitting feedback from PDUs on overlapping CGs using a same PUCCH which may help the base station 105-a discern which PDUs failed or were deprioritized (if any).

In some examples, the transmitting UE 115-a may refrain from transmitting feedback for data packets that have been deprioritized. That is, the transmitting UE 115-a may transmit feedback for data packets that have been transmitted and may refrain from transmitting feedback for data packets that have been rescheduled which may avoid triggering a new DG from the base station 105-a. In some examples, if DG1 is deprioritized, the base station 105-a may allocate a new DG to the transmitting UE 115-a regardless of whether the UE reschedules the PDU initially scheduled for DG1 and the new DG may be unused. For example, the new DG may have a HARQ process dictated by the base station 105-a and the toggle status associated with the NDI of the new DG may also be dictated by the base station 105-a.

Figure 11:
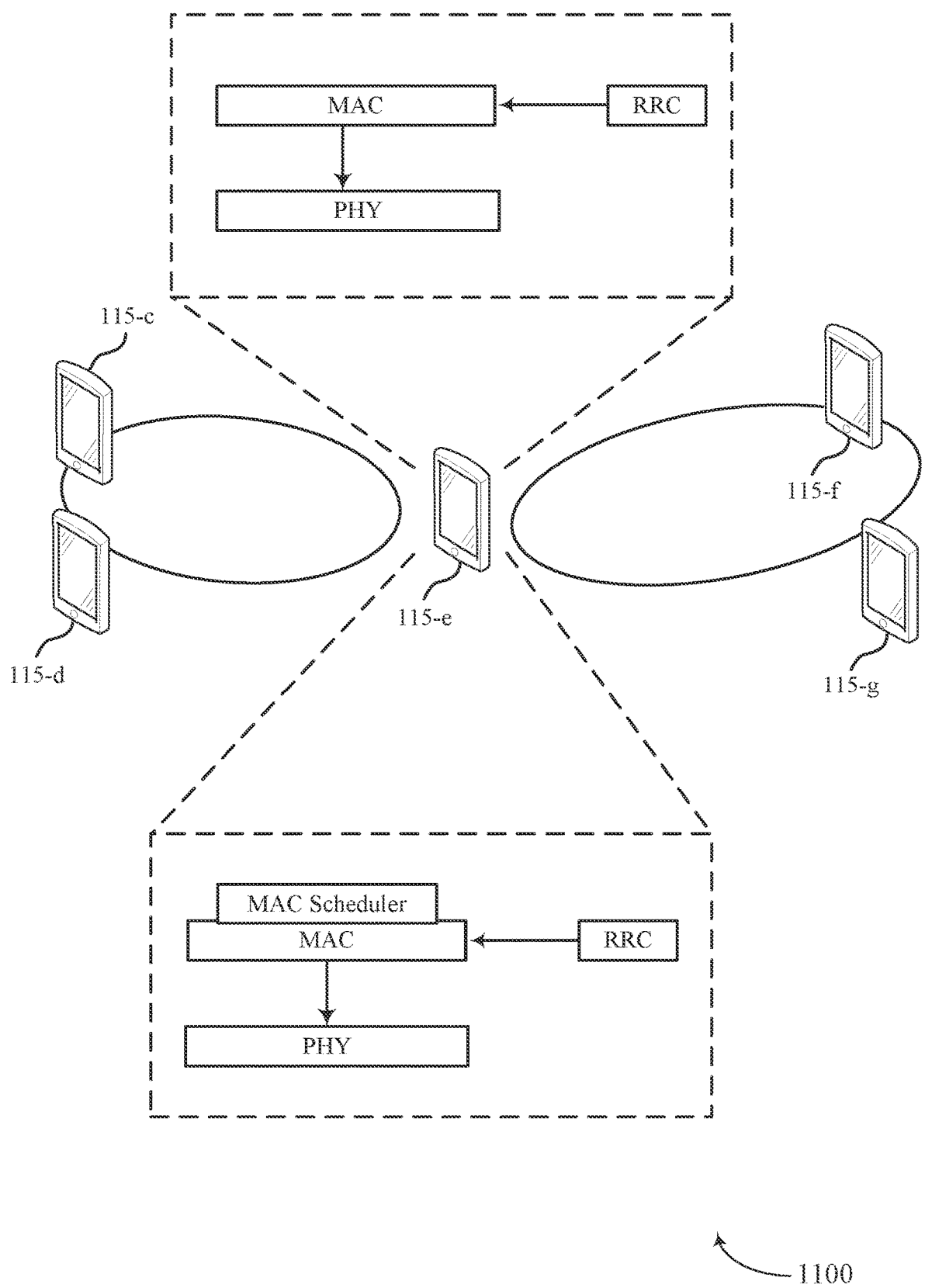
Figure 12:
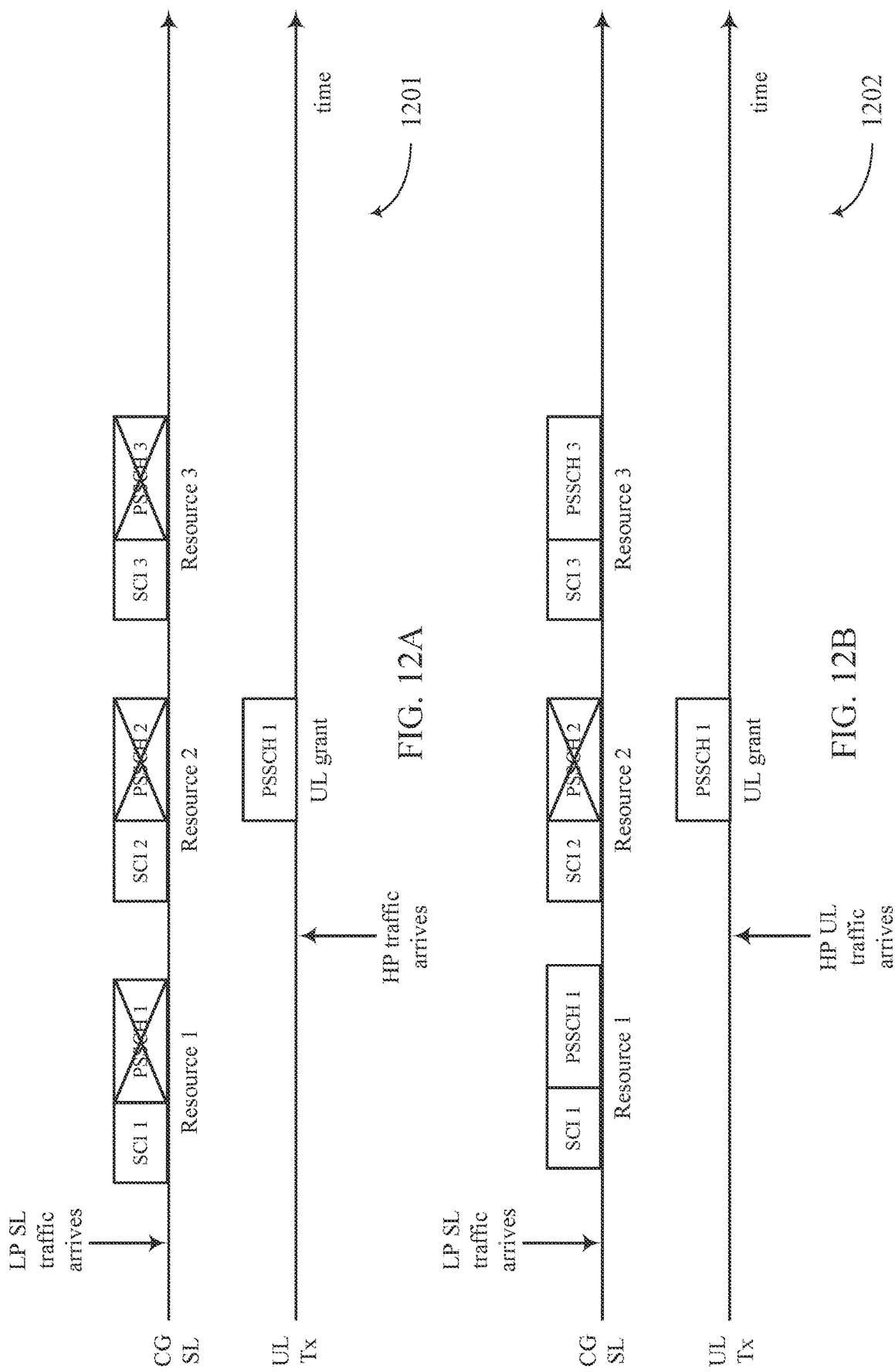

FIG. 11 illustrates an example of a rescheduling configuration 1100 that supports sidelink intra-UE prioritization in accordance with aspects of the present disclosure. Rescheduling configuration 1100 may demonstrate a situation in which four CGs each associated with a receiving UE (e.g., up to 8) at least partially overlap, where a UE (e.g., a UE 115 as described with reference to FIGS. 1 and 2) may implement prioritization between CGs based on a physical location of the receiving UE. The rescheduling configuration 1100 may implement aspects of wireless communications system 100 and/or 200.

In some examples, a transmitting UE 115-e may have beam forming capabilities and may thus transmit a number of data packets in a one or more directions using a number of directional beams. In such examples, when two scheduling configurations overlap, the transmitting UE 115-e may beamform a first transmission scheduled by a first CG configuration to a first receiving UE in a first direction and may transmit a second transmission scheduled by a second CG configuration to a second UE in a second direction, where at least one resource of the first CG configuration overlaps with at least one resource of the second CG configuration.

In some examples, the transmitting UE 115-e may be configured with a number of CG configurations (e.g., up to 8) and thus, the UE 115-e may be configured with a number of colliding resources associated with the CG configurations and a relatively large number of colliding data packets. In some examples, two or more receiving UEs (e.g., UEs 115-c and 115-d or UEs 115-f and 115-g) may be located at a distance small enough relative to another receiving UE that beamforming communications to one or more of the receiving UE 115 may be associated with increased inaccuracy. Thus, the transmitting UE 115-e may use location information of UEs 115-c, 115-d, 115-f, and 115-g to prioritize data packet transmissions associated with overlapping scheduling configurations.

For example, for any number of overlapping scheduling configurations scheduled with any number of contending data packets, the transmitting UE 115-e (e.g., a MAC layer of the transmitting UE 115-e) may sequentially prioritize the data packets by their logical channel priority (e.g., MAC-based sequential prioritization) and may transmit the highest priority data packet using beamformed transmissions to a first receiving UE. For example, UE 115-c may be associated with a highest priority data packet, UE 115-f may be associated with a next highest priority, UE 115-g may be associated with a second lowest priority and UE 115-d may be associated with a lowest priority. The UE 115-e may be configured with a CG configuration for each of the UEs 115-c, UE 115-d, UE 115-f, and UE 115-g and the UE 115-e may prioritize data packets to the receiving UEs 115 having the highest priority in each direction. For example, the UE 115-e may prioritize the highest priority PDU (e.g., associated with UE 115-c) and for the remaining pending data packets, if the next unscheduled highest priority PDU (e.g., associated with UE 115-f) may be transmitted according to beam physical constraints, then the next highest priority PDU may prioritized and sent to PHY for transmission, otherwise, the next unscheduled highest priority PDU may be deprioritized For example, the UE 115-e may continue to transmit data packets according to the priority of the data packet but may take physical location of the receiving UEs 115 into account. For example, the UE 115-e (e.g., a MAC layer of the UE 115-*e*) may prioritize a data packet to the receiving UE 115-*c* having the highest priority. The next highest priority data packet may be associated with the CG configuration for transmissions to UE 115-*f* and the UE 115-*e* may prioritize transmission of a data packet to the UE 115-*f* according to the CG configuration associated with the UE 115-*f*. That is the UE 115-*e* may simultaneously transmit to the UE 115-*c* and the UE 115-*f*. The third highest priority data packet may be associated with the scheduling configuration for transmissions to UE 115-*g*, however, due to the proximity of the UE 115-*g* to the UE 115-*f* as shown in FIG. 11, the UE 115-*e* may deprioritize a data packet to the UE 115-*g* even though it is associated with the next highest priority and may deprioritize a data packet to the UE 115-*d* due to the proximity of the UE 115-*c* to the UE 115-*d*.

That is, to simplify internal MAC-PHY signaling, the UE 115-*e* (e.g., a physical layer of the UE 115-*e*) may divide the receiving UEs into non-overlapping beam direction or clusters such that at most one data packet from each direction may be multiplexed with overlapping CG configurations. For example, the UE 115-*e* may communicate with the receiving UEs 115 as clusters.

In some other examples, the UE 115-*e* (e.g., the MAC layer of the UE 115-*e*) may implement a scheduler (e.g., a complete scheduler). For example, the UE 115-*e* may receive one or more radio link control parameters (e.g., from the physical layer) including one or more of a priority of the data packets, traffic volume, or quality of service metrics, among other examples associated with the receiving UE 115. For example, layer three (L3) Reference Signal Received Power (RSRP) may be reported over sidelink and the UE 115-*e* may receive CSI-RS feedback including, for example, channel quality index and rank indicator. The scheduler of the UE 115-*e* may take this information (e.g., some combination of the radio link control information, the L3 RSRP, and the CSI-RS feedback which may also be referred to as parameters or metrics) into account when making scheduling decisions for transmission to the receiving UE 115 and the transmitting UE 115-*e* may perform a scheduling decision according to one or more, or at each time interval (e.g., every TTI). This may lead to high channel utilization, and efficient frequency reuse, among other examples.

The deprioritization or rescheduling of deprioritized data packets as described with reference to FIG. 11 may be performed according to any combination of the examples described here (e.g., with reference to FIGS. 3-10).

FIGS. 12A & 12B illustrates examples of a rescheduling configuration 1201 and 1202 that each support sidelink intra-UE prioritization in accordance with aspects of the present disclosure. Rescheduling configurations 1201 and 1202 may each demonstrate a situation in which a sidelink CG at least partially overlaps with an access link grant, where a UE (e.g., a UE 115 as described with reference to FIGS. 1 and 2) may implement prioritization between uplink transmissions and sidelink transmissions. The rescheduling configurations 1201 and 1202 may implement aspects of wireless communications system 100 and/or 200.

A transmitting UE 115-*a* may be configured with a sidelink CG and may receive an UL grant (e.g., an UL CG or an UL DG) that allocates one or more resources that at least partially overlap in time or frequency. In some examples, between a sidelink CG (e.g., PC5) data packet associated with the sidelink CG and an access link (e.g., Uu) data packet associated with the UL CG/DG, if the sidelink CG data packet is deprioritized because the access link data packet is associated with a higher priority than the sidelink CG data packet, or if the sidelink CG data packet is deprioritized when the sidelink data packet and the access link data packet are associated with a same priority, the transmitting UE 115-*a* may autonomously implement a rescheduling configuration for transmitting the deprioritized sidelink CG data packet. For example, the transmitting UE 115-*a* may autonomously reschedule and transmit the sidelink CG data packet according to any of the examples described herein (e.g., with respect to FIGS. 3-11).

For example, as depicted in rescheduling configuration 1201 of FIG. 12A, at least one resource of a sidelink CG configuration may overlap with a resource allocated by an uplink grant. In such examples, the transmitting UE 115-*a* may refrain from transmitting during the resources of the sidelink CG (e.g., even if one or more of the resources do not conflict with the uplink grant) and may transmit the uplink message using the uplink grant. That is, according to rescheduling configuration 1201, the transmitting UE 115-*a* may prioritize the UL grant due to a priority of the associated traffic or regardless of the priority of the associated traffic and may deprioritize the sidelink CG.

In another example, as depicted in scheduling configuration 1202 of FIG. 12B, the transmitting UE may be configured with resources of a sidelink CG configuration that may at least partially overlap with a resource scheduled by an uplink grant. However, one or more resources of the sidelink CG (e.g., Resource 1 and Resource 3) may not overlap or conflict with a resource of the uplink grant. In such examples, the transmitting UE 115-*a* may transmit the sidelink CG data message using a first non-conflicting resource (e.g., Resource 1) of the CG and may transmit the uplink message during the uplink grant. If the transmission of the sidelink CG data message using the first resource is unsuccessful, the transmitting UE 115-*a* may refrain from retransmitting the sidelink message using the overlapping resource (e.g., Resource 2) and may retransmit the sidelink message using a next available resource (e.g., Resource 3) of the CG configuration.

The examples of rescheduling configurations 1201 and 1202 are to be understood as possible implementations in a situation where a sidelink grant overlaps with an access link grant and any of the examples described herein may be used to autonomously transmit or reschedule a deprioritized data packet in such examples.

Figure 13:
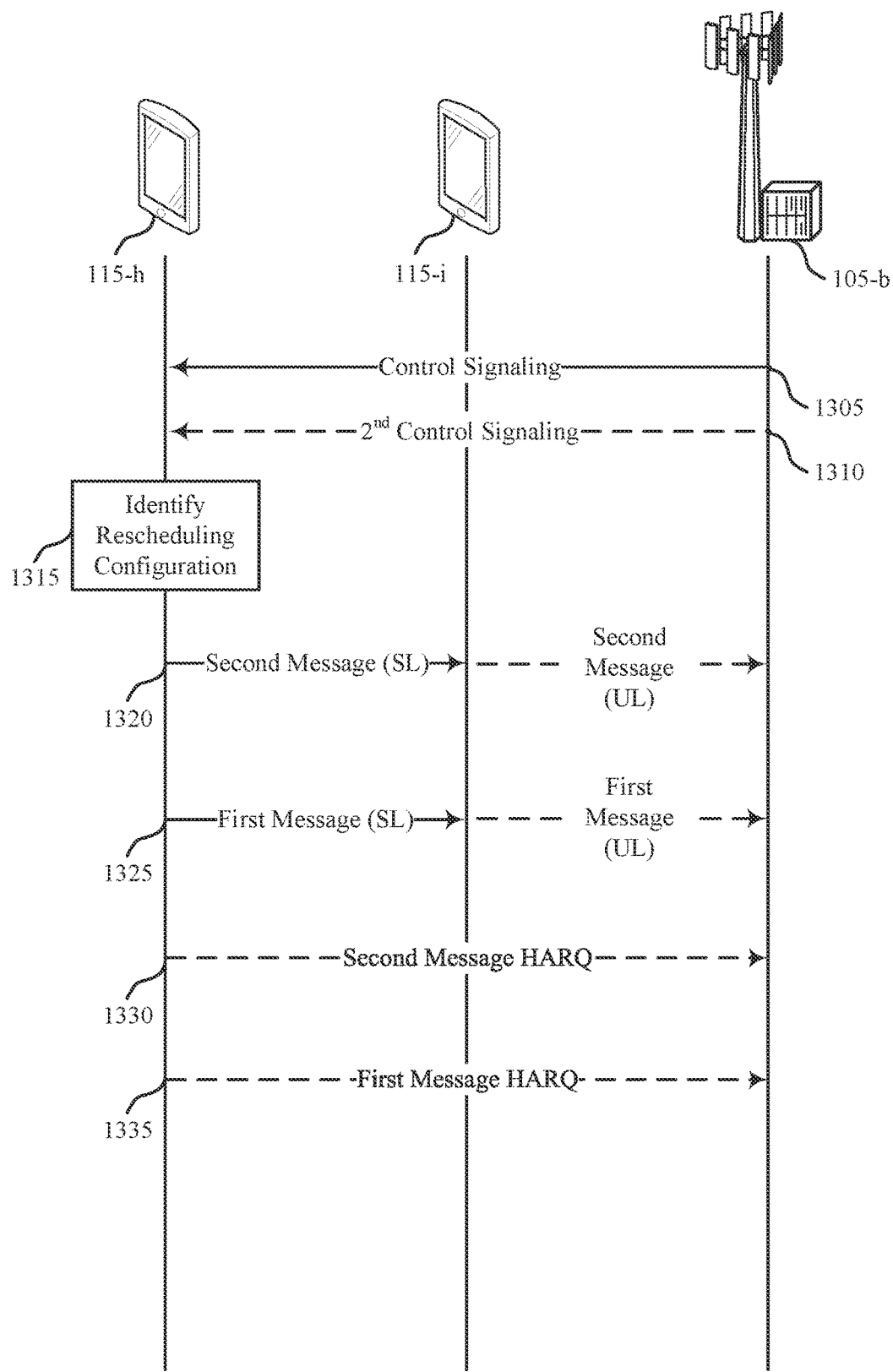
FIG. 13 illustrates an example of a process flow that supports sidelink intra-UE prioritization in accordance with aspects of the present disclosure.

FIG. 13 illustrates an example of a process flow 1300 that supports sidelink intra-UE prioritization in accordance with aspects of the present disclosure. The process flow 1300 may implement or be implemented by aspects of wireless communications system 100 or 200. For example, the process flow 1300 may illustrate operations between a UE 115-*h*, a UE 115-*i*, and a base station 105-*b*, which may be examples of the corresponding devices, as described with reference to FIG. 1. In the following description of the process flow 1300, the operations between UE 115-*h*, UE 115-*i*, and base station 105-*b* may be transmitted in a different order than the example order shown, or the operations performed by the UE 115-*h*, UE 115-*i*, and the base station 105-*b* may be performed in different orders or at different times or by different devices. Some operations may also be omitted from the process flow 1300, and other operations may be added to the process flow 1300.

At 1305, the base station 105-*b* may transmit control signaling to the UE 115-*h*, indicating a semi-persistent scheduling configuration (e.g., CG, DG) that identifies a plurality of resource occasions of the SPS configuration that each include a set of resources (e.g., three CG resources, a number of DG resources) that are allocated to the UE 115-*h* for transmitting data packets to UE 115-*i* or the base station 105-*b*, or both.

Optionally, at 1310, the UE 115-*h* may receive control signaling that includes a rescheduling configuration indicating how the UE 115-*h* is to handle possible conflicts between the data packets. In some examples, the rescheduling configuration is transmitted via RRC signaling. At 1315, the UE 115-*h* may identify the rescheduling configuration based on receiving the second control signaling at 1310 or by a configuration of the UE 115-*h*. The rescheduling configuration may indicate a configuration for scheduling transmission of a first message that has a possible conflict (e.g., a scheduled conflict) with transmission of a second message. In some example, the first message may have a different priority than the second message.

At 1320, the UE 115-*h* may transmit the second message during a resource occasion of the semi-persistent scheduling configuration to the UE 115-*i* and/or the base station 105-*b* and at 1325, may transmit the first message to the UE 115-*i* or the base station 105-*b* according to the rescheduling configuration.

Optionally, at 1330, the UE 115-*i* may transmit feedback (e.g., HARQ feedback) associated with the second message to the base station 105-*b* and, at 1335, may transmit feedback associated with the first message to the base station 105-*b*.

Figure 14:
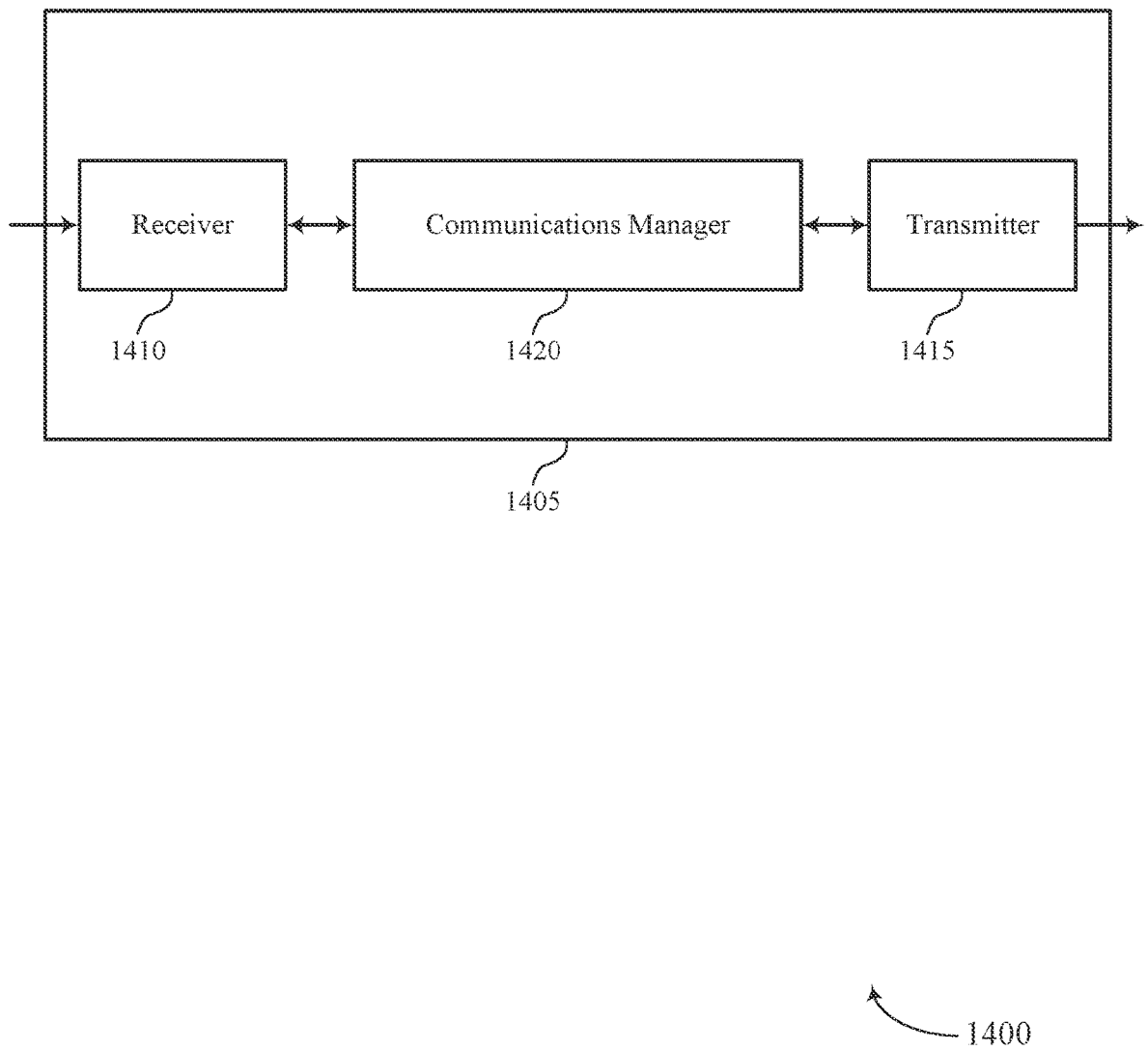
FIGS. 14 and 15 show block diagrams of devices that support sidelink intra-UE prioritization in accordance with aspects of the present disclosure.

FIG. 14 shows a block diagram 1400 of a device 1405 that supports sidelink intra-UE prioritization in accordance with aspects of the present disclosure. The device 1405 may be an example of aspects of a UE 115 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to sidelink intra-UE prioritization). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to sidelink intra-UE prioritization). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of sidelink intra-UE prioritization as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a first UE in accordance with examples as disclosed herein. For example, the communications manager 1420 may be configured as or otherwise support a means for receiving control signaling indicating a semi-persistent scheduling configuration that identifies a set of multiple resource occasions each including a set of multiple resources of a sidelink channel allocated to the first UE for sidelink communication. The communications manager 1420 may be configured as or otherwise support a means for identifying a rescheduling configuration for scheduling transmission of a first message that has a possible conflict with transmission of a second message during a first resource of the set of multiple resources of a first resource occasion of the set of multiple resource occasions, the first message having a different priority than the second message. The communications manager 1420 may be configured as or otherwise support a means for transmitting the second message during the first resource occasion. The communications manager 1420 may be configured as or otherwise support a means for transmitting the first message via the sidelink channel in accordance with the rescheduling configuration.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for reduced processing and more efficient utilization of communication resources, among other examples.

Figure 15:
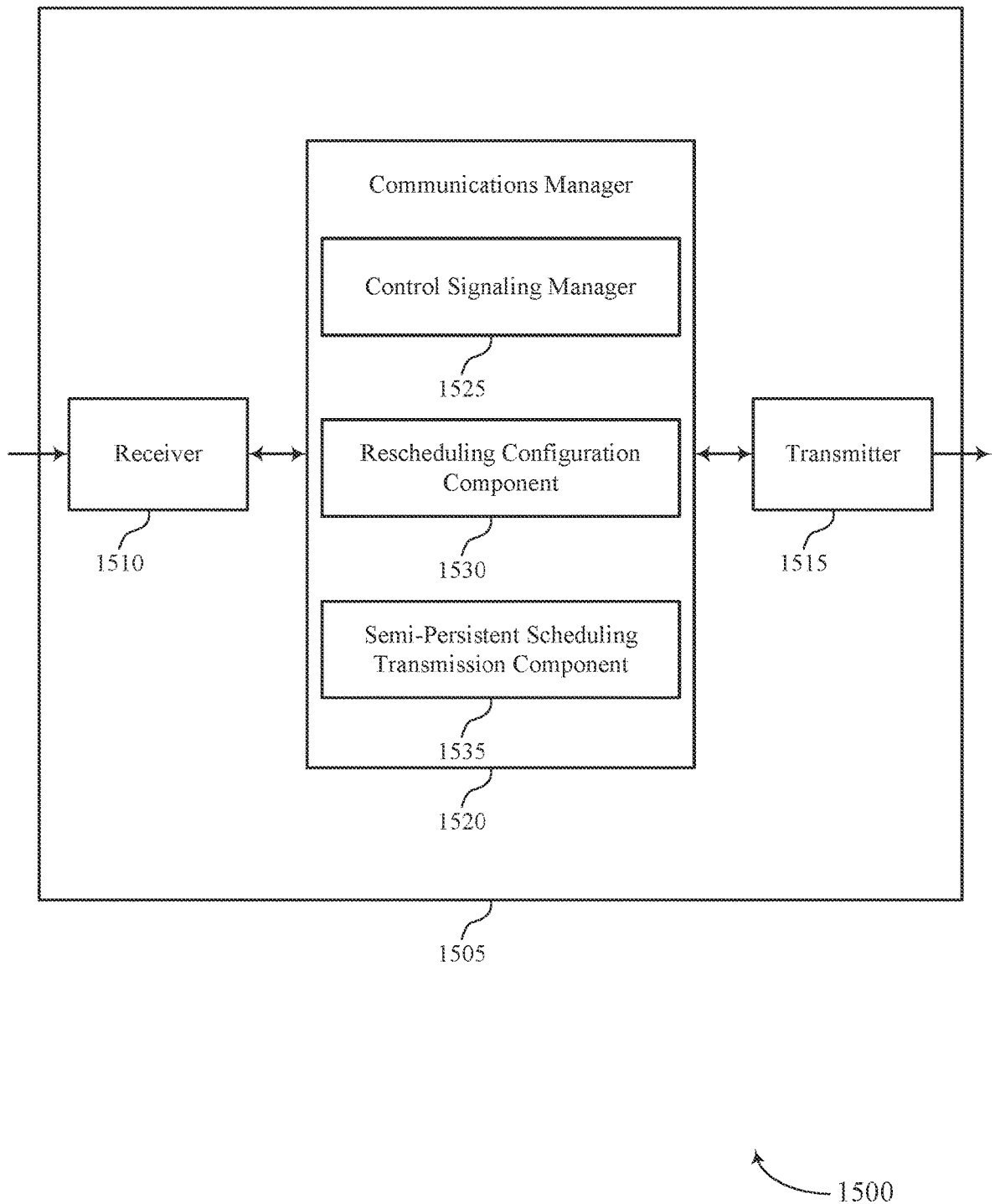

FIG. 15 shows a block diagram 1500 of a device 1505 that supports sidelink intra-UE prioritization in accordance with aspects of the present disclosure. The device 1505 may be an example of aspects of a device 1405 or a UE 115 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to sidelink intra-UE prioritization). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to sidelink intra-UE prioritization). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of sidelink intra-UE prioritization as described herein. For example, the communications manager 1520 may include a control signaling manager 1525, a rescheduling configuration component 1530, a semi-persistent scheduling transmission component 1535, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a first UE in accordance with examples as disclosed herein. The control signaling manager 1525 may be configured as or otherwise support a means for receiving control signaling indicating a semi-persistent scheduling configuration that identifies a set of multiple resource occasions each including a set of multiple resources of a sidelink channel allocated to the first UE for sidelink communication. The rescheduling configuration component 1530 may be configured as or otherwise support a means for identifying a rescheduling configuration for scheduling transmission of a first message that has a possible conflict with transmission of a second message during a first resource of the set of multiple resources of a first resource occasion of the set of multiple resource occasions, the first message having a different priority than the second message. The semi-persistent scheduling transmission component 1535 may be configured as or otherwise support a means for transmitting the second message during the first resource occasion. The semi-persistent scheduling transmission component 1535 may be configured as or otherwise support a means for transmitting the first message via the sidelink channel in accordance with the rescheduling configuration.

Figure 16:
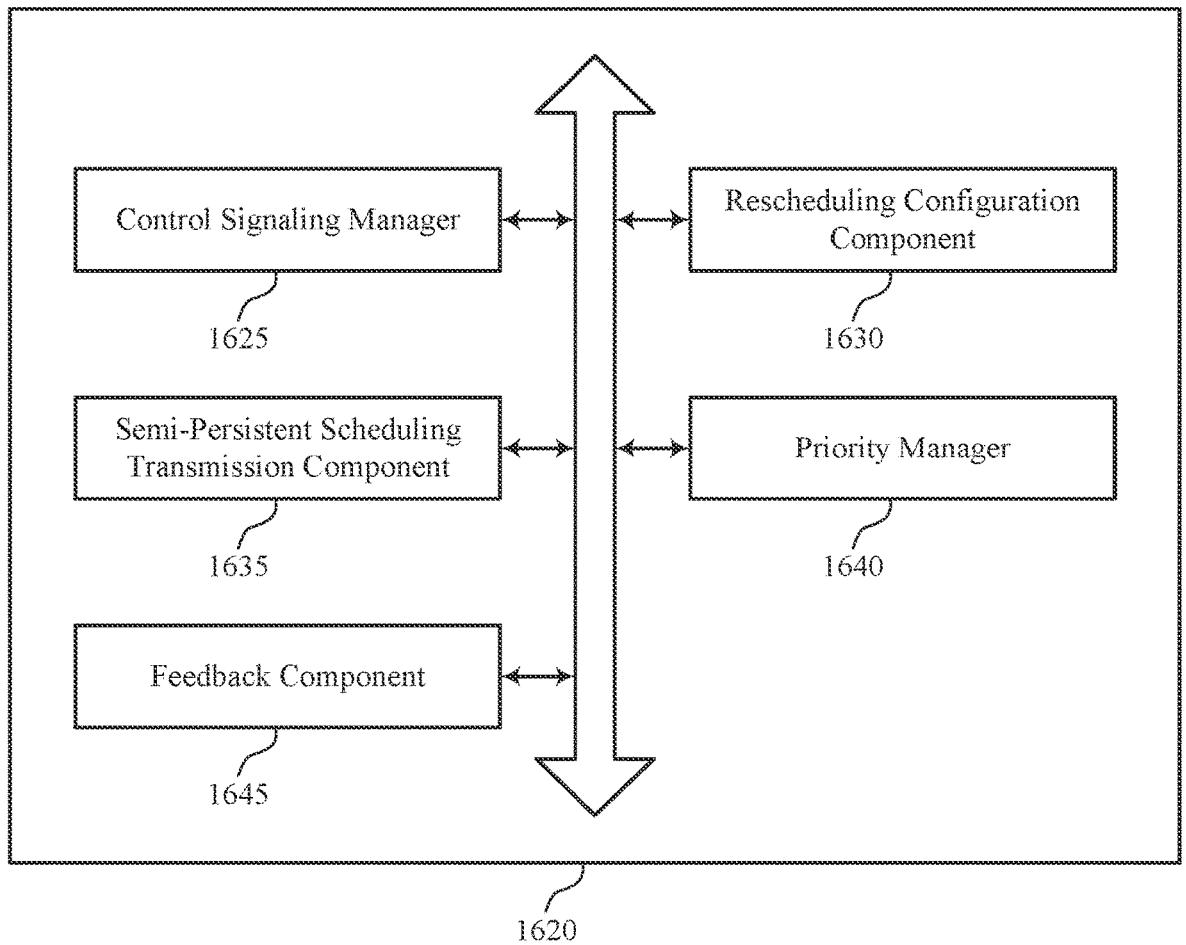
FIG. 16 shows a block diagram of a communications manager that supports sidelink intra-UE prioritization in accordance with aspects of the present disclosure.

FIG. 16 shows a block diagram 1600 of a communications manager 1620 that supports sidelink intra-UE prioritization in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of sidelink intra-UE prioritization as described herein. For example, the communications manager 1620 may include a control signaling manager 1625, a rescheduling configuration component 1630, a semi-persistent scheduling transmission component 1635, a priority manager 1640, a feedback component 1645, or any combination thereof. Each of these components may communicate, directly or indirectly, with one another (e.g., via one or more buses).

The communications manager 1620 may support wireless communication at a first UE in accordance with examples as disclosed herein. The control signaling manager 1625 may be configured as or otherwise support a means for receiving control signaling indicating a semi-persistent scheduling configuration that identifies a set of multiple resource occasions each including a set of multiple resources of a sidelink channel allocated to the first UE for sidelink communication. The rescheduling configuration component 1630 may be configured as or otherwise support a means for identifying a rescheduling configuration for scheduling transmission of a first message that has a possible conflict with transmission of a second message during a first resource of the set of multiple resources of a first resource occasion of the set of multiple resource occasions, the first message having a different priority than the second message. The semi-persistent scheduling transmission component 1635 may be configured as or otherwise support a means for transmitting the second message during the first resource occasion. In some examples, the semi-persistent scheduling transmission component 1635 may be configured as or otherwise support a means for transmitting the first message via the sidelink channel in accordance with the rescheduling configuration.

In some examples, the rescheduling configuration indicates to transmit the first message during a subsequent resource of the first resource occasion.

In some examples, the rescheduling configuration indicates to transmit the first message during a second resource indicated by a second semi-persistent scheduling configuration that occurs after the first resource.

In some examples, the first resource occasion at least partially overlaps in time with a second resource occasion indicated by the second semi-persistent scheduling configuration.

In some examples, the rescheduling configuration indicates to transmit the first message during a resource of a second resource occasion of a second semi-persistent scheduling configuration that occurs after the first resource occasion of the semi-persistent scheduling configuration.

In some examples, the possible conflict occurs between resources of the semi-persistent scheduling configuration and a second semi-persistent scheduling configuration. In some examples, the rescheduling configuration indicates to transmit the first message during a resource of a resource occasion indicated by a third semi-persistent configuration.

In some examples, the rescheduling configuration indicates to transmit the first message during a subsequent resource of a set of multiple resources of a resource occasion indicated by a second semi-persistent configuration based on the second message being successfully transmitted during the first resource that occurs prior to the subsequent resource.

In some examples, the rescheduling configuration indicates to transmit the first message during a second resource of the first resource occasion that occurs after the first resource based on the second message being successfully transmitted during the first resource of the first resource occasion.

In some examples, the rescheduling configuration indicates to transmit the first message during a subsequent resource of a second resource occasion that occurs after a prior resource of the second resource occasion based on the possible conflict occurring between the prior resource and the first resource.

In some examples, the rescheduling configuration indicates to transmit the first message during the first resource, and the priority manager 1640 may be configured as or otherwise support a means for transmitting the second message during a prior resource of the first resource occasion that occurs prior to the first resource based on a priority of the second message being higher than a priority of the first message.

In some examples, the semi-persistent scheduling transmission component 1635 may be configured as or otherwise support a means for retransmitting the second message during a subsequent resource of the first resource occasion that occurs after the first resource based on unsuccessful transmission of the second message during the prior resource.

In some examples, the first resource indicated by the semi-persistent scheduling configuration at least partially overlaps with a second resource of a second resource occasion indicated by a dynamic scheduling configuration.

In some examples, the control signaling manager 1625 may be configured as or otherwise support a means for receiving a control message that schedules transmission of the second message during the first resource, where the second message is transmitted during the first resource and the rescheduling configuration indicates to transmit the first message during a subsequent resource or a subsequent resource occasion.

In some examples, the feedback component 1645 may be configured as or otherwise support a means for transmitting, to a base station, a first control channel including feedback associated with the first message. In some examples, the feedback component 1645 may be configured as or otherwise support a means for transmitting, to the base station, a second control channel including feedback associated with the second message.

In some examples, the feedback component 1645 may be configured as or otherwise support a means for transmitting, to a base station, a first control channel including feedback associated with the second message, where the rescheduling configuration indicates to refrain from transmitting the first message during the first resource occasion. In some examples, the feedback component 1645 may be configured as or otherwise support a means for refraining from transmitting feedback associated with the first message during a control channel associated with the first resource occasion.

In some examples, the first message is a sidelink message and the second message is a sidelink message, an uplink message, or an access link message.

In some examples, the control signaling manager 1625 may be configured as or otherwise support a means for receiving, from a base station, a first control message that schedules transmission of the first message during the first resource. In some examples, the feedback component 1645 may be configured as or otherwise support a means for transmitting negative feedback to the base station indicating that the first message was not transmitted during the first resource based on the rescheduling configuration indicating to transmit the negative feedback due to the possible conflict. In some examples, the control signaling manager 1625 may be configured as or otherwise support a means for receiving a second control message scheduling transmission of the first message during a subsequent resource based on the negative feedback.

In some examples, the second message is transmitted to a second UE during the first resource using a first transmission beam and the first message is transmitted to at least one additional UE during the first resource using a second transmission based on a location of the second UE relative to the at least one additional UE, a priority associated with the at least one additional UE, or both.

In some examples, the second message is transmitted to a second UE during the first resource using a first transmission beam and the first message is transmitted to at least one additional UE during a second resource using the first transmission beam or a second transmission based on a location of the second UE relative to the at least one additional UE.

In some examples, the rescheduling configuration component 1630 may be configured as or otherwise support a means for scheduling transmission of the first message and the second message based on one or more parameters, a reported channel metric, or both.

In some examples, the semi-persistent scheduling transmission component 1635 may be configured as or otherwise support a means for transmitting a third message during a subsequent resource of a second resource occasion based on transmission being skipped on an earlier resource of the second resource occasion.

In some examples, the semi-persistent scheduling transmission component 1635 may be configured as or otherwise support a means for transmitting a third message during a subsequent resource of a second resource occasion based on a dummy transmission occurring on an earlier resource of the second resource occasion.

In some examples, to support identifying the rescheduling configuration, the control signaling manager 1625 may be configured as or otherwise support a means for receiving a control message indicating the rescheduling configuration.

In some examples, the control signaling manager 1625 may be configured as or otherwise support a means for receiving the rescheduling configuration via radio resource control signaling.

In some examples, to support transmitting the first message, the semi-persistent scheduling transmission component 1635 may be configured as or otherwise support a means for autonomously transmitting the first message via the sidelink channel in accordance with the rescheduling configuration received via the radio resource control signaling.

In some examples, a priority of the second message is higher than a priority of the first message.

Figure 17:
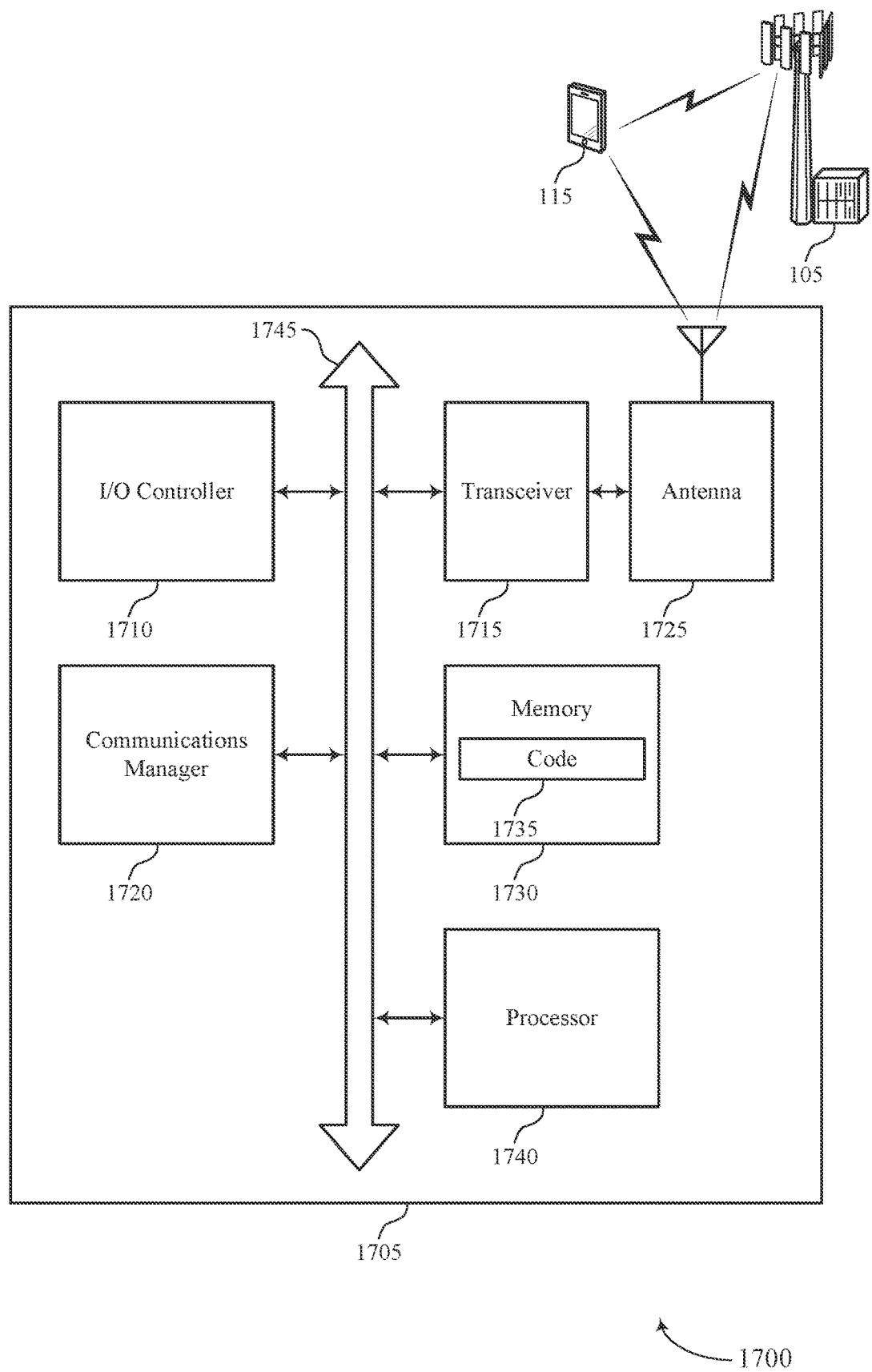
FIG. 17 shows a diagram of a system including a device that supports sidelink intra-UE prioritization in accordance with aspects of the present disclosure.

FIG. 17 shows a diagram of a system 1700 including a device 1705 that supports sidelink intra-UE prioritization in accordance with aspects of the present disclosure. The device 1705 may be an example of or include the components of a device 1405, a device 1505, or a UE 115 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, an input/output (I/O) controller 1710, a transceiver 1715, an antenna 1725, a memory 1730, code 1735, and a processor 1740. These components may be in electronic communication or otherwise coupled (e.g., operatively, communicatively, functionally, electronically, electrically) via one or more buses (e.g., a bus 1745).

The I/O controller 1710 may manage input and output signals for the device 1705. The I/O controller 1710 may also manage peripherals not integrated into the device 1705. In some cases, the I/O controller 1710 may represent a physical connection or port to an external peripheral. In some cases, the I/O controller 1710 may utilize an operating system such as iOS®, ANDROID®, MS-DOS®, MS-WINDOWS®, OS/2®, UNIX®, LINUX®, or another known operating system. Additionally, or alternatively, the I/O controller 1710 may represent or interact with a modem, a keyboard, a mouse, a touchscreen, or a similar device. In some cases, the I/O controller 1710 may be implemented as part of a processor, such as the processor 1740. In some cases, a user may interact with the device 1705 via the I/O controller 1710 or via hardware components controlled by the I/O controller 1710.

In some cases, the device 1705 may include a single antenna 1725. However, in some other cases, the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include random access memory (RAM) and read-only memory (ROM). The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a basic I/O system (BIOS) which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting sidelink intra-UE prioritization). For example, the device 1705 or a component of the device 1705 may include a processor 1740 and memory 1730 coupled to the processor 1740, the processor 1740 and memory 1730 configured to perform various functions described herein.

The communications manager 1720 may support wireless communication at a first UE in accordance with examples as disclosed herein. For example, the communications manager 1720 may be configured as or otherwise support a means for receiving control signaling indicating a semi-persistent scheduling configuration that identifies a set of multiple resource occasions each including a set of multiple resources of a sidelink channel allocated to the first UE for sidelink communication. The communications manager 1720 may be configured as or otherwise support a means for identifying a rescheduling configuration for scheduling transmission of a first message that has a possible conflict with transmission of a second message during a first resource of the set of multiple resources of a first resource occasion of the set of multiple resource occasions, the first message having a different priority than the second message. The communications manager 1720 may be configured as or otherwise support a means for transmitting the second message during the first resource occasion. The communications manager 1720 may be configured as or otherwise support a means for transmitting the first message via the sidelink channel in accordance with the rescheduling configuration.

By including or configuring the communications manager 1720 in accordance with examples as described herein, the device 1705 may support techniques for improved communication reliability, reduced latency, improved user experience related to reduced latency, more efficient utilization of communication resources, and improved coordination between devices, among other examples.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of sidelink intra-UE prioritization as described herein, or the processor 1740 and the memory 1730 may be otherwise configured to perform or support such operations.

Figure 18:
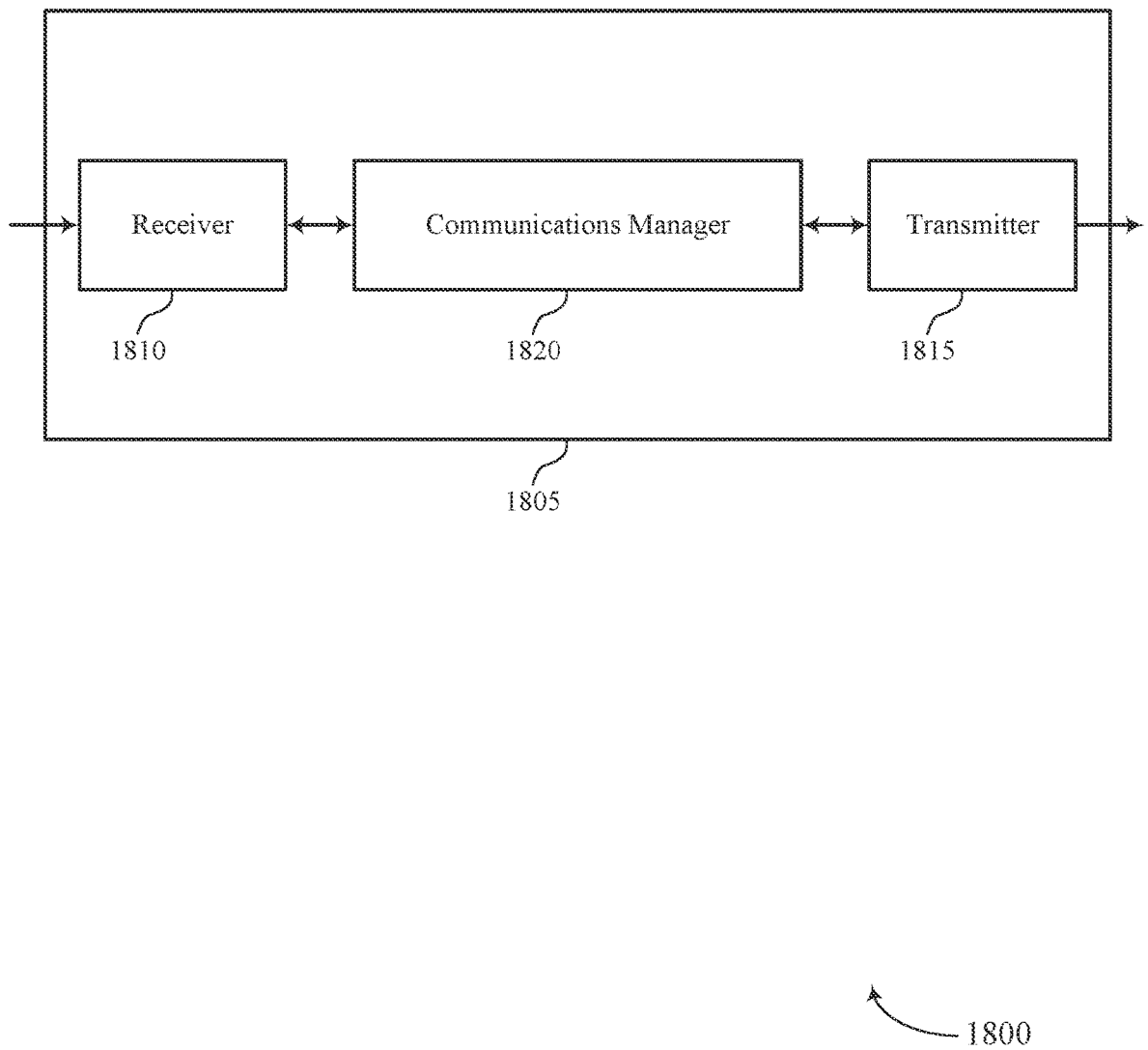
FIGS. 18 and 19 show block diagrams of devices that support sidelink intra-UE prioritization in accordance with aspects of the present disclosure.

FIG. 18 shows a block diagram 1800 of a device 1805 that supports sidelink intra-UE prioritization in accordance with aspects of the present disclosure. The device 1805 may be an example of aspects of a base station 105 as described herein. The device 1805 may include a receiver 1810, a transmitter 1815, and a communications manager 1820. The device 1805 may also include a processor. Each of these components may be in communication with one another (e.g., via one or more buses).

The receiver 1810 may provide a means for receiving information such as packets, user data, control information, or any combination thereof associated with various information channels (e.g., control channels, data channels, information channels related to sidelink intra-UE prioritization). Information may be passed on to other components of the device 1805. The receiver 1810 may utilize a single antenna or a set of multiple antennas.

The transmitter 1815 may provide a means for transmitting signals generated by other components of the device 1805. For example, the transmitter 1815 may transmit information such as packets, user data, control information, or any combination thereof associated with various information channels (e.g., control channels, data channels, information channels related to sidelink intra-UE prioritization). In some examples, the transmitter 1815 may be co-located with a receiver 1810 in a transceiver module. The transmitter 1815 may utilize a single antenna or a set of multiple antennas.

The communications manager 1820, the receiver 1810, the transmitter 1815, or various combinations thereof or various components thereof may be examples of means for performing various aspects of sidelink intra-UE prioritization as described herein. For example, the communications manager 1820, the receiver 1810, the transmitter 1815, or various combinations or components thereof may support a method for performing one or more of the functions described herein.

In some examples, the communications manager 1820, the receiver 1810, the transmitter 1815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1820, the receiver 1810, the transmitter 1815, or various combinations or components thereof may be implemented in code (e.g., as communications management software or firmware) executed by a processor. If implemented in code executed by a processor, the functions of the communications manager 1820, the receiver 1810, the transmitter 1815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1820 may be configured to perform various operations (e.g., receiving, monitoring, transmitting) using or otherwise in cooperation with the receiver 1810, the transmitter 1815, or both. For example, the communications manager 1820 may receive information from the receiver 1810, send information to the transmitter 1815, or be integrated in combination with the receiver 1810, the transmitter 1815, or both to receive information, transmit information, or perform various other operations as described herein.

The communications manager 1820 may support wireless communication at a base station in accordance with examples as disclosed herein. For example, the communications manager 1820 may be configured as or otherwise support a means for transmitting a first control signaling indicating a semi-persistent scheduling configuration that identifies a set of multiple resource occasions each including a set of multiple resources of a sidelink channel allocated to a first UE for sidelink communication. The communications manager 1820 may be configured as or otherwise support a means for identifying a rescheduling configuration for scheduling transmission of a first message by the first UE that has a possible conflict with transmission of a second message during a first resource of the set of multiple resources of a first resource occasion of the set of multiple resource occasions, the first message having a different priority than the second message. The communications manager 1820 may be configured as or otherwise support a means for receiving the second message during the first resource occasion. The communications manager 1820 may be configured as or otherwise support a means for receiving the first message in accordance with the rescheduling configuration.

By including or configuring the communications manager 1820 in accordance with examples as described herein, the device 1805 (e.g., a processor controlling or otherwise coupled to the receiver 1810, the transmitter 1815, the communications manager 1820, or a combination thereof) may support techniques for more efficient utilization of communication resources.

Figure 19:
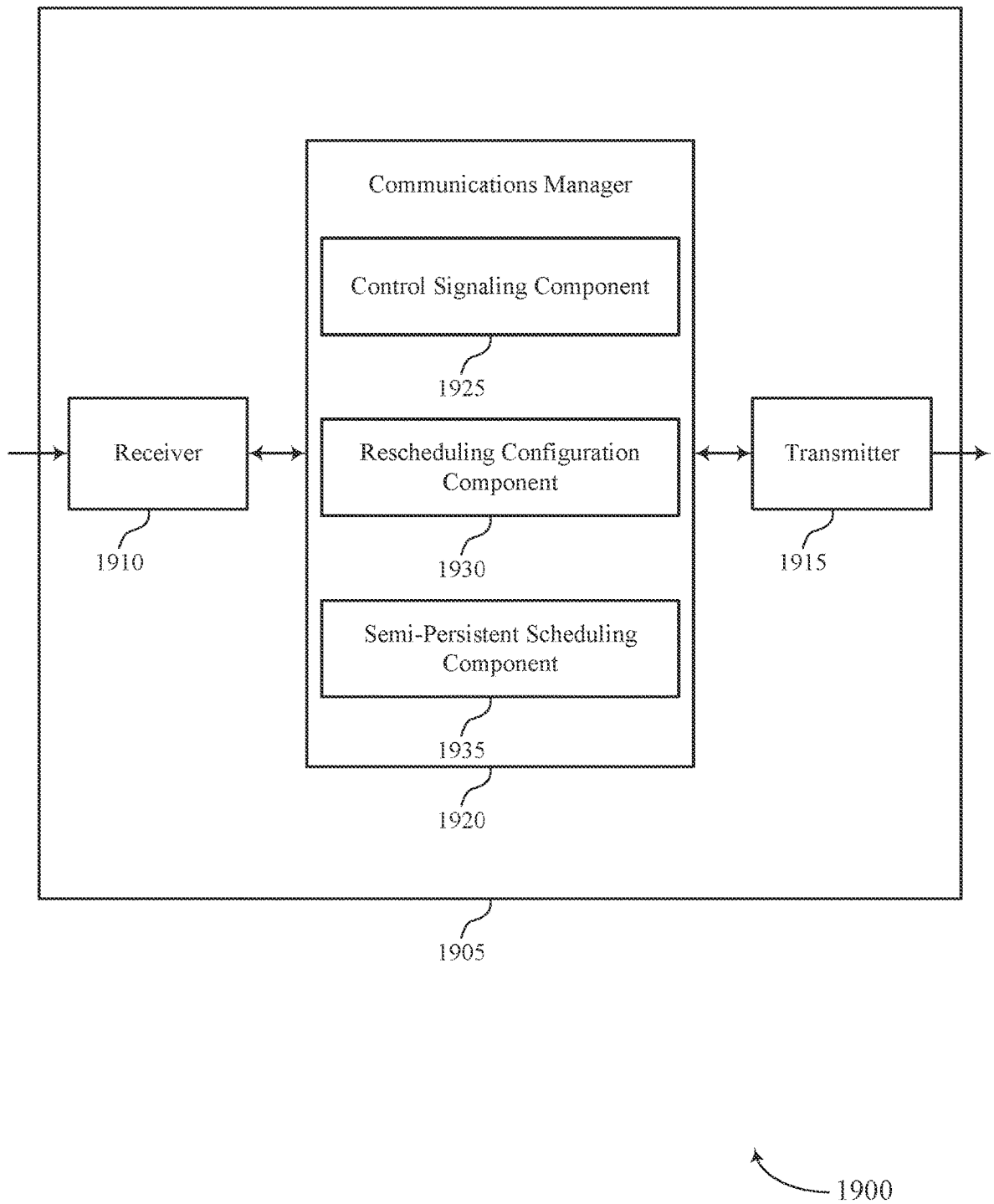

FIG. 19 shows a block diagram 1900 of a device 1905 that supports sidelink intra-UE prioritization in accordance with aspects of the present disclosure. The device 1905 may be an example of aspects of a device 1805 or a base station 105 as described herein. The device 1905 may include a receiver 1910, a transmitter 1915, and a communications manager 1920. The device 1905 may also include a processor. Each of these components may be in communication with one another (e.g., via one or more buses).

The receiver 1910 may provide a means for receiving information such as packets, user data, control information, or any combination thereof associated with various information channels (e.g., control channels, data channels, information channels related to sidelink intra-UE prioritization). Information may be passed on to other components of the device 1905. The receiver 1910 may utilize a single antenna or a set of multiple antennas.

The transmitter 1915 may provide a means for transmitting signals generated by other components of the device 1905. For example, the transmitter 1915 may transmit information such as packets, user data, control information, or any combination thereof associated with various information channels (e.g., control channels, data channels, information channels related to sidelink intra-UE prioritization). In some examples, the transmitter 1915 may be co-located with a receiver 1910 in a transceiver module. The transmitter 1915 may utilize a single antenna or a set of multiple antennas.

The device 1905, or various components thereof, may be an example of means for performing various aspects of sidelink intra-UE prioritization as described herein. For example, the communications manager 1920 may include a control signaling component 1925, a rescheduling configuration component 1930, a semi-persistent scheduling component 1935, or any combination thereof. The communications manager 1920 may be an example of aspects of a communications manager 1820 as described herein. In some examples, the communications manager 1920, or various components thereof, may be configured to perform various operations (e.g., receiving, monitoring, transmitting) using or otherwise in cooperation with the receiver 1910, the transmitter 1915, or both. For example, the communications manager 1920 may receive information from the receiver 1910, send information to the transmitter 1915, or be integrated in combination with the receiver 1910, the transmitter 1915, or both to receive information, transmit information, or perform various other operations as described herein.

The communications manager 1920 may support wireless communication at a base station in accordance with examples as disclosed herein. The control signaling component 1925 may be configured as or otherwise support a means for transmitting a first control signaling indicating a semi-persistent scheduling configuration that identifies a set of multiple resource occasions each including a set of multiple resources of a sidelink channel allocated to a first UE for sidelink communication. The rescheduling configuration component 1930 may be configured as or otherwise support a means for identifying a rescheduling configuration for scheduling transmission of a first message by the first UE that has a possible conflict with transmission of a second message during a first resource of the set of multiple resources of a first resource occasion of the set of multiple resource occasions, the first message having a different priority than the second message. The semi-persistent scheduling component 1935 may be configured as or otherwise support a means for receiving the second message during the first resource occasion. The semi-persistent scheduling component 1935 may be configured as or otherwise support a means for receiving the first message in accordance with the rescheduling configuration.

Figure 20:
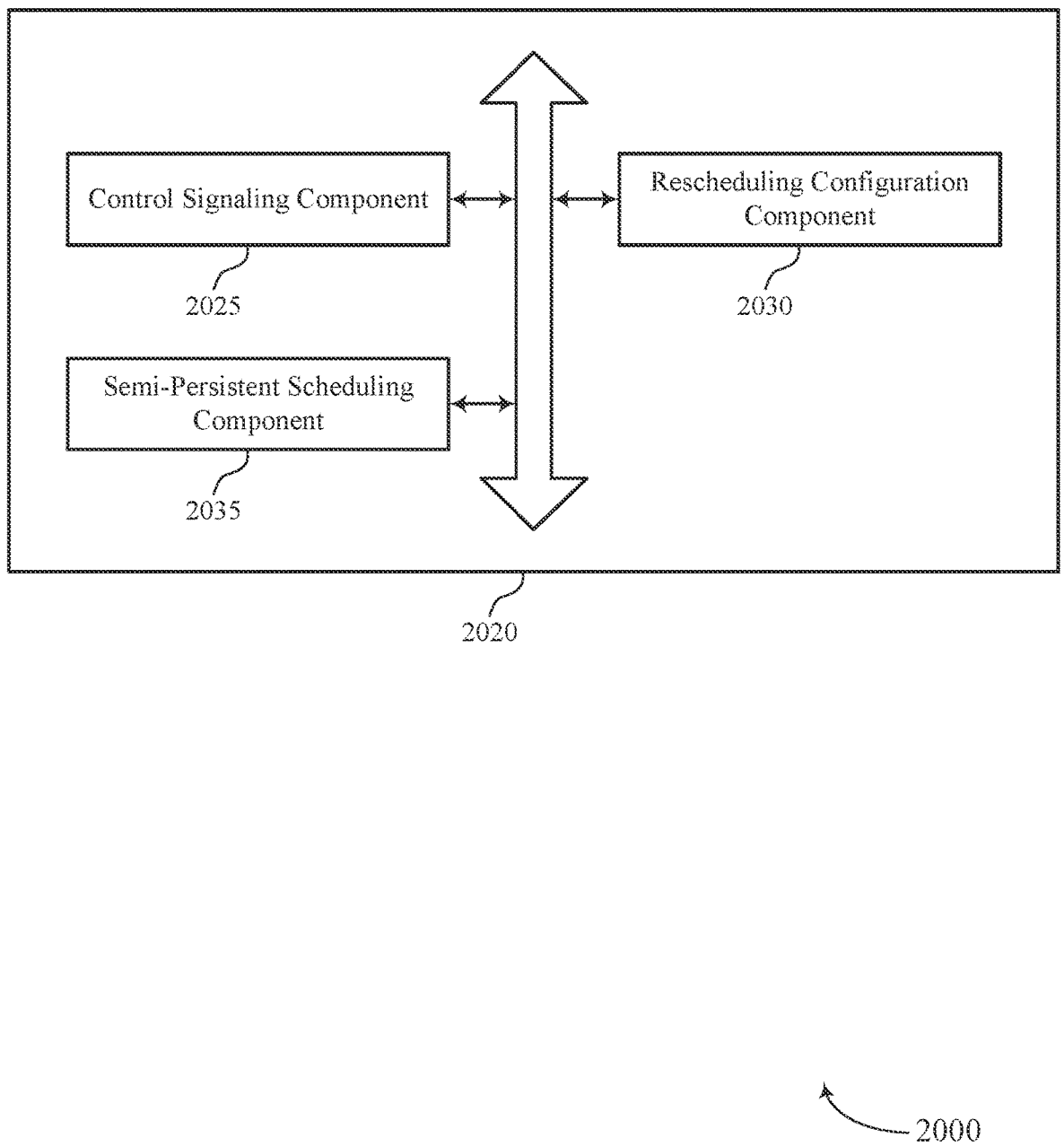
FIG. 20 shows a block diagram of a communications manager that supports sidelink intra-UE prioritization in accordance with aspects of the present disclosure.

FIG. 20 shows a block diagram 2000 of a communications manager 2020 that supports sidelink intra-UE prioritization in accordance with aspects of the present disclosure. The communications manager 2020 may be an example of aspects of a communications manager 1820, a communications manager 1920, or both, as described herein. The communications manager 2020, or various components thereof, may be an example of means for performing various aspects of sidelink intra-UE prioritization as described herein. For example, the communications manager 2020 may include a control signaling component 2025, a rescheduling configuration component 2030, a semi-persistent scheduling component 2035, or any combination thereof. Each of these components may communicate, directly or indirectly, with one another (e.g., via one or more buses).

The communications manager 2020 may support wireless communication at a base station in accordance with examples as disclosed herein. The control signaling component 2025 may be configured as or otherwise support a means for transmitting a first control signaling indicating a semi-persistent scheduling configuration that identifies a set of multiple resource occasions each including a set of multiple resources of a sidelink channel allocated to a first UE for sidelink communication. The rescheduling configuration component 2030 may be configured as or otherwise support a means for identifying a rescheduling configuration for scheduling transmission of a first message by the first UE that has a possible conflict with transmission of a second message during a first resource of the set of multiple resources of a first resource occasion of the set of multiple resource occasions, the first message having a different priority than the second message. The semi-persistent scheduling component 2035 may be configured as or otherwise support a means for receiving the second message during the first resource occasion. In some examples, the semi-persistent scheduling component 2035 may be configured as or otherwise support a means for receiving the first message in accordance with the rescheduling configuration.

In some examples, the control signaling component 2025 may be configured as or otherwise support a means for transmitting, to the first UE, second control signaling indicating the rescheduling configuration.

In some examples, the rescheduling configuration indicates that the first message is to be communicated during a subsequent resource of the first resource occasion.

In some examples, the rescheduling configuration indicates that the first message is to be communicated during a second resource indicated by a second semi-persistent configuration that occurs after the first resource.

Figure 21:
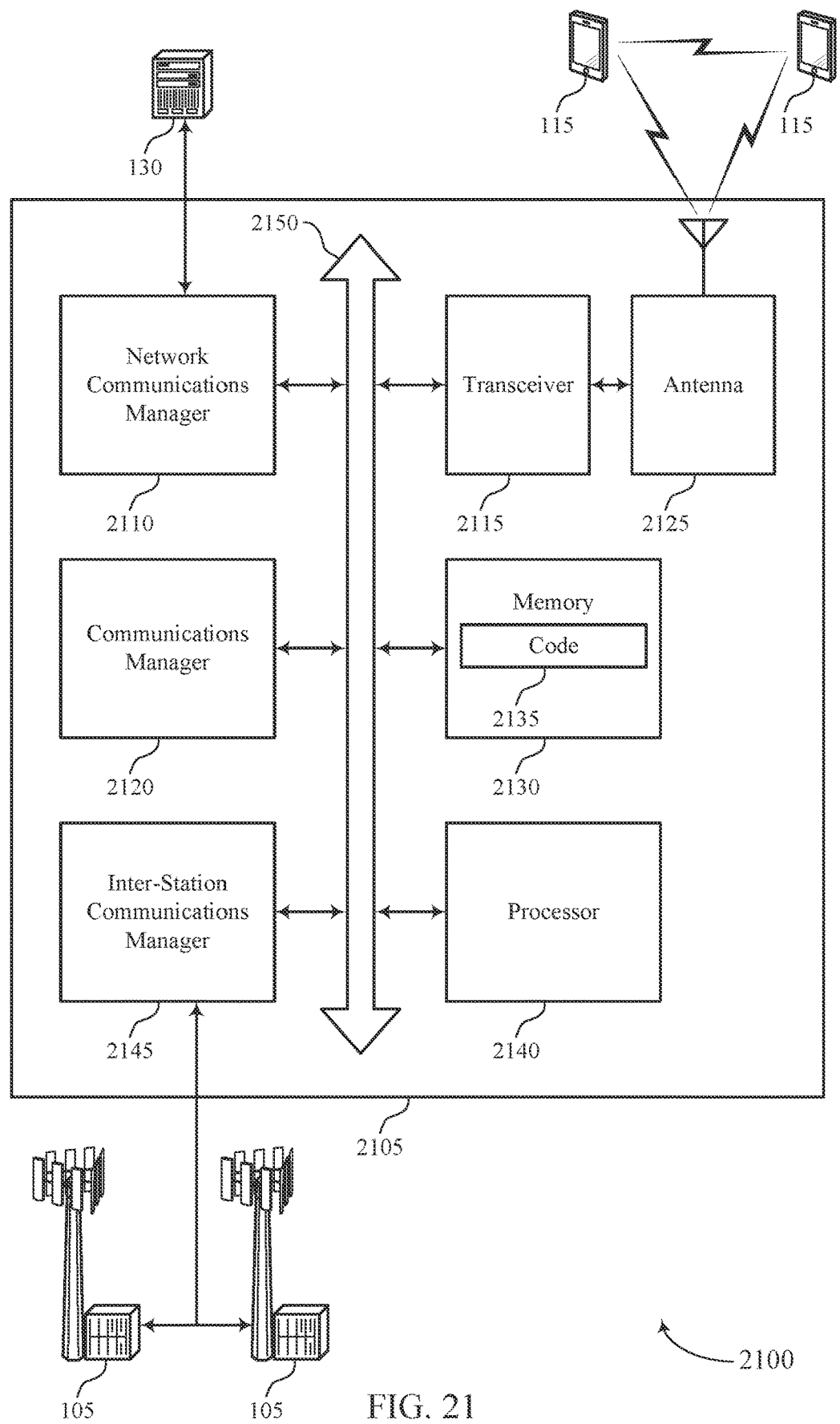
FIG. 21 shows a diagram of a system including a device that supports sidelink intra-UE prioritization in accordance with aspects of the present disclosure.

FIG. 21 shows a diagram of a system 2100 including a device 2105 that supports sidelink intra-UE prioritization in accordance with aspects of the present disclosure. The device 2105 may be an example of or include the components of a device 1805, a device 1905, or a base station 105 as described herein. The device 2105 may communicate wirelessly with one or more base stations 105, UEs 115, or any combination thereof. The device 2105 may include components for bi-directional voice and data communications including components for transmitting and receiving communications, such as a communications manager 2120, a network communications manager 2110, a transceiver 2115, an antenna 2125, a memory 2130, code 2135, a processor 2140, and an inter-station communications manager 2145. These components may be in electronic communication or otherwise coupled (e.g., operatively, communicatively, functionally, electronically, electrically) via one or more buses (e.g., a bus 2150).

The network communications manager 2110 may manage communications with a core network 130 (e.g., via one or more wired backhaul links). For example, the network communications manager 2110 may manage the transfer of data communications for client devices, such as one or more UEs 115.

In some cases, the device 2105 may include a single antenna 2125. However, in some other cases the device 2105 may have more than one antenna 2125, which may be capable of concurrently transmitting or receiving multiple wireless transmissions. The transceiver 2115 may communicate bi-directionally, via the one or more antennas 2125, wired, or wireless links as described herein. For example, the transceiver 2115 may represent a wireless transceiver and may communicate bi-directionally with another wireless transceiver. The transceiver 2115 may also include a modem to modulate the packets, to provide the modulated packets to one or more antennas 2125 for transmission, and to demodulate packets received from the one or more antennas 2125. The transceiver 2115, or the transceiver 2115 and one or more antennas 2125, may be an example of a transmitter 1815, a transmitter 1915, a receiver 1810, a receiver 1910, or any combination thereof or component thereof, as described herein.

The memory 2130 may include RAM and ROM. The memory 2130 may store computer-readable, computer-executable code 2135 including instructions that, when executed by the processor 2140, cause the device 2105 to perform various functions described herein. The code 2135 may be stored in a non-transitory computer-readable medium such as system memory or another type of memory. In some cases, the code 2135 may not be directly executable by the processor 2140 but may cause a computer (e.g., when compiled and executed) to perform functions described herein. In some cases, the memory 2130 may contain, among other things, a BIOS which may control basic hardware or software operation such as the interaction with peripheral components or devices.

The processor 2140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2140 may be configured to operate a memory array using a memory controller. In some other cases, a memory controller may be integrated into the processor 2140. The processor 2140 may be configured to execute computer-readable instructions stored in a memory (e.g., the memory 2130) to cause the device 2105 to perform various functions (e.g., functions or tasks supporting sidelink intra-UE prioritization). For example, the device 2105 or a component of the device 2105 may include a processor 2140 and memory 2130 coupled to the processor 2140, the processor 2140 and memory 2130 configured to perform various functions described herein.

The inter-station communications manager 2145 may manage communications with other base stations 105, and may include a controller or scheduler for controlling communications with UEs 115 in cooperation with other base stations 105. For example, the inter-station communications manager 2145 may coordinate scheduling for transmissions to UEs 115 for various interference mitigation techniques such as beamforming or joint transmission. In some examples, the inter-station communications manager 2145 may provide an X2 interface within an LTE/LTE-A wireless communications network technology to provide communication between base stations 105.

The communications manager 2120 may support wireless communication at a base station in accordance with examples as disclosed herein. For example, the communications manager 2120 may be configured as or otherwise support a means for transmitting a first control signaling indicating a semi-persistent scheduling configuration that identifies a set of multiple resource occasions each including a set of multiple resources of a sidelink channel allocated to a first UE for sidelink communication. The communications manager 2120 may be configured as or otherwise support a means for identifying a rescheduling configuration for scheduling transmission of a first message by the first UE that has a possible conflict with transmission of a second message during a first resource of the set of multiple resources of a first resource occasion of the set of multiple resource occasions, the first message having a different priority than the second message. The communications manager 2120 may be configured as or otherwise support a means for receiving the second message during the first resource occasion. The communications manager 2120 may be configured as or otherwise support a means for receiving the first message in accordance with the rescheduling configuration.

By including or configuring the communications manager 2120 in accordance with examples as described herein, the device 2105 may support techniques for reduced latency, improved user experience related to reduced latency, more efficient utilization of communication resources, and improved coordination between devices, among other examples.

In some examples, the communications manager 2120 may be configured to perform various operations (e.g., receiving, monitoring, transmitting) using or otherwise in cooperation with the transceiver 2115, the one or more antennas 2125, or any combination thereof. Although the communications manager 2120 is illustrated as a separate component, in some examples, one or more functions described with reference to the communications manager 2120 may be supported by or performed by the processor 2140, the memory 2130, the code 2135, or any combination thereof. For example, the code 2135 may include instructions executable by the processor 2140 to cause the device 2105 to perform various aspects of sidelink intra-UE prioritization as described herein, or the processor 2140 and the memory 2130 may be otherwise configured to perform or support such operations.

Figure 22:
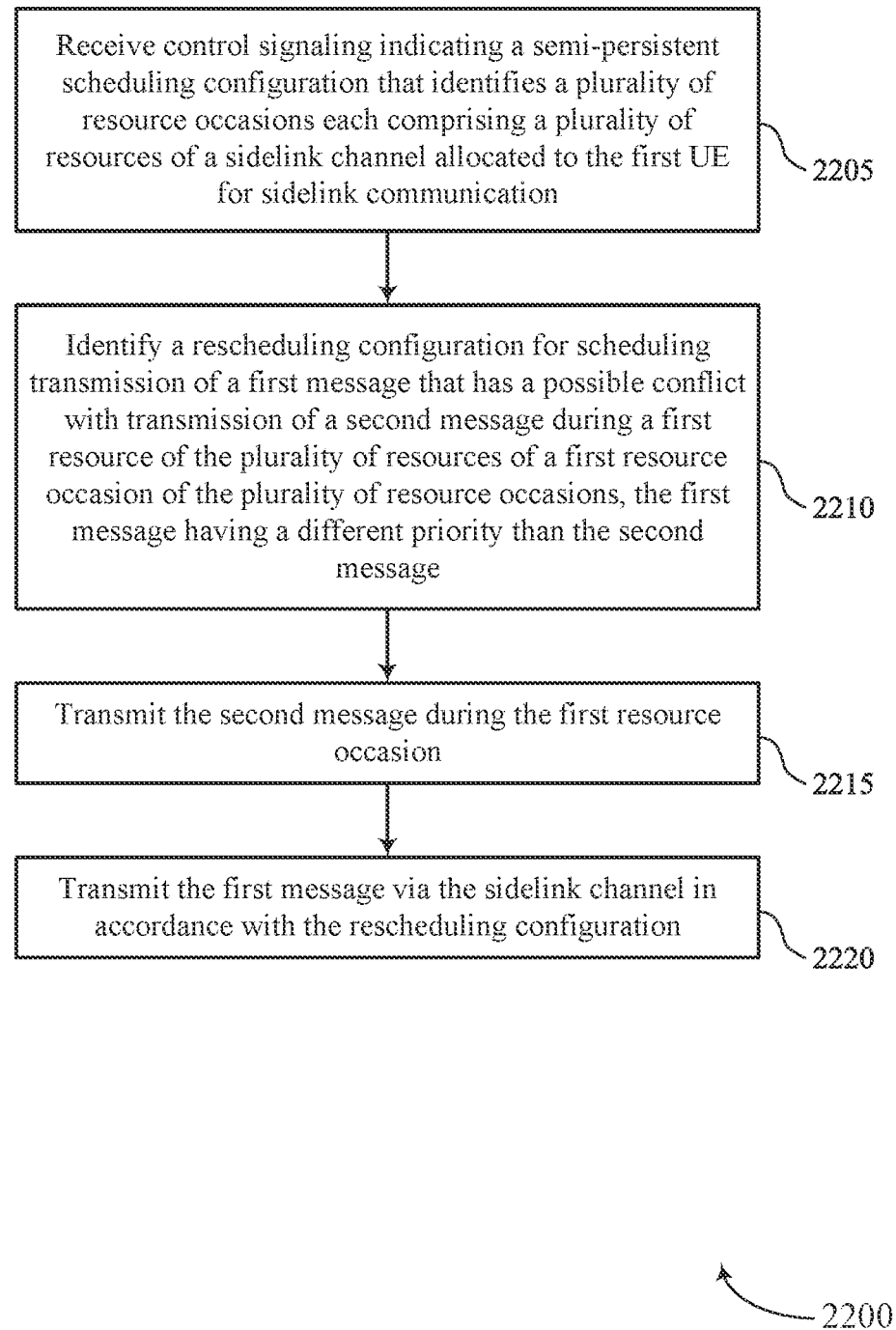
FIGS. 22 through 27 show flowcharts illustrating methods that support sidelink intra-UE prioritization in accordance with aspects of the present disclosure.

FIG. 22 shows a flowchart illustrating a method 2200 that supports sidelink intra-UE prioritization in accordance with aspects of the present disclosure. The operations of the method 2200 may be implemented by a UE or its components as described herein. For example, the operations of the method 2200 may be performed by a UE 115 as described with reference to FIGS. 1 through 17. In some examples, a UE may execute a set of instructions to control the functional elements of the UE to perform the described functions. Additionally, or alternatively, the UE may perform aspects of the described functions using special-purpose hardware.

At 2205, the method may include receiving control signaling indicating a semi-persistent scheduling configuration that identifies a set of multiple resource occasions each including a set of multiple resources of a sidelink channel allocated to the first UE for sidelink communication. The operations of 2205 may be performed in accordance with examples as disclosed herein. In some examples, aspects of the operations of 2205 may be performed by a control signaling manager 1625 as described with reference to FIG. 16.

At 2210, the method may include identifying a rescheduling configuration for scheduling transmission of a first message that has a possible conflict with transmission of a second message during a first resource of the set of multiple resources of a first resource occasion of the set of multiple resource occasions, the first message having a different priority than the second message. The operations of 2210 may be performed in accordance with examples as disclosed herein. In some examples, aspects of the operations of 2210 may be performed by a rescheduling configuration component 1630 as described with reference to FIG. 16.

At 2215, the method may include transmitting the second message during the first resource occasion. The operations of 2215 may be performed in accordance with examples as disclosed herein. In some examples, aspects of the operations of 2215 may be performed by a semi-persistent scheduling transmission component 1635 as described with reference to FIG. 16.

At 2220, the method may include transmitting the first message via the sidelink channel in accordance with the rescheduling configuration. The operations of 2220 may be performed in accordance with examples as disclosed herein. In some examples, aspects of the operations of 2220 may be performed by a semi-persistent scheduling transmission component 1635 as described with reference to FIG. 16.

Figure 23:
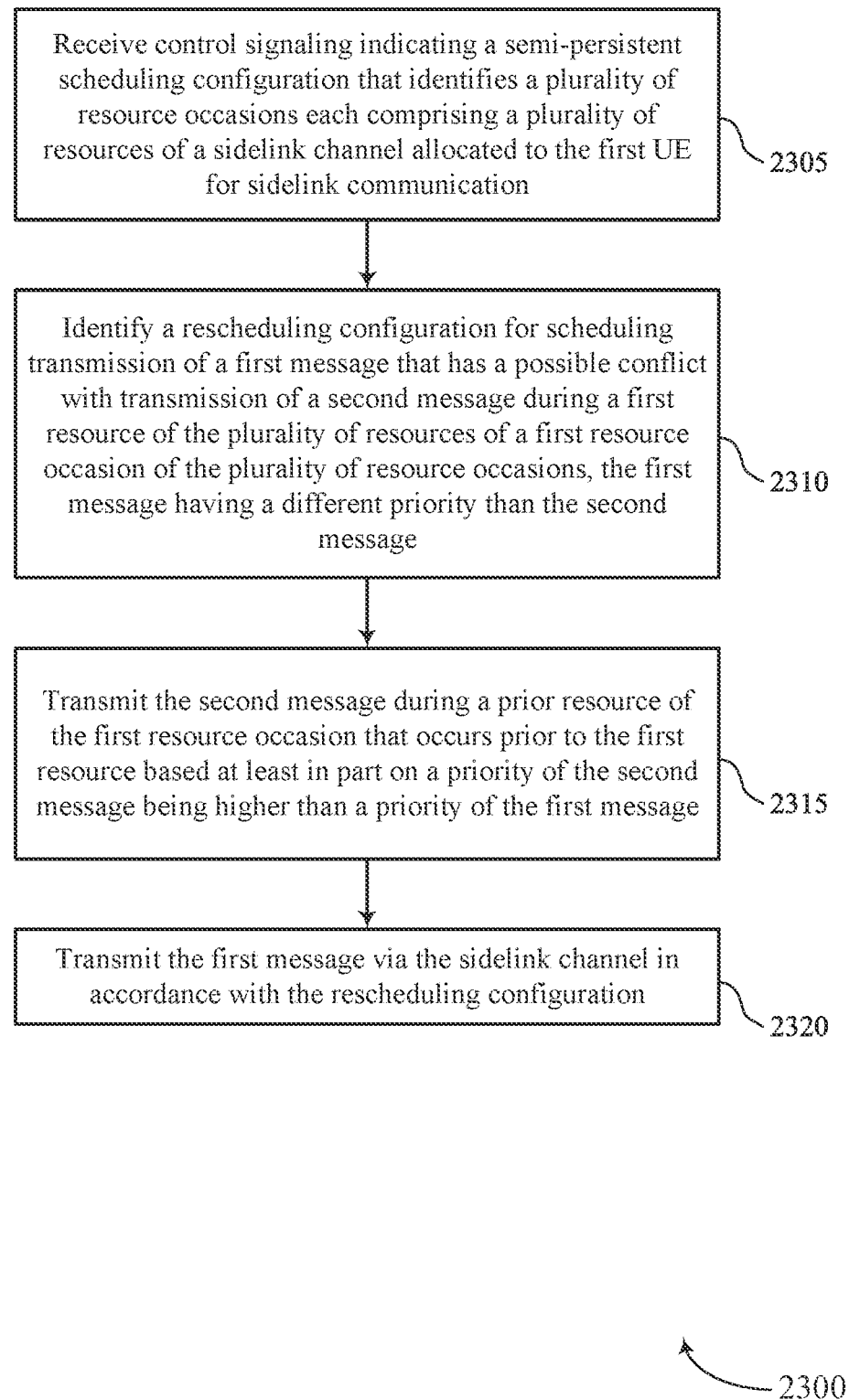

FIG. 23 shows a flowchart illustrating a method 2300 that supports sidelink intra-UE prioritization in accordance with aspects of the present disclosure. The operations of the method 2300 may be implemented by a UE or its components as described herein. For example, the operations of the method 2300 may be performed by a UE 115 as described with reference to FIGS. 1 through 17. In some examples, a UE may execute a set of instructions to control the func- At 2305, the method may include receiving control signaling indicating a semi-persistent scheduling configuration that identifies a set of multiple resource occasions each including a set of multiple resources of a sidelink channel allocated to the first UE for sidelink communication. The operations of 2305 may be performed in accordance with examples as disclosed herein. In some examples, aspects of the operations of 2305 may be performed by a control signaling manager 1625 as described with reference to FIG. 16.

At 2310, the method may include identifying a rescheduling configuration for scheduling transmission of a first message that has a possible conflict with transmission of a second message during a first resource of the set of multiple resources of a first resource occasion of the set of multiple resource occasions, the first message having a different priority than the second message. The operations of 2310 may be performed in accordance with examples as disclosed herein. In some examples, aspects of the operations of 2310 may be performed by a rescheduling configuration component 1630 as described with reference to FIG. 16.

At 2315, the method may include transmitting the second message during a prior resource of the first resource occasion that occurs prior to the first resource based on a priority of the second message being higher than a priority of the first message. The operations of 2320 may be performed in accordance with examples as disclosed herein. In some examples, aspects of the operations of 2320 may be performed by a priority manager 1640 as described with reference to FIG. 16.

At 2320, the method may include transmitting the first message via the sidelink channel in accordance with the rescheduling configuration. The operations of 2325 may be performed in accordance with examples as disclosed herein. In some examples, aspects of the operations of 2325 may be performed by a semi-persistent scheduling transmission component 1635 as described with reference to FIG. 16.

Figure 24:
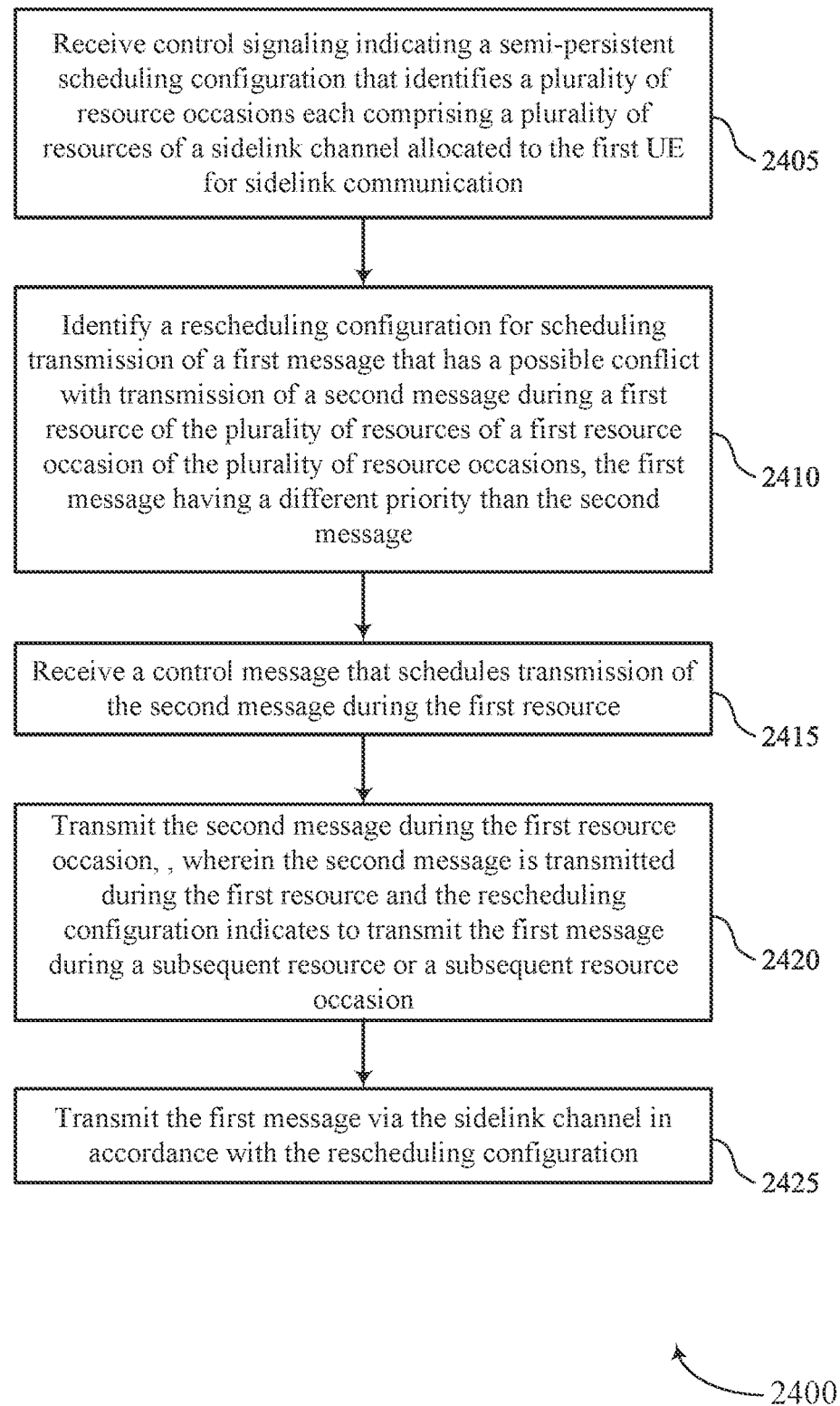

FIG. 24 shows a flowchart illustrating a method 2400 that supports sidelink intra-UE prioritization in accordance with aspects of the present disclosure. The operations of the method 2400 may be implemented by a UE or its components as described herein. For example, the operations of the method 2400 may be performed by a UE 115 as described with reference to FIGS. 1 through 17. In some examples, a UE may execute a set of instructions to control the functional elements of the UE to perform the described functions. Additionally, or alternatively, the UE may perform aspects of the described functions using special-purpose hardware.

At 2405, the method may include receiving control signaling indicating a semi-persistent scheduling configuration that identifies a set of multiple resource occasions each including a set of multiple resources of a sidelink channel allocated to the first UE for sidelink communication. The operations of 2405 may be performed in accordance with examples as disclosed herein. In some examples, aspects of the operations of 2405 may be performed by a control signaling manager 1625 as described with reference to FIG. 16.

At 2410, the method may include identifying a rescheduling configuration for scheduling transmission of a first message that has a possible conflict with transmission of a second message during a first resource of the set of multiple resources of a first resource occasion of the set of multiple resource occasions, the first message having a different priority than the second message. The operations of 2410 may be performed in accordance with examples as disclosed herein. In some examples, aspects of the operations of 2410 may be performed by a rescheduling configuration component 1630 as described with reference to FIG. 16.

At 2415, the method may include receiving a control message that schedules transmission of the second message during the first resource. The operations of 2415 may be performed in accordance with examples as disclosed herein. In some examples, aspects of the operations of 2415 may be performed by a control signaling manager 1625 as described with reference to FIG. 16.

At 2420, the method may include transmitting the second message during the first resource occasion, where the second message is transmitted during the first resource and the rescheduling configuration indicates to transmit the first message during a subsequent resource or a subsequent resource occasion. The operations of 2420 may be performed in accordance with examples as disclosed herein. In some examples, aspects of the operations of 2420 may be performed by a semi-persistent scheduling transmission component 1635 as described with reference to FIG. 16.

At 2425, the method may include transmitting the first message via the sidelink channel in accordance with the rescheduling configuration. The operations of 2425 may be performed in accordance with examples as disclosed herein. In some examples, aspects of the operations of 2425 may be performed by a semi-persistent scheduling transmission component 1635 as described with reference to FIG. 16.

Figure 25:
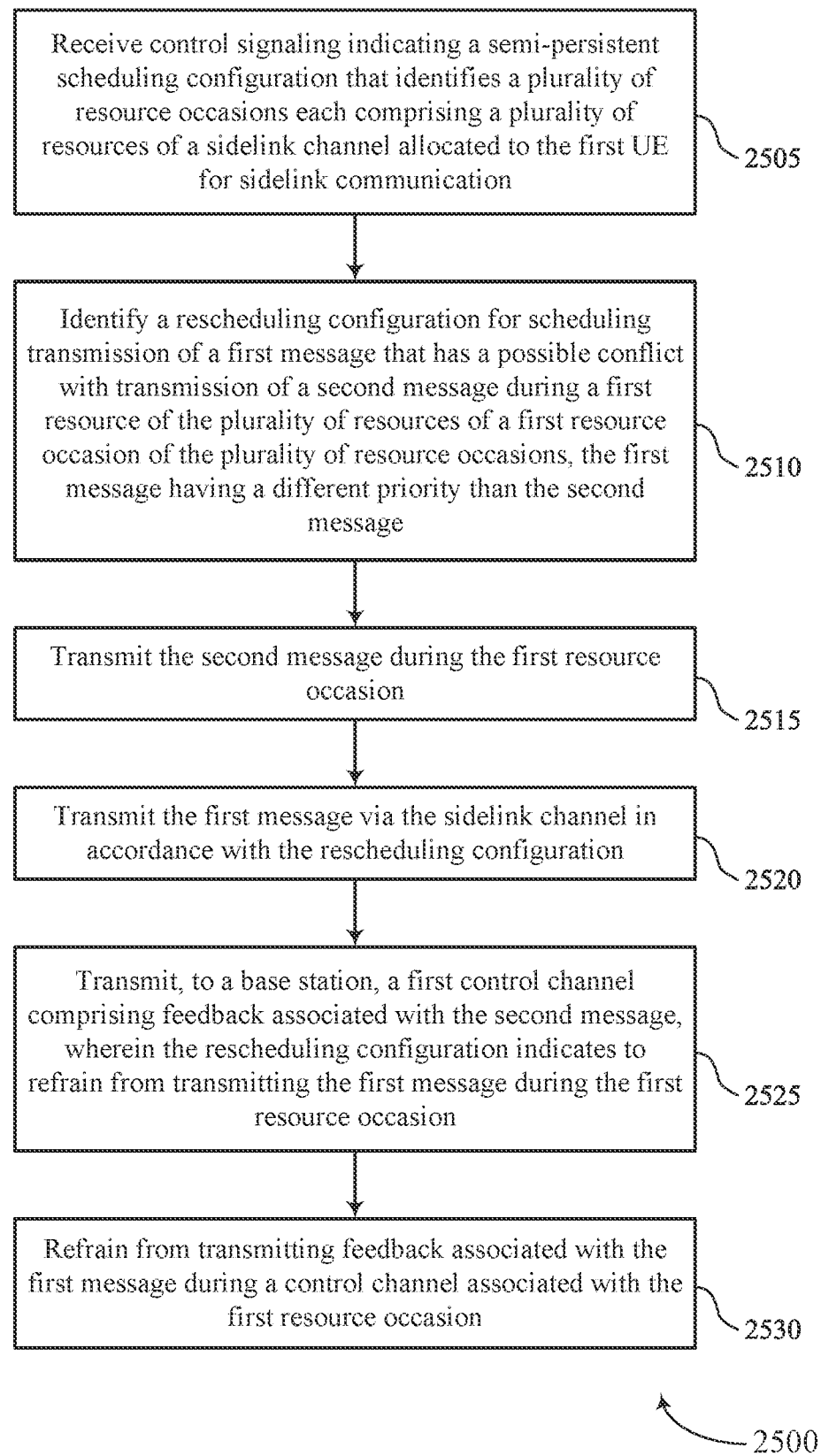

FIG. 25 shows a flowchart illustrating a method 2500 that supports sidelink intra-UE prioritization in accordance with aspects of the present disclosure. The operations of the method 2500 may be implemented by a UE or its components as described herein. For example, the operations of the method 2500 may be performed by a UE 115 as described with reference to FIGS. 1 through 17. In some examples, a UE may execute a set of instructions to control the functional elements of the UE to perform the described functions. Additionally, or alternatively, the UE may perform aspects of the described functions using special-purpose hardware.

At 2505, the method may include receiving control signaling indicating a semi-persistent scheduling configuration that identifies a set of multiple resource occasions each including a set of multiple resources of a sidelink channel allocated to the first UE for sidelink communication. The operations of 2505 may be performed in accordance with examples as disclosed herein. In some examples, aspects of the operations of 2505 may be performed by a control signaling manager 1625 as described with reference to FIG. 16.

At 2510, the method may include identifying a rescheduling configuration for scheduling transmission of a first message that has a possible conflict with transmission of a second message during a first resource of the set of multiple resources of a first resource occasion of the set of multiple resource occasions, the first message having a different priority than the second message. The operations of 2510 may be performed in accordance with examples as disclosed herein. In some examples, aspects of the operations of 2510 may be performed by a rescheduling configuration component 1630 as described with reference to FIG. 16.

At 2515, the method may include transmitting the second message during the first resource occasion. The operations of 2515 may be performed in accordance with examples as disclosed herein. In some examples, aspects of the operations of 2515 may be performed by a semi-persistent scheduling transmission component 1635 as described with reference to FIG. 16.

At 2520, the method may include transmitting the first message via the sidelink channel in accordance with the rescheduling configuration. The operations of 2520 may be performed in accordance with examples as disclosed herein. In some examples, aspects of the operations of 2520 may be performed by a semi-persistent scheduling transmission component 1635 as described with reference to FIG. 16.

At 2525, the method may include transmitting, to a base station, a first control channel including feedback associated with the second message, where the rescheduling configuration indicates to refrain from transmitting the first message during the first resource occasion. The operations of 2525 may be performed in accordance with examples as disclosed herein. In some examples, aspects of the operations of 2525 may be performed by a feedback component 1645 as described with reference to FIG. 16.

At 2530, the method may include refraining from transmitting feedback associated with the first message during a control channel associated with the first resource occasion. The operations of 2530 may be performed in accordance with examples as disclosed herein. In some examples, aspects of the operations of 2530 may be performed by a feedback component 1645 as described with reference to FIG. 16.

Figure 26:
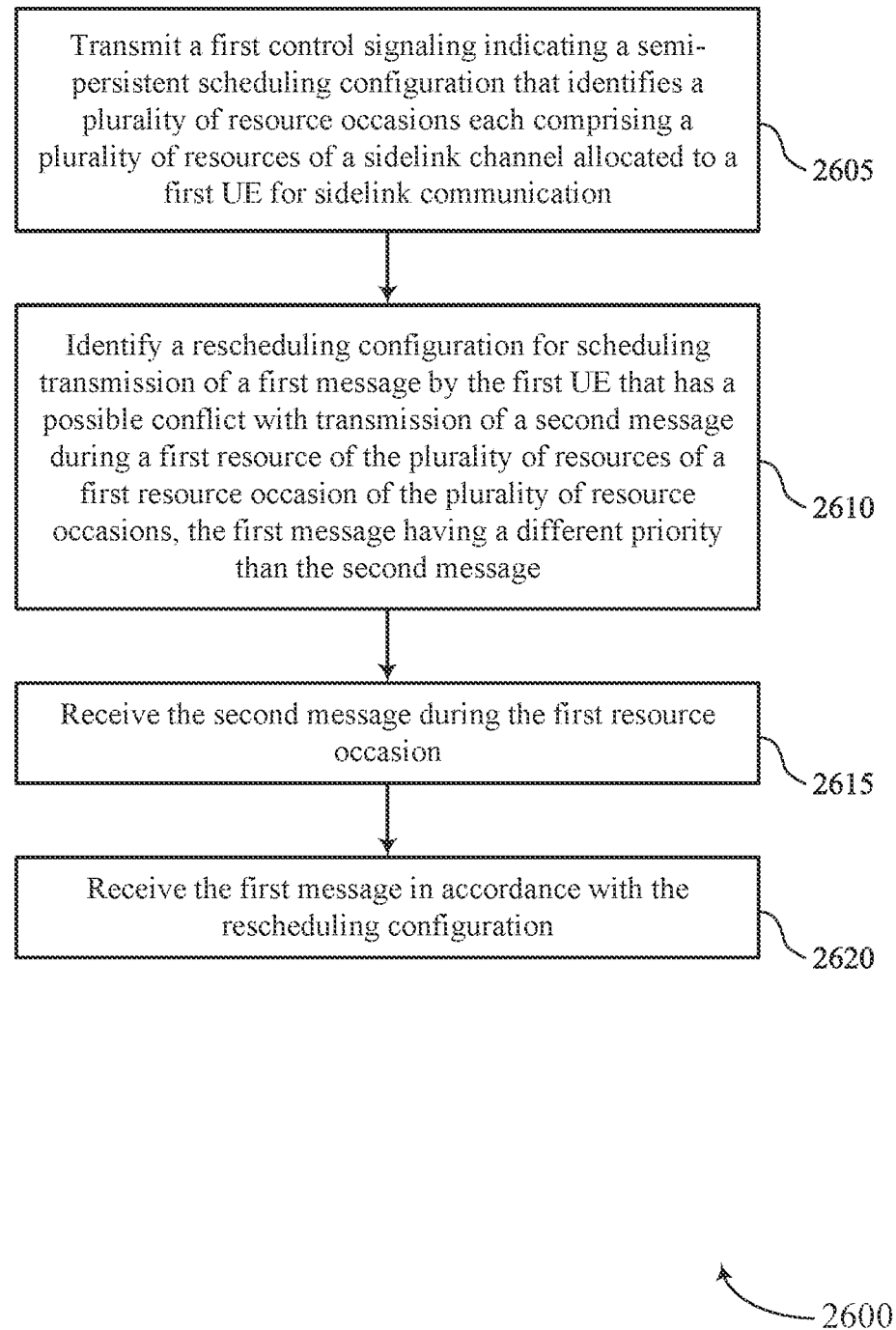

FIG. 26 shows a flowchart illustrating a method 2600 that supports sidelink intra-UE prioritization in accordance with aspects of the present disclosure. The operations of the method 2600 may be implemented by a base station or its components as described herein. For example, the operations of the method 2600 may be performed by a base station 105 as described with reference to FIGS. 1 through 13 and 18 through 21. In some examples, a base station may execute a set of instructions to control the functional elements of the base station to perform the described functions. Additionally, or alternatively, the base station may perform aspects of the described functions using special-purpose hardware.

At 2605, the method may include transmitting a first control signaling indicating a semi-persistent scheduling configuration that identifies a set of multiple resource occasions each including a set of multiple resources of a sidelink channel allocated to a first UE for sidelink communication. The operations of 2605 may be performed in accordance with examples as disclosed herein. In some examples, aspects of the operations of 2605 may be performed by a control signaling component 2025 as described with reference to FIG. 20.

At 2610, the method may include identifying a rescheduling configuration for scheduling transmission of a first message by the first UE that has a possible conflict with transmission of a second message during a first resource of the set of multiple resources of a first resource occasion of the set of multiple resource occasions, the first message having a different priority than the second message. The operations of 2610 may be performed in accordance with examples as disclosed herein. In some examples, aspects of the operations of 2610 may be performed by a rescheduling configuration component 2030 as described with reference to FIG. 20.

At 2615, the method may include receiving the second message during the first resource occasion. The operations of 2615 may be performed in accordance with examples as disclosed herein. In some examples, aspects of the operations of 2615 may be performed by a semi-persistent scheduling component 2035 as described with reference to FIG. 20.

At 2620, the method may include receiving the first message in accordance with the rescheduling configuration. The operations of 2620 may be performed in accordance with examples as disclosed herein. In some examples, aspects of the operations of 2620 may be performed by a semi-persistent scheduling component 2035 as described with reference to FIG. 20.

Figure 27:
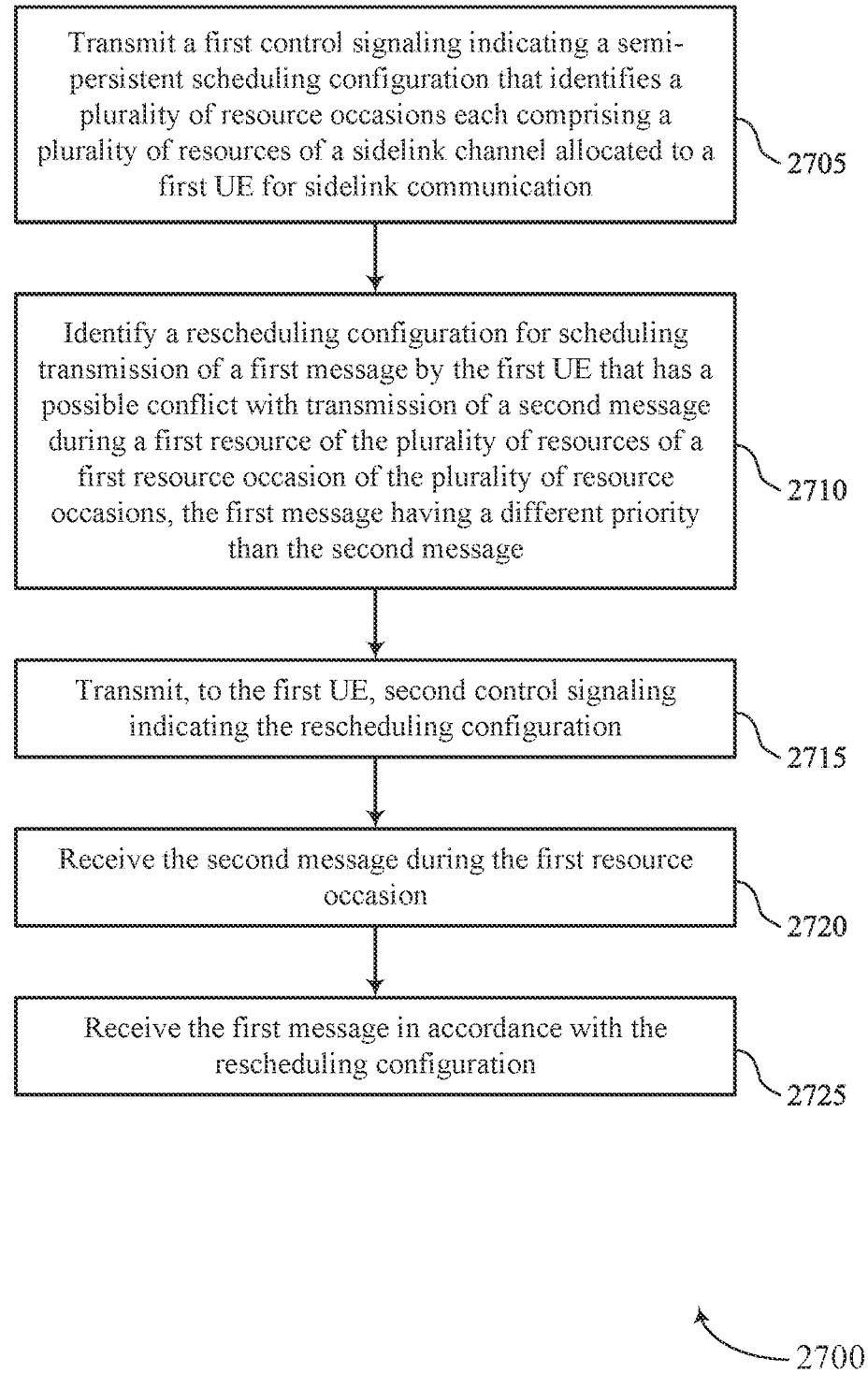

FIG. 27 shows a flowchart illustrating a method 2700 that supports sidelink intra-UE prioritization in accordance with aspects of the present disclosure. The operations of the method 2700 may be implemented by a base station or its components as described herein. For example, the operations of the method 2700 may be performed by a base station 105 as described with reference to FIGS. 1 through 13 and 18 through 21. In some examples, a base station may execute a set of instructions to control the functional elements of the base station to perform the described functions. Additionally, or alternatively, the base station may perform aspects of the described functions using special-purpose hardware.

At 2705, the method may include transmitting a first control signaling indicating a semi-persistent scheduling configuration that identifies a set of multiple resource occasions each including a set of multiple resources of a sidelink channel allocated to a first UE for sidelink communication. The operations of 2705 may be performed in accordance with examples as disclosed herein. In some examples, aspects of the operations of 2705 may be performed by a control signaling component 2025 as described with reference to FIG. 20.

At 2710, the method may include identifying a rescheduling configuration for scheduling transmission of a first message by the first UE that has a possible conflict with transmission of a second message during a first resource of the set of multiple resources of a first resource occasion of the set of multiple resource occasions, the first message having a different priority than the second message. The operations of 2710 may be performed in accordance with examples as disclosed herein. In some examples, aspects of the operations of 2710 may be performed by a rescheduling configuration component 2030 as described with reference to FIG. 20.

At 2715, the method may include transmitting, to the first UE, second control signaling indicating the rescheduling configuration. The operations of 2715 may be performed in accordance with examples as disclosed herein. In some examples, aspects of the operations of 2715 may be performed by a control signaling component 2025 as described with reference to FIG. 20.

At 2720, the method may include receiving the second message during the first resource occasion. The operations of 2720 may be performed in accordance with examples as disclosed herein. In some examples, aspects of the operations of 2720 may be performed by a semi-persistent scheduling component 2035 as described with reference to FIG. 20.

At 2725, the method may include receiving the first message in accordance with the rescheduling configuration. The operations of 2725 may be performed in accordance with examples as disclosed herein. In some examples, aspects of the operations of 2725 may be performed by a semi-persistent scheduling component 2035 as described with reference to FIG. 20.

The following provides an overview of aspects of the present disclosure:

Aspect 1: A method for wireless communication at a first UE, comprising: receiving control signaling indicating a semi-persistent scheduling configuration that identifies a plurality of resource occasions each comprising a plurality of resources of a sidelink channel allocated to the first UE for sidelink communication; identifying a rescheduling configuration for scheduling transmission of a first message that has a possible conflict with transmission of a second message during a first resource of the plurality of resources of a first resource occasion of the plurality of resource occasions, the first message having a different priority than the second message; transmitting the second message during the first resource occasion; and transmitting the first message via the sidelink channel in accordance with the rescheduling configuration.

Aspect 2: The method of aspect 1, wherein the rescheduling configuration indicates to transmit the first message during a subsequent resource of the first resource occasion.

Aspect 3: The method of any of aspects 1 through 2, wherein the rescheduling configuration indicates to transmit the first message during a second resource indicated by a second semi-persistent scheduling configuration that occurs after the first resource.

Aspect 4: The method of aspect 3, wherein the first resource occasion at least partially overlaps in time with a second resource occasion indicated by the second semi-persistent scheduling configuration.

Aspect 5: The method of any of aspects 1 through 4, wherein the rescheduling configuration indicates to transmit the first message during a resource of a second resource occasion of a second semi-persistent scheduling configuration that occurs after the first resource occasion of the semi-persistent scheduling configuration.

Aspect 6: The method of any of aspects 1 through 5, wherein the possible conflict occurs between resources of the semi-persistent scheduling configuration and a second semi-persistent scheduling configuration, and the rescheduling configuration indicates to transmit the first message during a resource of a resource occasion indicated by a third semi-persistent configuration.

Aspect 7: The method of any of aspects 1 through 6, wherein the rescheduling configuration indicates to transmit the first message during a subsequent resource of a plurality of resources of a resource occasion indicated by a second semi-persistent configuration based at least in part on the second message being successfully transmitted during the first resource that occurs prior to the subsequent resource.

Aspect 8: The method of any of aspects 1 through 7, wherein the rescheduling configuration indicates to transmit the first message during a second resource of the first resource occasion that occurs after the first resource based at least in part on the second message being successfully transmitted during the first resource of the first resource occasion.

Aspect 9: The method of any of aspects 1 through 8, wherein the rescheduling configuration indicates to transmit the first message during a subsequent resource of a second resource occasion that occurs after a prior resource of the second resource occasion based at least in part on the possible conflict occurring between the prior resource and the first resource.

Aspect 10: The method of any of aspects 1 through 9, wherein the rescheduling configuration indicates to transmit the first message during the first resource, the method further comprising: transmitting the second message during a prior resource of the first resource occasion that occurs prior to the first resource based at least in part on a priority of the second message being higher than a priority of the first message.

Aspect 11: The method of aspect 10, further comprising retransmitting the second message during a subsequent resource of the first resource occasion that occurs after the first resource based at least in part on unsuccessful transmission of the second message during the prior resource.

Aspect 12: The method of any of aspects 1 through 11, wherein the first resource indicated by the semi-persistent scheduling configuration at least partially overlaps with a second resource of a second resource occasion indicated by a dynamic scheduling configuration.

Aspect 13: The method of any of aspects 1 through 12, further comprising: receiving a control message that schedules transmission of the second message during the first resource, wherein the second message is transmitted during the first resource and the rescheduling configuration indicates to transmit the first message during a subsequent resource or a subsequent resource occasion.

Aspect 14: The method of any of aspects 1 through 13, further comprising transmitting, to a base station, a first control channel comprising feedback associated with the first message; and transmitting, to the base station, a second control channel comprising feedback associated with the second message.

Aspect 15: The method of any of aspects 1 through 14, further comprising: transmitting, to a base station, a first control channel comprising feedback associated with the second message, wherein the rescheduling configuration indicates to refrain from transmitting the first message during the first resource occasion; and refraining from transmitting feedback associated with the first message during a control channel associated with the first resource occasion.

Aspect 16: The method of any of aspects 1 through 15, wherein the first message is a sidelink message and the second message is a sidelink message, an uplink message, or an access link message.

Aspect 17: The method of any of aspects 1 through 16, further comprising: receiving, from a base station, a first control message that schedules transmission of the first message during the first resource; transmitting negative feedback to the base station indicating that the first message was not transmitted during the first resource based at least in part on the rescheduling configuration indicating to transmit the negative feedback due to the possible conflict; and receiving a second control message scheduling transmission of the first message during a subsequent resource based at least in part on the negative feedback.

Aspect 18: The method of any of aspects 1 through 17, wherein the second message is transmitted to a second UE during the first resource using a first transmission beam and the first message is transmitted to at least one additional UE during the first resource using a second transmission based at least in part on a location of the second UE relative to the at least one additional UE, a priority associated with the at least one additional UE, or both.

Aspect 19: The method of any of aspects 1 through 18, wherein the second message is transmitted to a second UE during the first resource using a first transmission beam and the first message is transmitted to at least one additional UE during a second resource using the first transmission beam or a second transmission based at least in part on a location of the second UE relative to the at least one additional UE.

Aspect 20: The method of any of aspects 1 through 19, further comprising scheduling transmission of the first message and the second message based at least in part on one or more parameters, a reported channel metric, or both.

Aspect 21: The method of any of aspects 1 through 20, further comprising transmitting a third message during a subsequent resource of a second resource occasion based at least in part on transmission being skipped on an earlier resource of the second resource occasion.

Aspect 22: The method of any of aspects 1 through 21, further comprising transmitting a third message during a subsequent resource of a second resource occasion based at least in part on a dummy transmission occurring on an earlier resource of the second resource occasion.

Aspect 23: The method of any of aspects 1 through 22, wherein identifying the rescheduling configuration comprises receiving a control message indicating the rescheduling configuration.

Aspect 24: The method of any of aspects 1 through 23, further comprising receiving the rescheduling configuration via radio resource control signaling.

Aspect 25: The method of aspect 24, wherein transmitting the first message further comprises: autonomously transmitting the first message via the sidelink channel in accordance with the rescheduling configuration received via the radio resource control signaling.

Aspect 26: The method of any of aspects 1 through 25, wherein a priority of the second message is higher than a priority of the first message.

Aspect 27: A method for wireless communication at a base station, comprising: transmitting a first control signaling indicating a semi-persistent scheduling configuration that identifies a plurality of resource occasions each comprising a plurality of resources of a sidelink channel allocated to a first UE for sidelink communication; and identifying rescheduling configuration for scheduling transmission of a first message by the first UE that has a possible conflict with transmission of a second message during a first resource of the plurality of resources of a first resource occasion of the plurality of resource occasions, the first message having a different priority than the second message; receiving the second message during the first resource occasion; and receiving the first message in accordance with the rescheduling configuration.

Aspect 28: The method of aspect 27, further comprising transmitting, to the first UE, second control signaling indicating the rescheduling configuration.

Aspect 29: The method of any of aspects 27 through 28, wherein the rescheduling configuration indicates that the first message is to be communicated during a subsequent resource of the first resource occasion.

Aspect 30: The method of any of aspects 27 through 29, wherein the rescheduling configuration indicates that the first message is to be communicated during a second resource indicated by a second semi-persistent configuration that occurs after the first resource.

Aspect 31: An apparatus for wireless communication at a first UE, comprising a processor; memory coupled with the processor; and instructions stored in the memory and executable by the processor to cause the apparatus to perform a method of any of aspects 1 through 26.

Aspect 32: An apparatus for wireless communication at a first UE, comprising at least one means for performing a method of any of aspects 1 through 26.

Aspect 33: A non-transitory computer-readable medium storing code for wireless communication at a first UE, the code comprising instructions executable by a processor to perform a method of any of aspects 1 through 26.

Aspect 34: An apparatus for wireless communication at a base station, comprising a processor; memory coupled with the processor; and instructions stored in the memory and executable by the processor to cause the apparatus to perform a method of any of aspects 27 through 30.

Aspect 35: An apparatus for wireless communication at a base station, comprising at least one means for performing a method of any of aspects 27 through 30.

Aspect 36: A non-transitory computer-readable medium storing code for wireless communication at a base station, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first user equipment (UE), comprising:
    a processor;
    memory coupled with the processor; and
    instructions stored in the memory and executable by the processor to cause the apparatus to:
        receive control signaling indicating a semi-persistent scheduling configuration that identifies a plurality of resource occasions each comprising a plurality of resources of a sidelink channel allocated to the first UE for sidelink communication;
        identify a rescheduling configuration for scheduling transmission of a first message that has a possible conflict with transmission of a second message during a first resource of the plurality of resources of a first resource occasion of the plurality of resource occasions, the first message having a different priority than the second message;
        transmit the second message during the first resource occasion; and
        transmit the first message via the sidelink channel in accordance with the rescheduling configuration.

2. The apparatus of claim 1, wherein the rescheduling configuration indicates to transmit the first message during a subsequent resource of the first resource occasion.

3. The apparatus of claim 1, wherein the rescheduling configuration indicates to transmit the first message during a second resource indicated by a second semi-persistent scheduling configuration that occurs after the first resource.

4. The apparatus of claim 3, wherein the first resource occasion at least partially overlaps in time with a second resource occasion indicated by the second semi-persistent scheduling configuration.

5. The apparatus of claim 1, wherein the rescheduling configuration indicates to transmit the first message during a resource of a second resource occasion of a second semi-persistent scheduling configuration that occurs after the first resource occasion of the semi-persistent scheduling configuration.

6. The apparatus of claim 1, wherein:
    the possible conflict occurs between resources of the semi-persistent scheduling configuration and a second semi-persistent scheduling configuration, and the rescheduling configuration indicates to transmit the first message during a resource of a resource occasion indicated by a third semi-persistent configuration.

7. The apparatus of claim 1, wherein the rescheduling configuration indicates to transmit the first message during a subsequent resource of a plurality of resources of a resource occasion indicated by a second semi-persistent configuration based at least in part on the second message being successfully transmitted during the first resource that occurs prior to the subsequent resource.

8. The apparatus of claim 1, wherein the rescheduling configuration indicates to transmit the first message during a second resource of the first resource occasion that occurs after the first resource based at least in part on the second message being successfully transmitted during the first resource of the first resource occasion.

9. The apparatus of claim 1, wherein the rescheduling configuration indicates to transmit the first message during a subsequent resource of a second resource occasion that occurs after a prior resource of the second resource occasion based at least in part on the possible conflict occurring between the prior resource and the first resource.

10. The apparatus of claim 1, wherein the rescheduling configuration indicates to transmit the first message during the first resource, and the instructions are further executable by the processor to cause the apparatus to:
transmit the second message during a prior resource of the first resource occasion that occurs prior to the first resource based at least in part on a priority of the second message being higher than a priority of the first message.

11. The apparatus of claim 10, wherein the instructions are further executable by the processor to cause the apparatus to:
retransmit the second message during a subsequent resource of the first resource occasion that occurs after the first resource based at least in part on unsuccessful transmission of the second message during the prior resource.

12. The apparatus of claim 1, wherein the first resource indicated by the semi-persistent scheduling configuration at least partially overlaps with a second resource of a second resource occasion indicated by a dynamic scheduling configuration.

13. The apparatus of claim 1, wherein the instructions are further executable by the processor to cause the apparatus to:
receive a control message that schedules transmission of the second message during the first resource, wherein the second message is transmitted during the first resource and the rescheduling configuration indicates to transmit the first message during a subsequent resource or a subsequent resource occasion.

14. The apparatus of claim 1, wherein the instructions are further executable by the processor to cause the apparatus to:
transmit, to a base station, a first control channel comprising feedback associated with the first message; and
transmit, to the base station, a second control channel comprising feedback associated with the second message.

15. The apparatus of claim 1, wherein the instructions are further executable by the processor to cause the apparatus to:
transmit, to a base station, a first control channel comprising feedback associated with the second message, wherein the rescheduling configuration indicates to refrain from transmitting the first message during the first resource occasion; and
refrain from transmitting feedback associated with the first message during a control channel associated with the first resource occasion.

16. The apparatus of claim 1, wherein the first message is a sidelink message and the second message is a sidelink message, an uplink message, or an access link message.

17. The apparatus of claim 1, wherein the instructions are further executable by the processor to cause the apparatus to:
receive, from a base station, a first control message that schedules transmission of the first message during the first resource;
transmit negative feedback to the base station indicating that the first message was not transmitted during the first resource based at least in part on the rescheduling configuration indicating to transmit the negative feedback due to the possible conflict; and
receive a second control message scheduling transmission of the first message during a subsequent resource based at least in part on the negative feedback.

18. The apparatus of claim 1, wherein the second message is transmitted to a second UE during the first resource using a first transmission beam and the first message is transmitted to at least one additional UE during the first resource using a second transmission based at least in part on a location of the second UE relative to the at least one additional UE, a priority associated with the at least one additional UE, or both.

19. The apparatus of claim 1, wherein the second message is transmitted to a second UE during the first resource using a first transmission beam and the first message is transmitted to at least one additional UE during a second resource using the first transmission beam or a second transmission based at least in part on a location of the second UE relative to the at least one additional UE.

20. The apparatus of claim 1, wherein the instructions are further executable by the processor to cause the apparatus to:
scheduling transmission of the first message and the second message based at least in part on one or more parameters, a reported channel metric, or both.

21. The apparatus of claim 1, wherein the instructions are further executable by the processor to cause the apparatus to:
transmit a third message during a subsequent resource of a second resource occasion based at least in part on transmission being skipped on an earlier resource of the second resource occasion.

22. The apparatus of claim 1, wherein the instructions are further executable by the processor to cause the apparatus to:
transmit a third message during a subsequent resource of a second resource occasion based at least in part on a dummy transmission occurring on an earlier resource of the second resource occasion.

23. The apparatus of claim 1, wherein the instructions are further executable by the processor to cause the apparatus to:
receive the rescheduling configuration via radio resource control signaling.

24. The apparatus of claim 23, wherein the instructions to transmit the first message are further executable by the processor to cause the apparatus to:
autonomously transmit the first message via the sidelink channel in accordance with the rescheduling configuration received via the radio resource control signaling.

25. An apparatus for wireless communication at a base station, comprising:
a processor;
memory coupled with the processor; and
instructions stored in the memory and executable by the processor to cause the apparatus to:

transmit a first control signaling indicating a semi-persistent scheduling configuration that identifies a plurality of resource occasions each comprising a plurality of resources of a sidelink channel allocated to a first UE for sidelink communication;

identify rescheduling configuration for scheduling transmission of a first message by the first UE that has a possible conflict with transmission of a second message during a first resource of the plurality of resources of a first resource occasion of the plurality of resource occasions, the first message having a different priority than the second message;

receive the second message during the first resource occasion; and receive the first message in accordance with the rescheduling configuration.

26. The apparatus of claim 25, wherein the instructions are further executable by the processor to cause the apparatus to:

transmit, to the first UE, second control signaling indicating the rescheduling configuration.

27. The apparatus of claim 25, wherein the rescheduling configuration indicates that the first message is to be communicated during a subsequent resource of the first resource occasion.

28. The apparatus of claim 25, wherein the rescheduling configuration indicates that the first message is to be communicated during a second resource indicated by a second semi-persistent configuration that occurs after the first resource.

29. A method for wireless communication at a first user equipment (UE), comprising:

receiving control signaling indicating a semi-persistent scheduling configuration that identifies a plurality of resource occasions each comprising a plurality of resources of a sidelink channel allocated to the first UE for sidelink communication;

identifying a rescheduling configuration for scheduling transmission of a first message that has a possible conflict with transmission of a second message during a first resource of the plurality of resources of a first resource occasion of the plurality of resource occasions, the first message having a different priority than the second message;

transmitting the second message during the first resource occasion; and transmitting the first message via the sidelink channel in accordance with the rescheduling configuration.

30. A method for wireless communication at a base station, comprising:

transmitting a first control signaling indicating a semi-persistent scheduling configuration that identifies a plurality of resource occasions each comprising a plurality of resources of a sidelink channel allocated to a first UE for sidelink communication;

identifying a rescheduling configuration for scheduling transmission of a first message by the first UE that has a possible conflict with transmission of a second message during a first resource of the plurality of resources of a first resource occasion of the plurality of resource occasions, the first message having a different priority than the second message;

receiving the second message during the first resource occasion; and receiving the first message in accordance with the rescheduling configuration.

* * * * *